US008494936B2

(12) United States Patent  
Brenner

(10) Patent No.: US 8,494,936 B2  
(45) Date of Patent: Jul. 23, 2013

(54) METHOD FOR DECISION MAKING USING ARTIFICIAL INTELLIGENCE

(75) Inventor: Mory Brenner, Lanesborough, MA (US)

(73) Assignee: Mory Brenner, Lanesborough, MA (US)

( * ) Notice: Subject to any disclaimer, the term of this patent is extended or adjusted under 35 U.S.C. 154(b) by 297 days.

(21) Appl. No.: 12/852,099

(22) Filed: Aug. 6, 2010

(65) Prior Publication Data

US 2011/0055065 A1    Mar. 3, 2011

Related U.S. Application Data

(60) Provisional application No. 61/232,556, filed on Aug. 10, 2009.

(51) Int. Cl.
G06Q 40/00    (2012.01)
(52) U.S. Cl.
USPC .............................................................. 705/35
(58) Field of Classification Search
CPC ...................................................... G06Q 40/02
USPC ................................................................ 705/35
See application file for complete search history.

(56) References Cited

U.S. PATENT DOCUMENTS

| | | | |
|---|---|---|---|
| 5,182,793 A * | 1/1993 | Alexander et al. | 706/13 |
| 5,499,319 A | 3/1996 | Sultan et al. | |
| 5,999,923 A * | 12/1999 | Kowalski et al. | 706/47 |
| 6,112,190 A | 8/2000 | Fletcher et al. | |
| 6,738,753 B1 * | 5/2004 | Hogan | 706/12 |
| 6,826,552 B1 | 11/2004 | Grosser et al. | |
| 6,920,439 B1 * | 7/2005 | Love | 706/20 |
| 7,483,959 B2 | 1/2009 | Rowland et al. | |
| 7,711,619 B2 * | 5/2010 | Merton et al. | 705/35 |
| 2003/0028477 A1 * | 2/2003 | Stevenson et al. | 705/38 |
| 2003/0069868 A1 | 4/2003 | Vos | |
| 2004/0024721 A1 | 2/2004 | Donovan et al. | |
| 2004/0215546 A1 * | 10/2004 | Nelson | 705/36 |
| 2005/0010543 A1 | 1/2005 | Lukomnik et al. | |
| 2005/0086187 A1 | 4/2005 | Grosser et al. | |
| 2006/0004701 A1 | 1/2006 | Bacon | |
| 2008/0126598 A1 | 5/2008 | Raichle et al. | |
| 2008/0228531 A1 | 9/2008 | Kenedy et al. | |
| 2008/0313560 A1 * | 12/2008 | Dalal | 715/781 |
| 2009/0076988 A1 | 3/2009 | Stanelle | |
| 2009/0083169 A1 | 3/2009 | Ortega | |
| 2009/0106595 A1 | 4/2009 | Sarig et al. | |
| 2010/0179928 A1 | 7/2010 | Hodgin | |

FOREIGN PATENT DOCUMENTS

WO    02/21337 A1    3/2002

* cited by examiner

*Primary Examiner* — Eric T Wong
(74) *Attorney, Agent, or Firm* — McCormick, Paulding & Huber LLP

(57) ABSTRACT

A method of decision making using artificial intelligence that: receives data associated with a user regarding the situation of the user; identifies action options that the user might pursue; computes normalized scores for each of the action options based on the eligibility and likely outcome of the user pursuing the respective action option; compares the scores to a minimum threshold and to each other using quantitative and qualitative metrics; outputs a list of action options to the user as primary and secondary options to pursue based on the comparison; receives a selection from the user based on the list of action options; and transmits a message to a party who provides the action option(s) based on the selection. The method is, for example, applicable to decision making in the context of personal finance and debt assistance.

21 Claims, 50 Drawing Sheets

METHOD FOR DECISION MAKING USING ARTIFICIAL INTELLIGENCE

PRIORITY CLAIM OR CROSS-REFERENCE TO RELATED CASE

The present application claims the benefit of provisional U.S. Patent Application Ser. No. 61/232,556, filed on Aug. 10, 2009, which is hereby incorporated by reference.

FIELD OF THE INVENTION

The present invention generally relates to a method for decision making using artificial intelligence and, more specifically, to a method for evaluating which of a plurality of action options is/are the best for a user to pursue based on data associated with the user.

BACKGROUND OF THE INVENTION

When a person is confronted with a situation (hereinafter "situation" or "problem") for which there are numerous ways to proceed (hereinafter "action options" or "options") toward a resolution (hereinafter "solution" or "outcome"), the person must engage in a decision making process to determine how to best proceed. The decision making process is common to all persons confronted with a situation, even though the problems, the action options and the solutions for each person may differ dramatically.

In general, the decision making process is influenced by a number of factors including, but not limited to, the cost of analysis versus the marginal benefit between choosing different action options, timing considerations and the level of expertise of the person engaging in the decision making process. The first two considerations—expense and timing—have a generally logistical and measurable impact and can, therefore, be analytically factored into the decision making process. However, the third consideration—known as the "knowledge dilemma"—tends to plague the decision making process, particularly as the complexity and numerosity of situations or problems, action options and solutions increases.

Regarding the cost-benefit-analysis, the person needs to balance the cost of analysis and decision making versus the marginal benefit of making an improved decision. When the cost of analysis is low relative to the benefit of making an improved decision, the person might commit significant resources (i.e., both in terms of value and time) to making the optimal decision. Similarly, when the cost of pursuing each option (i.e., experimentation) and/or the marginal benefit between various action options is large, the person might also commit more resources to the decision making process. By comparison, where the cost of analysis is high, the person may opt to commit more non-monetary reserves to the decision making process, or, alternatively, have a different "optimal" or at least acceptable solution. For example, a trust manager overseeing a multi-million dollar trust is likely to purchase expensive computer programs, such as predictive modeling software, and subscriptions to proprietary information in order to make a fully informed decision using all available data. In contrast, an individual with debt problems who is reviewing what to do with a $1,000 tax return can only invest a limited amount of money, time and other resources in determining what to do before the cost of analysis surpasses the difference in outcome produced by each action options. In a worst-case scenario, the individual could even commit more value in money, personal time and other resources to the decision making process than the available resources (i.e., $1,000) are worth.

The cost of analysis and the marginal benefit of making an improved decision are both sensitive to budget constraints. By way of example, if the individual reviewing what to do with the $1,000 tax return is carrying $5,000 of outstanding debt, then the optimal allocation of the $1,000 between any number of credit cards, mortgage payments and the like may have a sizeable impact on the outcome, at least on a percentage basis.

Regarding the timing considerations, timing, like any other resource, forms the basis of its own cost-benefit-analysis. Although a more thorough review of various action options may result in the selection of an improved course of action to pursue, the delay inherent in the review process can negatively impact the outcome. In addition, timing can impact the availability of action options and the likely outcome. For example, the trust manager is likely to conduct a continuous analysis of the market in order to prepare a long-term strategy that addresses crises and opportunities, alike, over a period of time. The trust manager will also monitor the market in order to respond promptly according to the long-term strategy and in view of any crisis or opportunity that arises. In contrast, the individual who is suffering from debt problems is more likely to focus on billing cycles and foreclosure deadlines in order to avoid incurring monetary penalties, negative credit ratings and loss of property for failure to meet a deadline.

Regarding the level of expertise for the decision maker, the person's level of sophistication, knowledge and experience impacts his ability to make an informed decision and, thereby, arrive at a selection of an improved action option. If the person is very knowledgeable, the person may either know how to best proceed, may be able to narrow the available options up front, or, at least, apprehend the deficiencies of his decision making process and consult another expert to arrive at an optimal decision. In contrast, if the person is not knowledgeable, he may have little idea of what options are available, in general, what information should guide the decision making process and who to contact for assistance or, even, the rendering of services once a final decision is made. For example, the trust manager is likely to have years of personal experience and immediate access to numerous specialists. With this combination of expertise, the trust manager has an improved chance to arrive at an optimal or near-optimal decision and have confidence in proceeding along the proper course of action. However, the individual with debt problems is likely to be less sophisticated. As a result, the individual is unlikely to know all of the options that are available, whether or not his is even eligible for the options, what outcome to expect, who to contact for additional information and so on.

From the above, it appears that someone like the trust manager is in an advantageous position to make improved decisions, and that someone like the individual with debt problems is in a disadvantageous position. However, the resources (i.e., money, time and expertise) committed by the trust manager are often prohibitive and, therefore, limit the applicability of such an approach in many decision making processes performed in response to a range of situations. Moreover, the pre-existing knowledge and expertise of the trust manager may steer the decision-making process without fully considering all options relative to all pertinent factors. Accordingly, there is need for a decision making approach that can evaluate a plurality of action options in view of numerous influencing factors associated with the situation of the user and determine the best option under all circumstances without unnecessarily increasing the cost, time and prerequisite level of expertise.

The object of the present invention is, therefore, to provide a method for decision making, which, among other desirable attributes, significantly reduces or overcomes the above-mentioned deficiencies of methods for decision making.

SUMMARY OF THE INVENTION

According to one embodiment of the present invention, a method is provided for artificial intelligence decision making using a network entity of a network, the method comprising: computing, using the network entity, scores associated with at least two action options based on data associated with a user; comparing, using the network entity, the scores to a minimum threshold; if each of the scores is less than the minimum threshold, outputting, using the network entity, an alert including an identification of one or more of the at least two action options having a highest score; or, else, if at least one of the scores of the at least two action options is greater than or equal to the minimum threshold, comparing, using the network entity, the scores to each other; categorizing, using the network entity, the at least two action options as a primary option, a secondary option or neither based on the comparisons of the scores; and outputting, using the network entity, a sorted list of the at least two action options, wherein the sorted list is selected from the group consisting of: the primary option and the secondary option.

According to another embodiment of the present invention, a method is provided for artificial intelligence decision making using a network entity of a network, the method comprising: comparing, using the network entity, scores associated with at least two action options to a minimum threshold and to each other, wherein the scores are based on data associated with a user and algorithms specific to each of the at least two action options; generating, using the network entity, a sorted list of action options based on the comparison of the at least two action options; when each of the at least two action options are less than the minimum threshold, outputting, to a user terminal of a user and using the network entity, an alert that none of the at least two action options are at least minimally sufficient; and outputting, to the user terminal of a user and using the network entity, the sorted list of action options.

According to another embodiment of the present invention, a method is provided for artificial intelligence decision making using a network entity of a network, the method comprising: categorizing, using the network entity, at least two action options based on scores associated with the respective action option, wherein the scores are based on data associated with a user and algorithms specific to each of the at least two action options, wherein the step of categorizing further comprises: determining, using the network entity, a highest score based on the scores; determining, using the network entity, a variable similarity threshold by comparing the highest score to a defined score range of all possible score values; and categorizing, using the network entity, one or more of the at least two action options as a primary option when the score associated with the respective action option is greater than a minimum threshold and either greater than the highest score minus a similarity threshold or greater than the highest score minus the variable similarity threshold; or, else, categorizing, using the network entity, one or more of the other of the at least two action options as a secondary option when the score associated with the respective action option is greater than the minimum threshold; transmitting, to a user terminal of a user and using the network entity, a sorted list of the at least two action options based on the categorization of the at least two action options; receiving, from the user terminal of a user and using the network entity, a selection of one or more of the at least two action options from the sorted list; and transmitting, using the network entity, a message to a party who provides the one or more of the at least two action options based on the selection of the one or more of the at least two action options.

These and other features of the present invention are described with reference to the drawings of preferred embodiments of a method for decision making using artificial intelligence. The illustrated embodiments of the method of the present invention are intended to illustrate, but not limit, the invention.

DETAILED DESCRIPTION OF PREFERRED EMBODIMENTS

In general, the present invention provides a method for artificial intelligence decision making that analyzes a variety of action options that a user may wish to pursue in response to a given situation.

In the general application of the present invention, which is illustrated in FIGS. 2-18 and described below, a user is presented with a problem or situation for which there are a number of action options. Typically, the user would like to select an option that is the best, but other factors, such as cost and time for executing the "best" option could influence the ultimate decision as to which course of action to follow. The present invention takes into account many factors that may influence the user's decision making process, and, using artificial intelligence, identifies the available options, and ranks the action options to assist the user in selecting an optimal approach in view of all relevant factors.

A specific application of the method in accordance with the present invention is illustrated in FIGS. 19-62 and described below.

Figure 1:
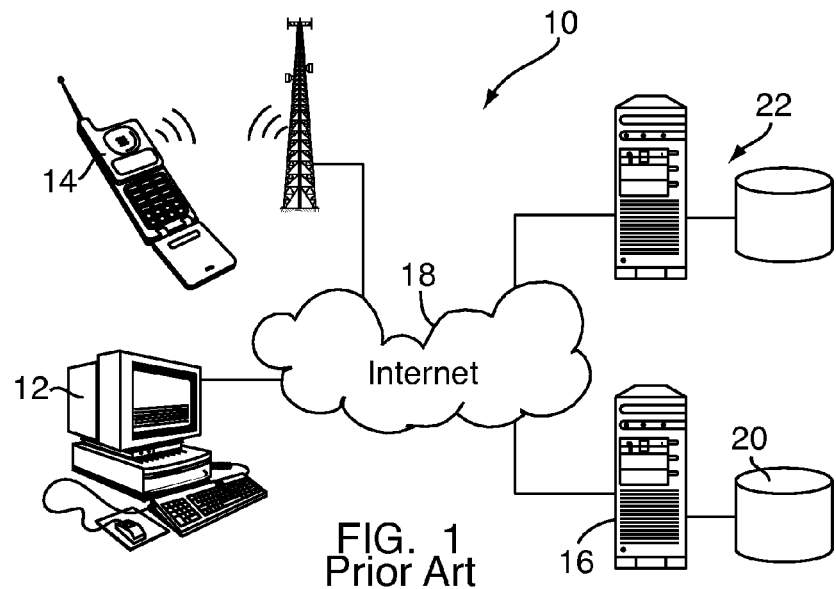
FIG. 1 illustrates a networked system as known in the art.

Referring to FIG. 1, the method of the present invention is a software program performed over a networked system 10. As known in the art, the networked system 10 includes user terminals, such as a computer 12 or a mobile terminal 14, that interface with a user and are in communication with a networked server 16 over an Internet 18. The networked server 18 includes a processing unit for executing the program and memory (i.e., a database 20) in communication with the processing unit. The networked server 16 is also in communication with third party servers and databases 22, which supplement the memory of the networked server 16.

Preferably, the program is performed using the processing unit of the networked server 16 (i.e., one network entity of the networked system 10) with the user terminals interfacing with the user, as needed. However, the present invention also conceives of modular versions of a program that are configured to operate on other entities of the networked system 10, such as the user terminals and, potentially, in isolation.

Figure 2:
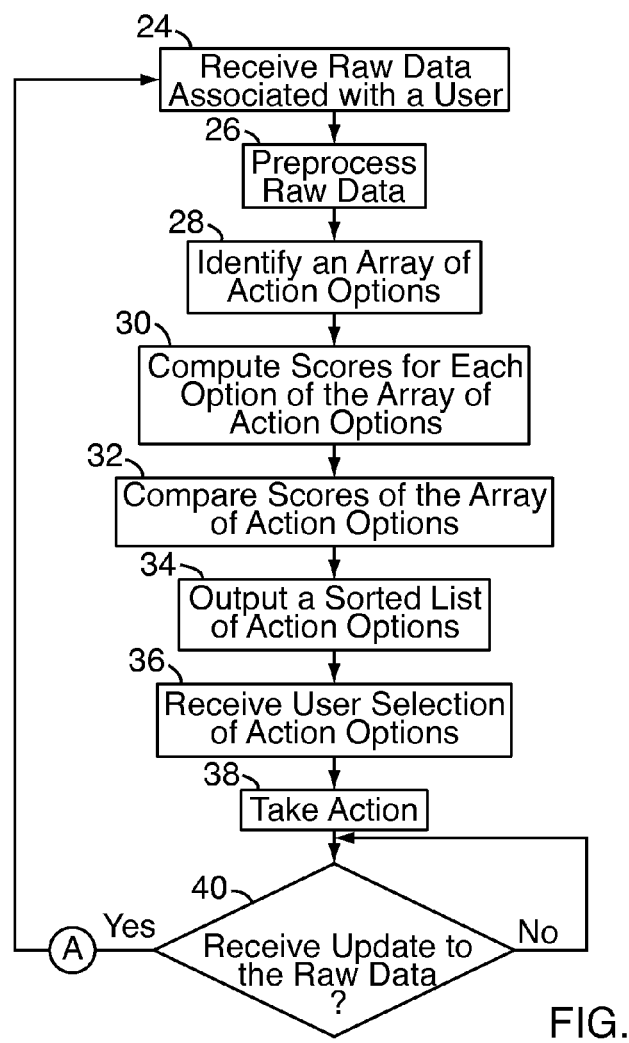
FIG. 2 illustrates a flow chart of an overview of a method of decision making according to a first preferred embodiment of the present invention.

Referring to FIG. 2, a flow chart of an overview of the method of the present invention is shown. In general, raw data associated with the user is received (box 24) (see FIGS. 3-5). The raw data is, then, pre-processed (box 26) (see FIG. 6). Based on the pre-processed data, an array of action options is identified (box 28) (see FIG. 7). Scores are computed (box 30) for each option of the array of action options (see FIGS. 8-10). Then, the scores of the array of action options are compared (box 32) to a minimum threshold and to each other (see FIGS. 11-15). A sorted list of the action options based on the comparison is outputted (box 34) to the user (see FIG. 16). A selection is received (box 36) indicating which of the action options the user would like to pursue (see FIG. 17). Action is, then, taken (box 38) (see FIG. 18). If an update to the raw data associated with the user is received (box 40), the method returns to the step of receiving raw data (box 24) (see FIG. 5).

Figure 3:
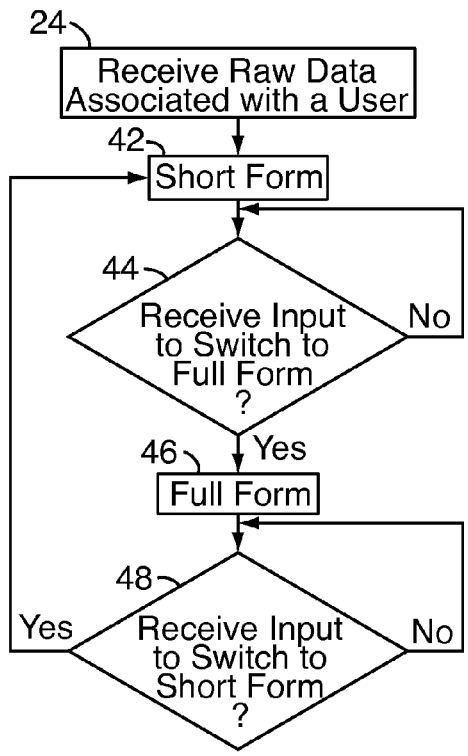
FIG. 3 illustrates a flow chart of a process of receiving raw data from a user terminal including the selection of a short form or a full form according to the method of FIG. 2.

Referring to FIG. 3, once the method of the present invention is invoked, the method commences by receiving (box 24) raw data associated with the user. The raw data can include basic information about the user, such as a name, an address, a phone number, an e-mail address and the like; a unique identifier of the user, such as a social security number; and information specific to a situation of the user.

Preferably, a short form (box 42) is displayed to the user on the user terminal, through which the user can input information as raw data. The short form (box 42) includes a prompt or an action button that, if triggered (box 44), switches over to a full form (box 46). The full form (box 46) includes a similar prompt or action button that, if triggered (box 48), switches over to the short form (box 42).

Figure 4:
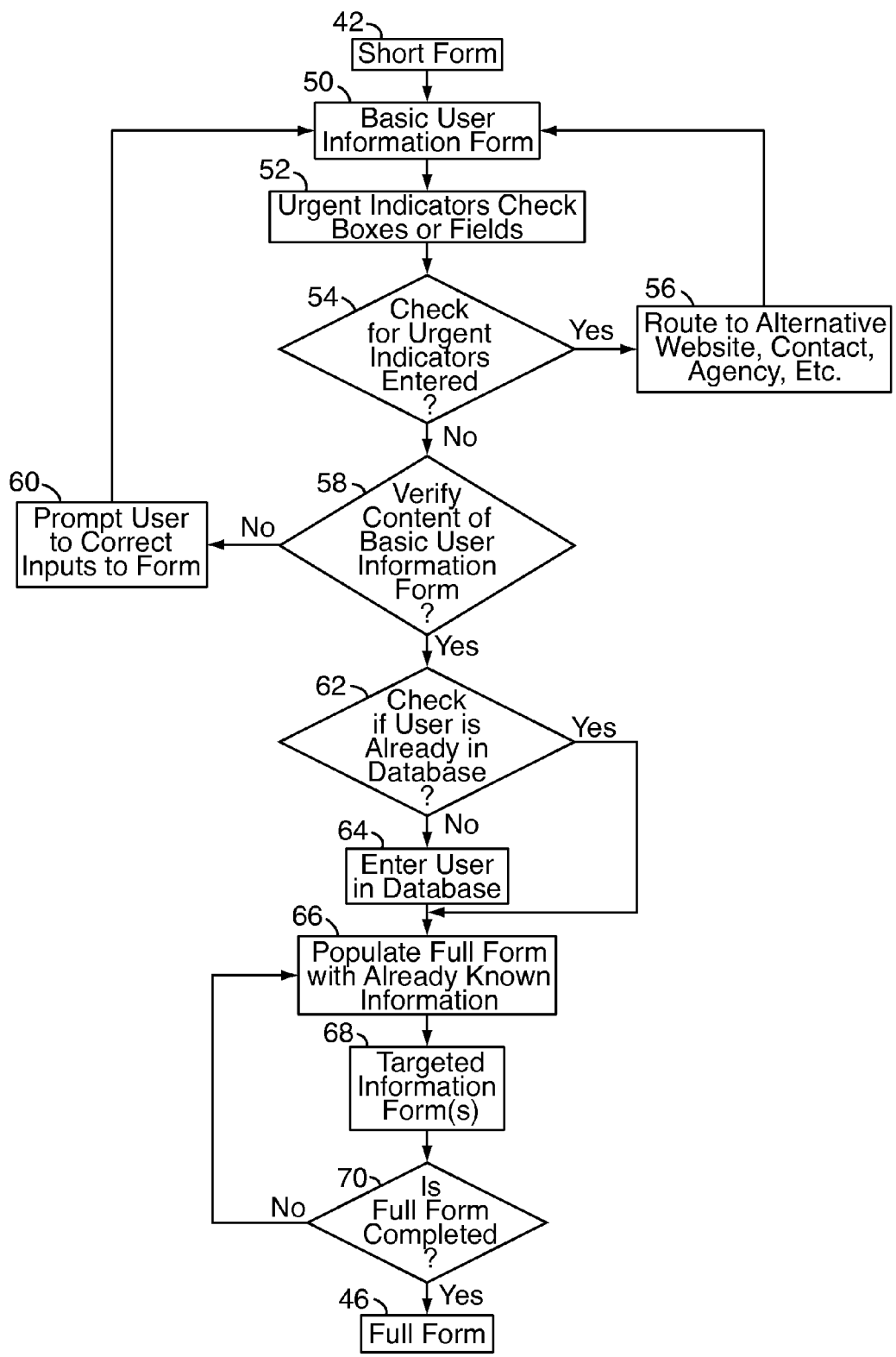
FIG. 4 illustrates a flow chart of a process of receiving information using the short form of FIG. 3.

Referring to FIG. 4, the short form (box 42) commences with a basic user information form (box 50). The basic user information form (box 50) includes entry boxes for such items as a user name, address and contact information, unique identifiers (i.e., social security number), and the like.

The short form (box 42) also includes check boxes or fields for urgent indicators (box 52). The urgent indicators (box 52) include Terms and Conditions that the user must agree to in order to proceed with the method, geographic limitations (e.g., the user must be a United States citizen or resident to proceed with the method), and the like.

Once the user is ready to proceed, the urgent indicators (box 52) are checked (box 54). If any of the urgent indicators (box 52) indicate that immediate action needs to be taken, the user is routed (box 56) to an alternative website, contact, agency or the like who can address the user's situation. For example, if the user enters a Canadian address but the method is limited to United States citizens, the user is routed to a corresponding Canadian embodiment of the method and, more specifically, to a corresponding short form of the Canadian embodiment. The corresponding Canadian embodiment of the method includes a different set of laws and score computation algorithms that are specific to Canada, its laws, companies, service providers and the like.

If no urgent indicators (box 52) are identified, the content of the basic user information form (box 50) is verified (box 58) for completeness and accuracy. For instance, the basic user information form (box 50) is verified to ensure that the user has entered a value for each required field and that the value entered is of the appropriate format (e.g., 10-digit phone number including area code or an e-mail address in the format "_@_._"). If any errors are identified, the user is prompted (box 60) (i.e., transmitted a message and asked to respond) to correct the data inputted to the basic user information form (box 50).

Once the content of the basic user information form (box 50) is verified, the method checks (box 62) if the user is already in the database. If the user is not identified in the database (i.e., the user is new), then the user is entered (box 64) in the database.

The full form (box 46) is populated (box 66) with the information entered in the basic user information form (box 50) and the urgent indicators (box 52) and targeted information forms (box 68) are transmitted to the user, soliciting additional information in an organized user-friendly manner based on previously provided information.

For instance, the targeted information forms (box 68) are custom generated to focus on (i.e., target) the additional information that is relevant to the decision making process, and only the relevant additional information, based on the information provided in response to previous inquiries. As a result, the short form (box 42) inquires about and, in response, gathers the minimum amount of information that is required to make an informed decision.

The complexity (or simplicity) of the short form (box 42) can be varied based on the expected level of sophistication of the user.

Accordingly, the short form (box 42) guides the user through the information gathering process by soliciting yes/no responses or minimum-complexity data entry to simple questions in order to collect the additional information that is required to make an informed decision.

After each targeted information form (box 68) is filled out, the content of the full form (box 46) is checked for completion (box 70). In this context, "completion" means that the full form (box 46) contains all relevant information that is required to make an informed decision. If the full form (box 46) is not complete (i.e., more information is still required), then the information responsive to the targeted information forms (box 68) is populated (box 66) into the full form (box 46) and additional targeted information forms (box 68) are generated.

However, once the full form (box 46) is complete (i.e., an informed decision can be made based on the entered information), then the user is switched over to the full form (box 46) mode.

Figure 5:
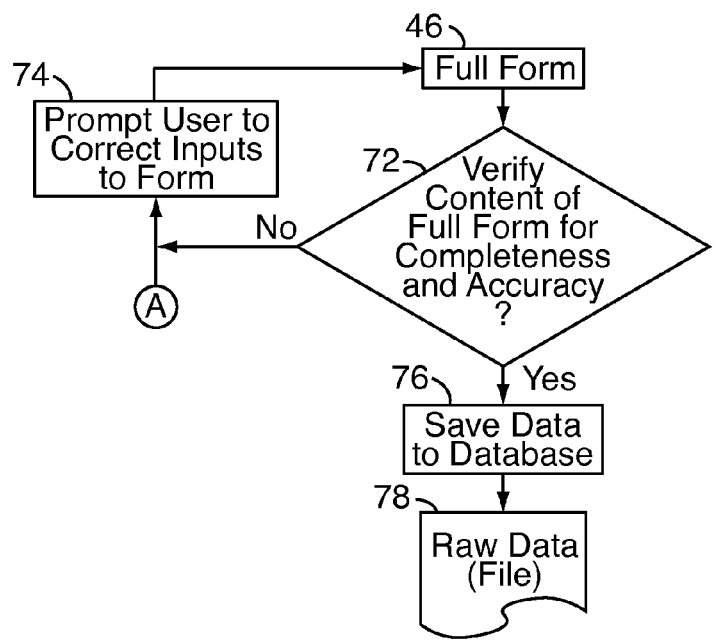
FIG. 5 illustrates a flow chart of a process of receiving information using the full form of FIG. 3.

Referring to FIG. 5, the full form (box 46) lists all fields of inquiry and information associated with the user. The user can view all of the fields of inquiry in the full form (box 46) and enter and edit information, as needed. Once the user is ready to proceed, the content of the full form (box 46) is verified (box 72) for completeness and accuracy. Similar to above, if the full form (box 46) is incomplete or contains errors, the user is prompted (box 74) to correct the inputted information.

However, if the full form (box 46) is complete and accurate, the information in the full form (box 46) is saved (box 76) to the database as a Raw Data file (box 78).

Figure 6:
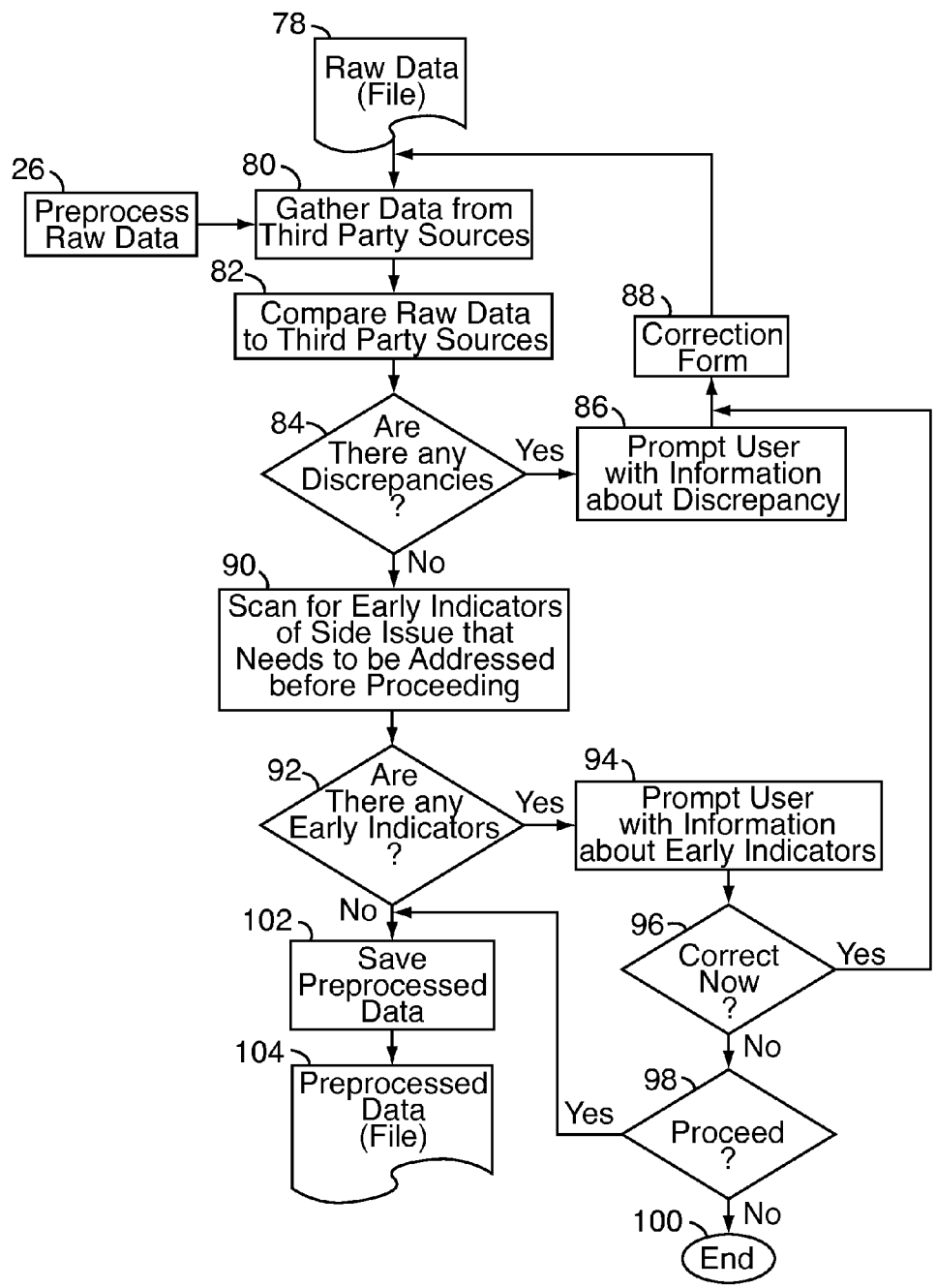
FIG. 6 illustrates a flow chart of a process of pre-processing raw data according to the method of FIG. 2.

Referring to FIG. 6, the raw data is pre-processed (box 26) by gathering (box 80), based on the Raw Data file (box 78), additional data from third party sources, such as the third party server and database, to supplement the data received from the user. The raw data is compared (box 82) to the data gathered from the third party sources to identify discrepancies. If any discrepancies are identified (box 84), the user is prompted (box 86) with information about the discrepancies and transmitted a correction form (box 88). Using the correction form (box 88), the user can select which data to utilize (i.e., the raw data, the third party data or other data), enter new information, declare an override, and the like.

If no discrepancies are identified or the discrepancies are resolved, the data is scanned (box 90) for early indicators of side issues that need to be addressed before proceeding, such as the entry of an excessively large or small data value in comparison to a related data value (e.g., $1,000,000 of assets but only $10 of liquid assets). The scanning process identifies data that is formatted correctly and which may even be corroborated by third party data sources, but which deviates from ordinary expectations, such as outliers, based on similar information of a peer group (i.e., demographic comparison) of the user. For instance, the scanning process identifies data that fails a verification check based on internal data and calculation metrics, and/or that indicates the user has invoked the wrong decision making process (i.e., the user is asking the wrong questions).

If any early indicators are identified (box 92), the user is prompted (box 94) with information about the early indicators and asked (box 96) to correct or address the early indicator, now. If the user would like to correct the early indicator, then the user is transmitted another correction form (box 88).

If not, the user is asked (box 98) whether he would like to proceed in spite of the early indicators. If the user does not want to proceed at this time, the method ends (box 100).

Otherwise, the pre-processed data is saved (box 102) and a Pre-Processed Data file (box 104) is generated.

Figure 7:
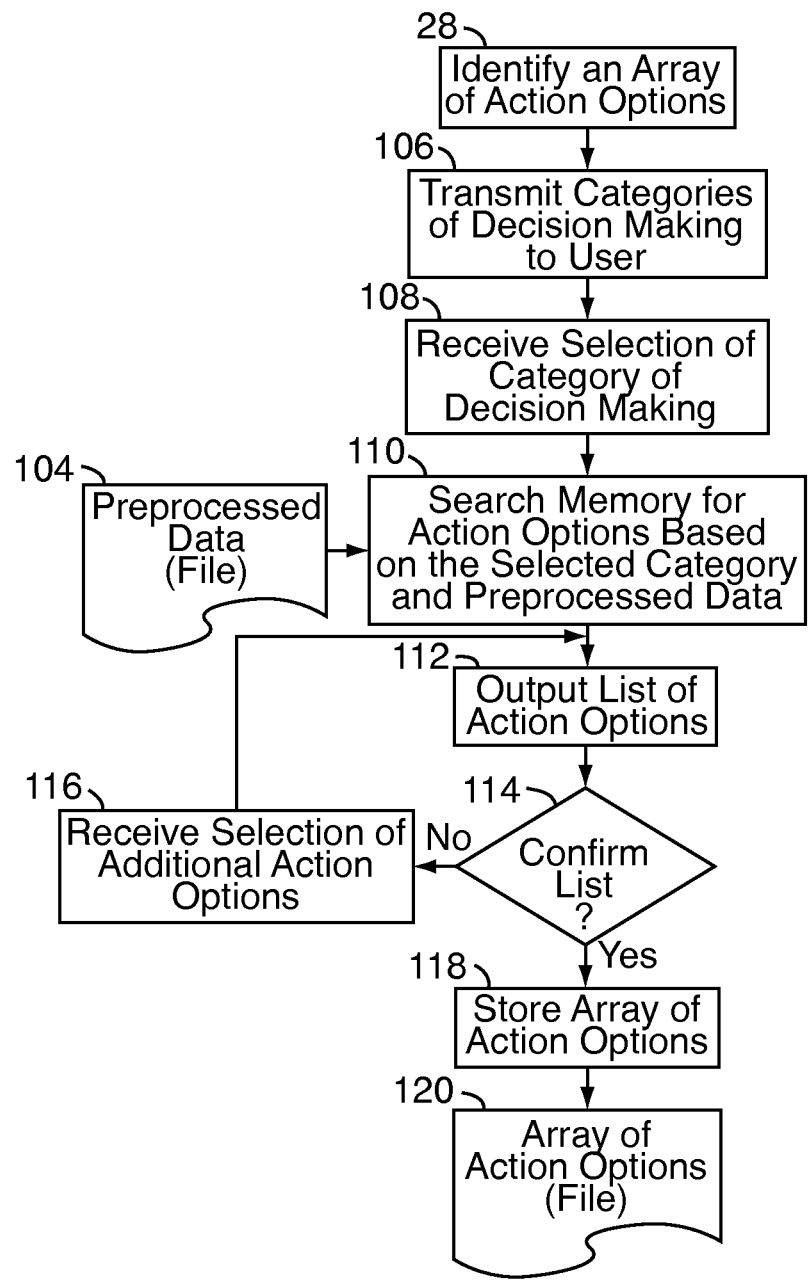
FIG. 7 illustrates a flow chart of a process of identifying an array of action options according to the method of FIG. 2.

Referring to FIG. 7, the array of action options is identified (box 28). Where the method is configured to handle numerous decision making protocols, a list of categories of decision making are transmitted (box 106) to the user. The user's selection from the list of categories is received (box 108), indicating the category of decision making that the user wishes to consider.

For instance, the memory of the networked server is searched (box 110) for action options based on the selected category or categories of decision making and the Pre-processed Data file (box 104).

As a result of the search, a list of action options is outputted (box 112) or displayed to the user. The user is prompted (box 114) to confirm the list of action options. If the user disagrees with the list of action options, the user can select additional action options. The user's selection is received (box 116) and another list of action options is outputted (box 112).

Otherwise, if the user confirms the list of action options, the array of action options is stored (box 118) in memory and a Array of Action Options file (box 120) is generated. Generally speaking, the Array of Action Options file (box 120) acts as a score card and repository for information regarding all relevant action options that the user might consider.

Where the method is configured to address a single finite decision making protocol, the Array of Action Options file (box 120) is simply gathered by a look-up to memory. In effect, the user's initiation of the finite purpose decision making protocol acts as the selection of decision making categories and the confirmation of the list of action options.

Identifying the list of action options provides the user with a starting point for decision making Based on the identified list of action options, the user can work toward identifying a resolution, even if the user was unaware of an action option and, therefore, would have never known to pursue the action option.

It should be appreciated that, in one aspect of the method of the present invention, the knowledge dilemma is solved in a cost effective and timely manner by directing the user to the list of action options that can address the situation of the user, irrespective of the user's expertise, knowledge or preferences.

In an alternative approach, the method of the present invention can be carried out on a predefined list of action options provided by the user, where the user desires an identification of the optimal action option from the list of action options in view of numerous factors that may influence the decision making process.

Figure 8:
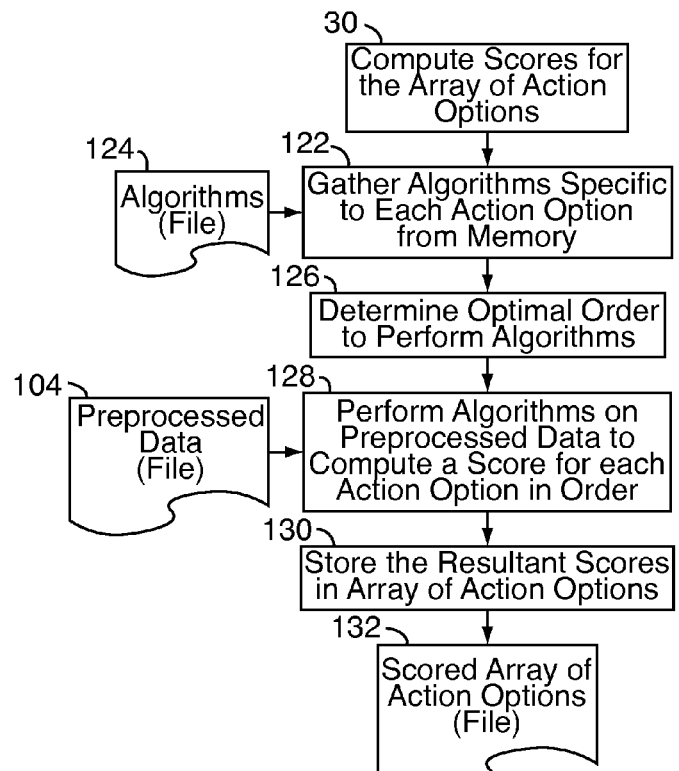
FIG. 8 illustrates a flow chart of a process of computing scores for the array of action options according to the method of FIG. 2.

Referring to FIG. 8, scores are computed (box 30) for the array of action options. As an initial matter, algorithms are gathered (box 122) specific to each action option. In particular, Algorithm files (box 124) from memory are gathered or, at least, interrogated and information associated with the Algorithm files (box 124) is extracted. Based on the information associated with the Algorithm files (box 124), an optimal order for performing the algorithms is determined (box 126). Preferably, the optimally ordered grouping of algorithms (i.e., an action option scoring model) is saved for later reference.

Once the order is determined, the algorithms are performed (box 128) (i.e., executed) using the Pre-processed Data file (box 104) to compute the score for each respective action option.

The scoring algorithms, protocols and routines are specific to each option and leverage specialized knowledge and expertise directed to the action option. The resultant scores are normalized across all action options and weigh the eligibility of the user to pursue the action option with the likely outcome of pursuing the action option, based on the corresponding algorithms of each action option. For example, the scores might be confined to a defined score range of one (1) (i.e., a bad option that is not worth pursuing) to one hundred (100) (i.e., an optimal option that is very worth pursuing).

The score associated with each action option can vary within an independent (i.e., potentially different) sub-range of the defined score range. For example, a first action option calculated according to a first algorithm can produce scores between one (1) and sixty (60), whereas a second action option calculated according to a second algorithm can produce scores between twenty (20) and ninety (90).

However, when two action options are equally pertinent to the user (i.e., the user is eligible to pursue each action option and the likely outcome is comparable), the two action options will have a substantially similar score. This is true whether the two action options are both unlikely options that the user may not even be eligible to pursue (e.g., scores of 4 and 7, respectively), acceptable options that are worthy of consideration (e.g., scores of 53 and 56, respectively) or exceptional options that warrant immediate consideration (e.g., scores of 96 and 97, respectively).

The resultant scores are stored (box 130) in the Array of Action Options file (box 120), hereinafter referred to as the Scored Array of Action Options file (box 132). In addition to the score, other data computed while performing the scoring algorithms, protocols and routines is stored, such as indicia of the user's eligibility to pursue the action option, the likely outcome of pursuing the action option, and any important timing considerations.

Figure 9:
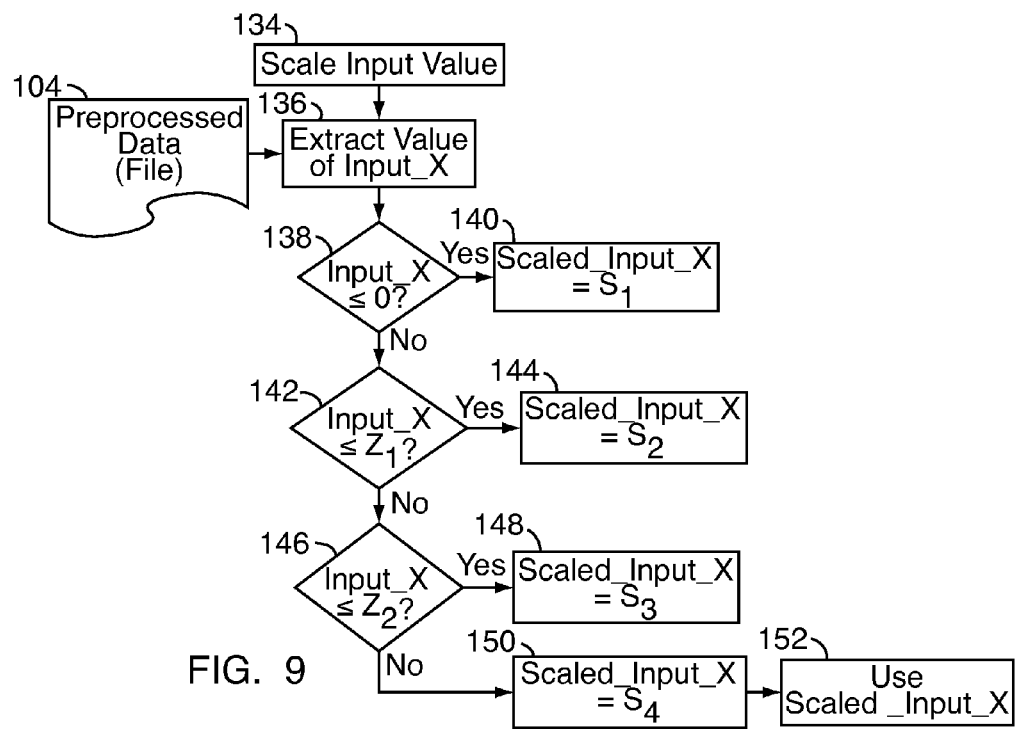
FIG. 9 illustrates a flow chart of a scaling operation that is particularly useful in conjunction with the process of computing scores according to FIG. 8.

For exemplary purposes, two protocols or operations that have particular utility in the context of the method of the present invention will be described hereinafter. Referring to FIG. 9, a scale input value operation is shown (box 134). According to the scale input value operation (box 134), a value of Input_X is extracted (box 136) from the Preprocessed Data file (box 104). If the value of the Input_X falls within certain ranges, a Scaled_Input_X is set based on the range containing Input_X. For instance, if it is determined (box 138) that the Input_X is less than or equal to zero (0), the Scaled_Input_X is set (box 140) equal to S1.

Otherwise, if it is determined (box 142) that the Input_X is less than or equal to Z1, the Scaled_Input_X is set (box 144) equal to S2.

Otherwise, if it is determined (box 146) that the Input_X is less than or equal to Z2, the Scaled_Input_X is set (box 148) equal to S3.

Or else, the Scaled_Input_X is set (box 150) equal to S4. The method then proceeds using (box 152) the value of the Scaled_Input_X rather than the value of the Input_X.

It should be appreciated that the scale input value operation (box 134) that is shown in FIG. 9 is, in effect, a 4-item series approximation of the mathematical relationship of Input_X to Scaled_Input_X. If processing capacity and timing constraints permit, more complex protocols, such as multi-factorial algorithms, can be utilized to more accurately reflect the relationship of Input_X to Scaled_Input_X. Similarly, a larger series approximation (i.e., having 10- or 20-items) can also be used.

Figure 10:
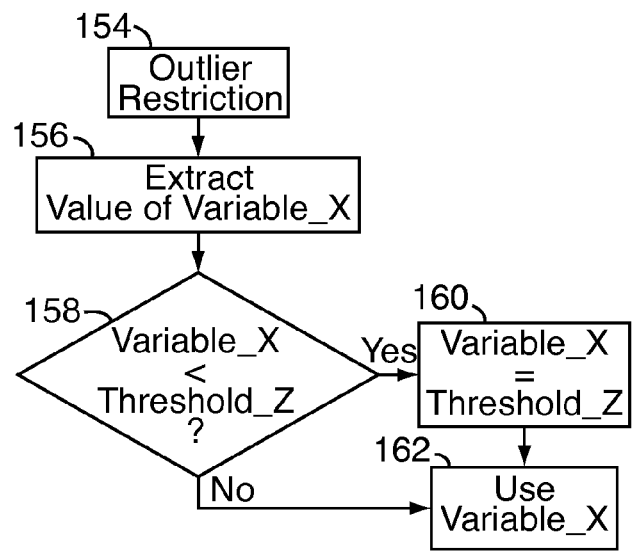
FIG. 10 illustrates a flow chart of an outlier restriction operation that is particularly useful in conjunction with the process of computing scores according to FIG. 8.

Referring to FIG. 10, an outlier restriction operation is shown (box 154). According to the outlier restriction operation (box 154), a value of Variable_X is extracted (box 156), for instance, from a file or from the result of a calculation of one of the algorithms or protocols. It is then determined (box 158) if the value of Variable_X is less than a Threshold_Z, and, if so, the Variable_X is set (box 160) equal to the Threshold_Z. Then, the method proceeds using the value of the Variable_X as restricted to eliminate outlier values.

It should be appreciated that the outlier restriction operation can be performed to limit the value of Variable_X to a maximum value, as well.

Figure 11:
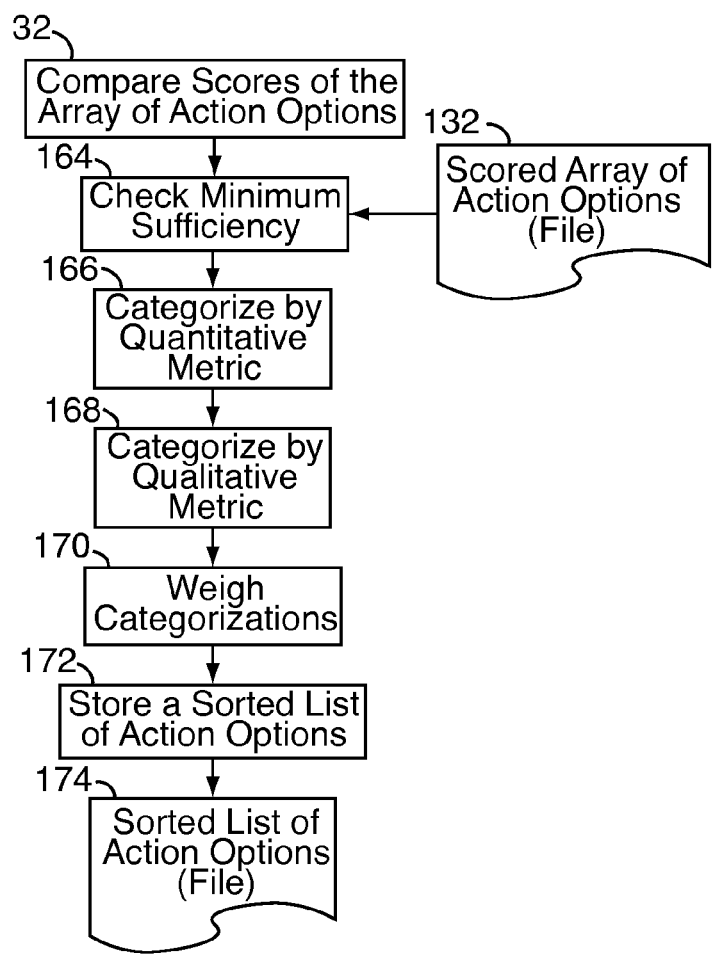
FIG. 11 illustrates a flow chart of a process of comparing scores of an array of action options according to the method of FIG. 2.

Referring to FIG. 11, an overview of the step of comparing (box 32) scores of the array of action options is shown. Initially, the minimum sufficiency of the scores is checked (box 164) using the Scored Array of Action Options file (box 132). Next, the scores are categorized (box 166) by a quantitative metric. The scores are categorized (box 168) by a qualitative metric. The categorizations are weighed (box 170), and a sorted list of action options is generated and stored (box 172), such as a Sorted List of Action Options file (box 174).

Figure 12:
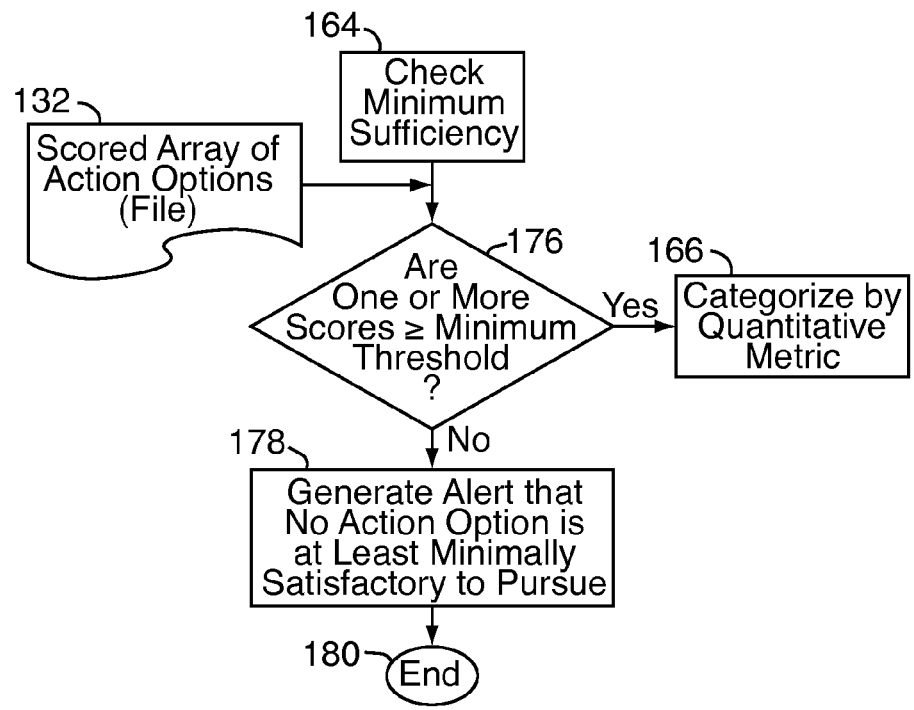
FIG. 12 illustrates a flow chart of a process of checking the minimum sufficiency of the process of comparing scores of FIG. 11.

Referring to FIG. 12, the minimum sufficiency of the scores is checked (box 164) by determining (box 176) if one or more score of the array of action options is greater than or equal to a minimum threshold, using the Scored Array of Action Options file (box 132). For example, for a score range of one (1) to one hundred (100), the minimum threshold value might be set to a value of fifty (50).

If none of the scores of the array of action options is greater than or equal to the minimum threshold, then an alert is generated (box 178) for the user, indicating that no action option is at least minimally sufficient to pursue. The alert includes a sorted list of at least one of the action options that has the highest score. Preferably, the alert also includes a list of parties who provide the action options, as discussed below. Then, the method ends (box 180).

Alerting the user that none of the action options is at least minimally sufficient but still providing the user with a list of action options that had the highest scores (i.e., the action options that are almost, or, at least, most, worth pursuing) provides the user with an expectation of his chances for resolving his situation using the identified action options as well as a resource to commence subsequent review of how to best proceed. It should be appreciated that, in one aspect of the method, the knowledge dilemma is solved in a cost effective and timely manner by alerting the user of a negative result of the decision making process (i.e., that none of the action options is sufficiently meritorious), which can otherwise be difficult to identify, particularly, without expending significant effort and resources to analyze and rule-out each action option.

In addition, alerting the user of which options are almost worth pursuing enables the user to identify and, then, monitor triggers (i.e., monetary, timing and other concerns) that might alter the review of the action options. It should also be appreciated that, in one aspect of the method, the knowledge dilemma is solved in a cost effective and timely manner by alerting the user of a best of the negative results, which can be difficult to identify, particularly, without expending significant effort and resources to analyze and rule-out each action option.

Otherwise, if at least one of the scores is greater than or equal to the minimum threshold, the scores are categorized (box 166) by a quantitative metric, such as a quantitative proximity to the highest scoring action option.

Figure 13:
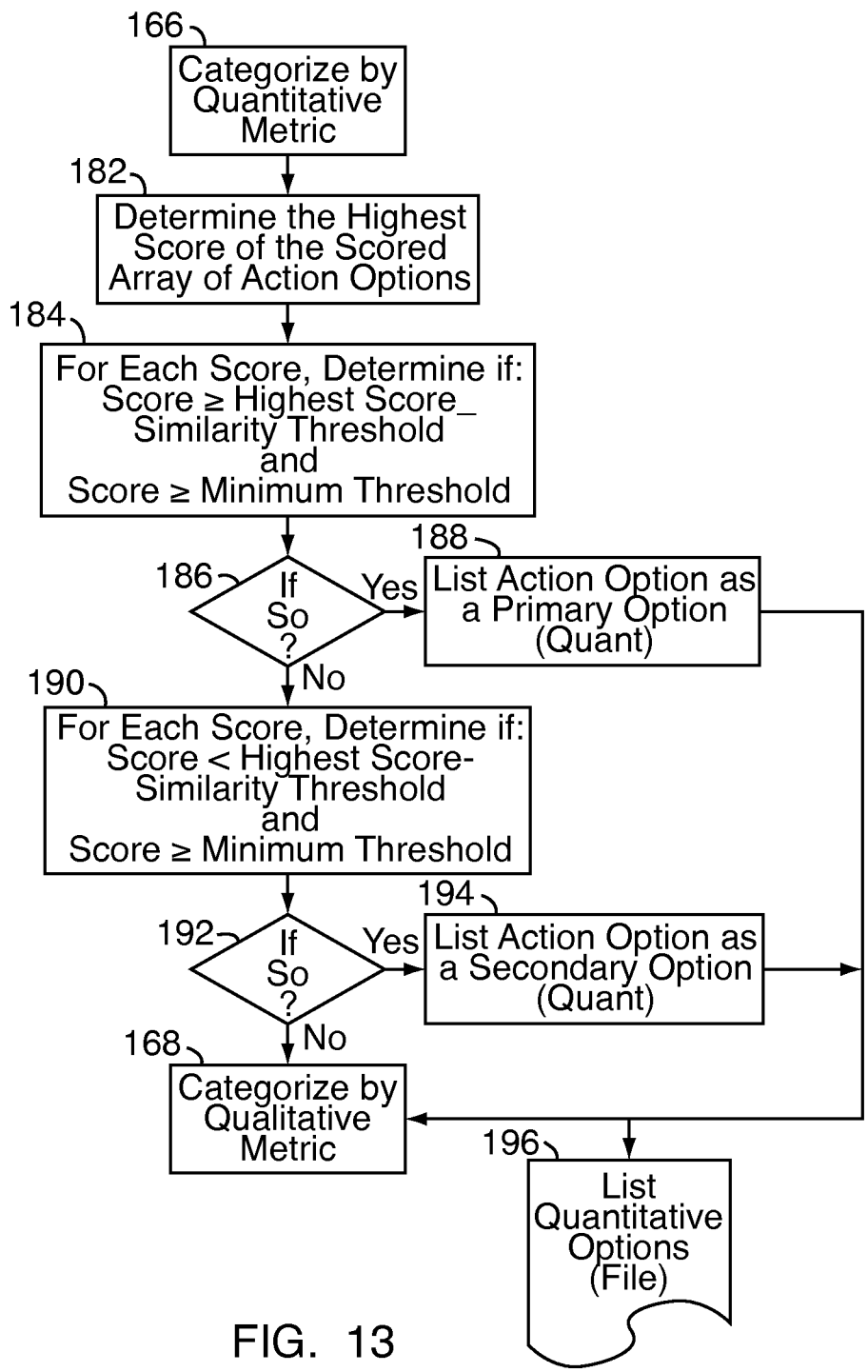
FIG. 13 illustrates a flow chart of a process of categorizing scores by quantitative proximity according to the process of comparing scores of FIG. 11.

Referring to FIG. 13, the scores are categorized (box 166) by a quantitative metric by determining (box 182) a highest score for the scored array of action options. The highest score is generally indicative of the user's best action option(s) to pursue.

Then, for each score, it is determined (box 184) whether the score is greater than or equal to the highest score minus a similarity threshold and the score is greater than the minimum threshold. For example, for a score range of one (1) to one hundred (100), the similarity threshold might be set to a value of ten (10), representing a sufficient proximity to the highest score to warrant similar treatment.

If the determination conditions are satisfied (box 186), the action option is listed (box 188) or otherwise annotated in the Scored Array of Action Options file (box 132) as a primary option (quantitative).

Otherwise, it is determined (box 190) whether the score is less than the highest score minus the similarity threshold and the score is greater than or equal to the minimum threshold. If the determination conditions are satisfied (box 192), the action option is listed (box 194) as a secondary option (quantitative).

The resultant listings are saved and a List Quantitative Options file (box 196) is generated. Then, the scores are categorized (box 168) by a qualitative metric, such as a qualitative proximity to the highest scoring action option.

Figure 14:
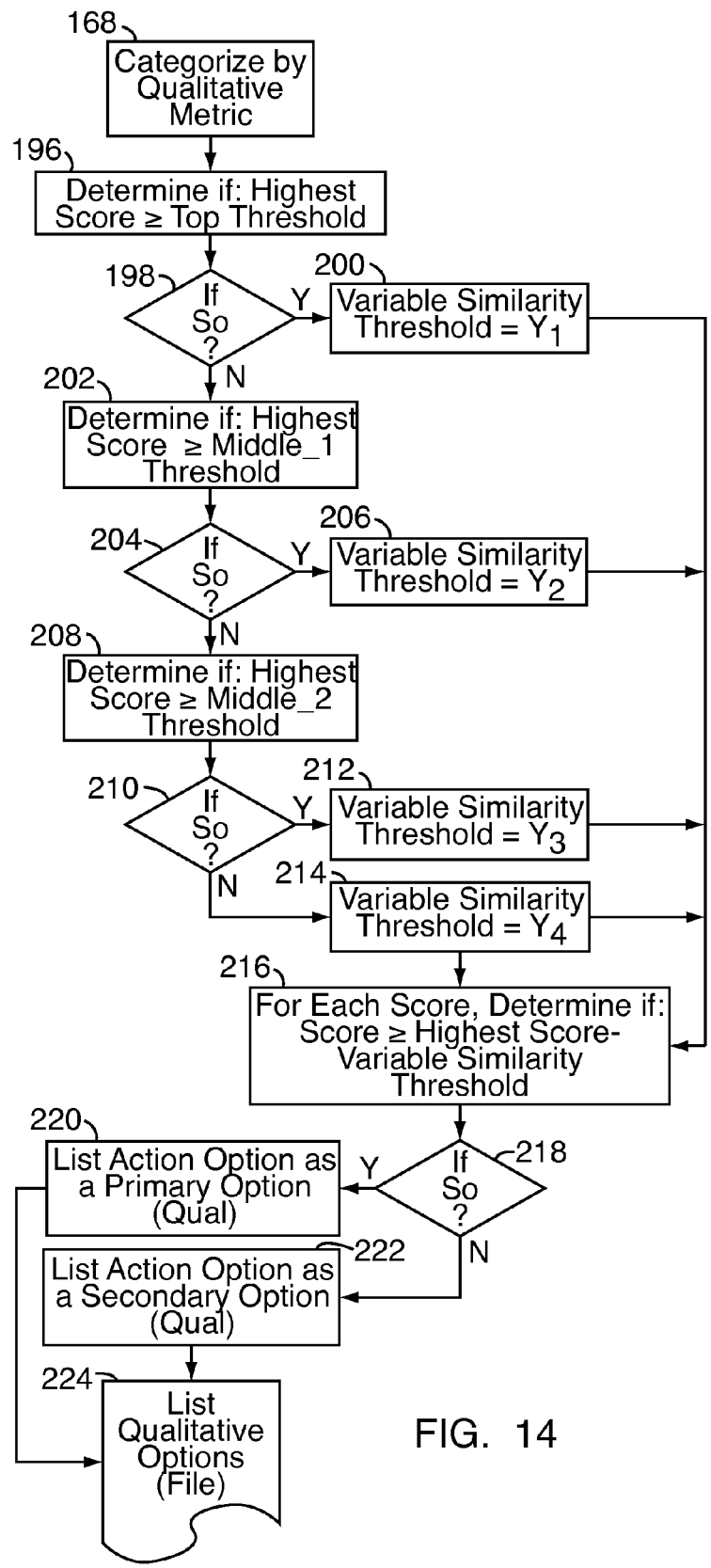
FIG. 14 illustrates a flow chart of a process of categorizing scores by qualitative proximity according to the process of comparing scores of FIG. 11.

Referring to FIG. 14, the scores are categorized (box 168) by a qualitative metric by determining (box 196) whether the highest score is greater than or equal to a top threshold. The top threshold is indicative of an exceptional option. If the determination condition is satisfied (box 198), a variable similarity threshold is set (box 200) equal to Y1. For example, on a score range of one (1) to one hundred (100), the top threshold might be set to ninety (90) and the Y1 might be set to five (5).

Otherwise, it is determined (box 202) whether the highest score is greater than or equal to a middle_1 threshold, and, if so (box 204), the variable similarity threshold is set (box 206) equal to Y2. For example, the middle_1 threshold might be set to eighty (80) and the Y2 might be set to eleven (11).

Otherwise, it is determined (box 208) whether the highest score is greater than or equal to a middle_2 threshold and, if so (box 210), the variable similarity threshold is set (box 212) equal to Y3. For example, the middle_2 threshold might be set to eighty (80) and the Y3 might be set to eighteen (18).

Or else, the variable similarity threshold is set (box 214) equal to Y4. For example, the Y4 might be set to twenty-seven (27).

For each score, it is determined (box 216) if the score is greater than or equal to the highest score minus the variable similarity threshold, and, if so (box 218), the action option is listed (box 220) as a primary option (qualitative).

Or else, the action option is listed (box 222) as a secondary option (qualitative).

The listings are stored and a List Qualitative Options file (box 224) is generated.

Figure 15:
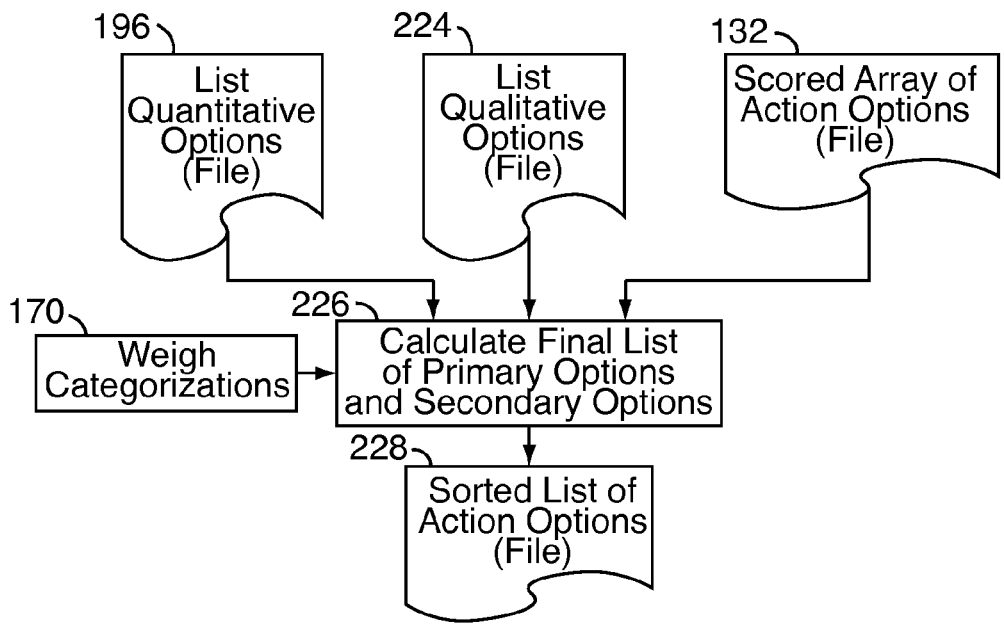
FIG. 15 illustrates a flow chart of a process of weighing the categorizations of scores according to the process of comparing scores of FIG. 11.

Referring to FIG. 15, the categorizations are weighed (box 170) by calculating (box 226) a final list of primary and secondary options based on the List Quantitative Options file (box 196), the List Qualitative Options file (box 224) and the Scored Array of Action Options file (box 132). The algorithms used to weigh the final list leverage specialized knowledge and expertise regarding which options the user should pursue given the nature of the decision being made and the likelihood and significance of clumping or grouping that occurs at different scores for the decision being made.

For example, a simple weighing algorithm might give priority listing to primary options, from either list, then secondary options, from either list, with some options receiving no listing. However, the relative scoring of two or more of the action options may be indicative of an insight into the situation of the user. Alternatively, two or more of the action options may be mutually exclusive and this mutual exclusivity must be addressed.

The final list is stored and a Sorted List of Action Options file (box 228) is generated.

Figure 16:
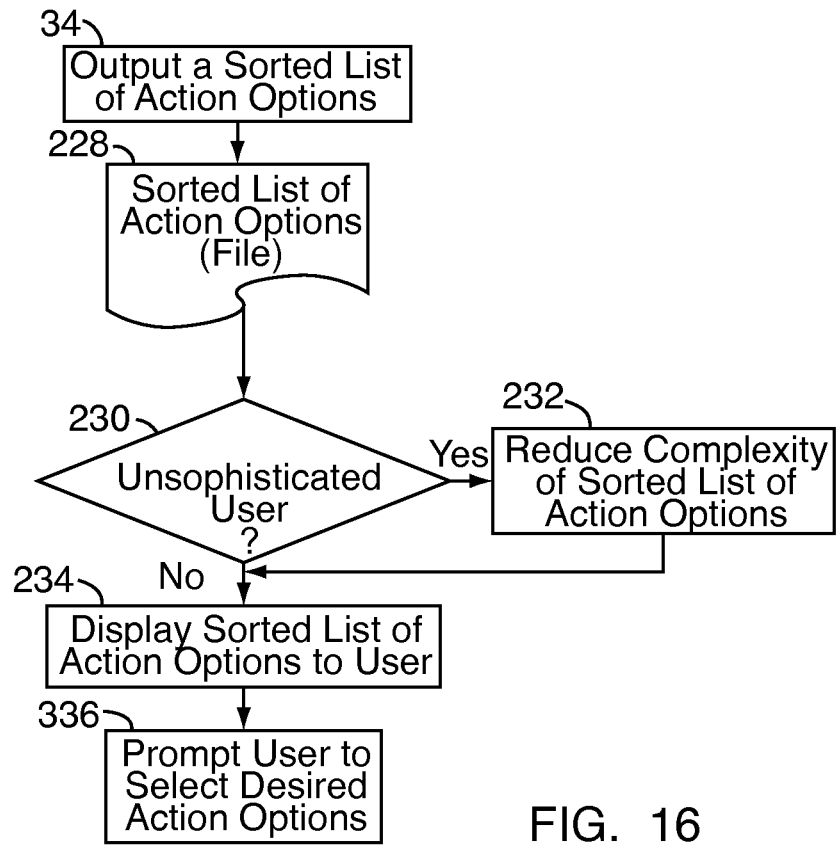
FIG. 16 illustrates a flow chart of a process of outputting a sorted list of action options according to the method of FIG. 2.

Referring to FIG. 16, the sorted list of action options is outputted (box 34). Generally, the Sorted List of Action Options file (box 228) is transmitted to the user terminal of the user for review.

However, before the sorted list of action options is transmitted, it is determined (box 230) whether the expected user is unsophisticated, and, if so, the complexity of the sorted list of action options is reduced (box 232).

Preferably, the sorted list of action options is variably reduced in complexity based on the expected level of sophistication of the user. For example, for a sophisticated user, the sorted list of action options is not filtered or otherwise reduced in complexity and includes all of the data underlying the sorting of the list of action options including any graphical presentations of the data. For a moderately sophisticated user, the sorted list of action options is filtered to remove the raw data, but graphical presentations of the data are included. In contrast, for an unsophisticated user, the sorted list of action options is reduced to a presentation of the title of the primary options, the title of the secondary options, and an indicia (i.e., highlighting or a font-change) of the primary options and the secondary options that have been automatically selected by the program.

Then, the sorted list of action options is displayed (box 234) on the user terminal, and the user is prompted (box 236) to make a selection of the action options that the user would like to pursue.

By variably reducing the complexity of the sorted list of action options, the user's selection of the action options that he would like to pursue is greatly enhanced. The reduction of complexity demystifies and facilitates the decision making process, particularly where the user does not appreciate the nature of and logistical issues with pursuing the underlying action options. It should be appreciated that, in one aspect of the method of the present invention, the knowledge dilemma is solved in a cost effective and timely manner by presenting the user with a simplified list of the top options in a format that can be readily understood by the user, thereby facilitating the decision making process.

Figure 17:
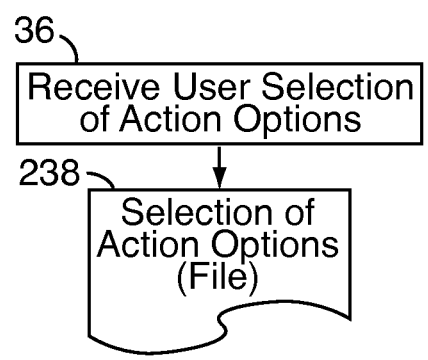
FIG. 17 illustrates a flow chart of a process of receiving user selection of action options according to the method of FIG. 2.

Referring to FIG. 17, the selection of action options from the user is received (box 36), for instance, in the form of a Selection of Action Options file (box 238).

Figure 18:
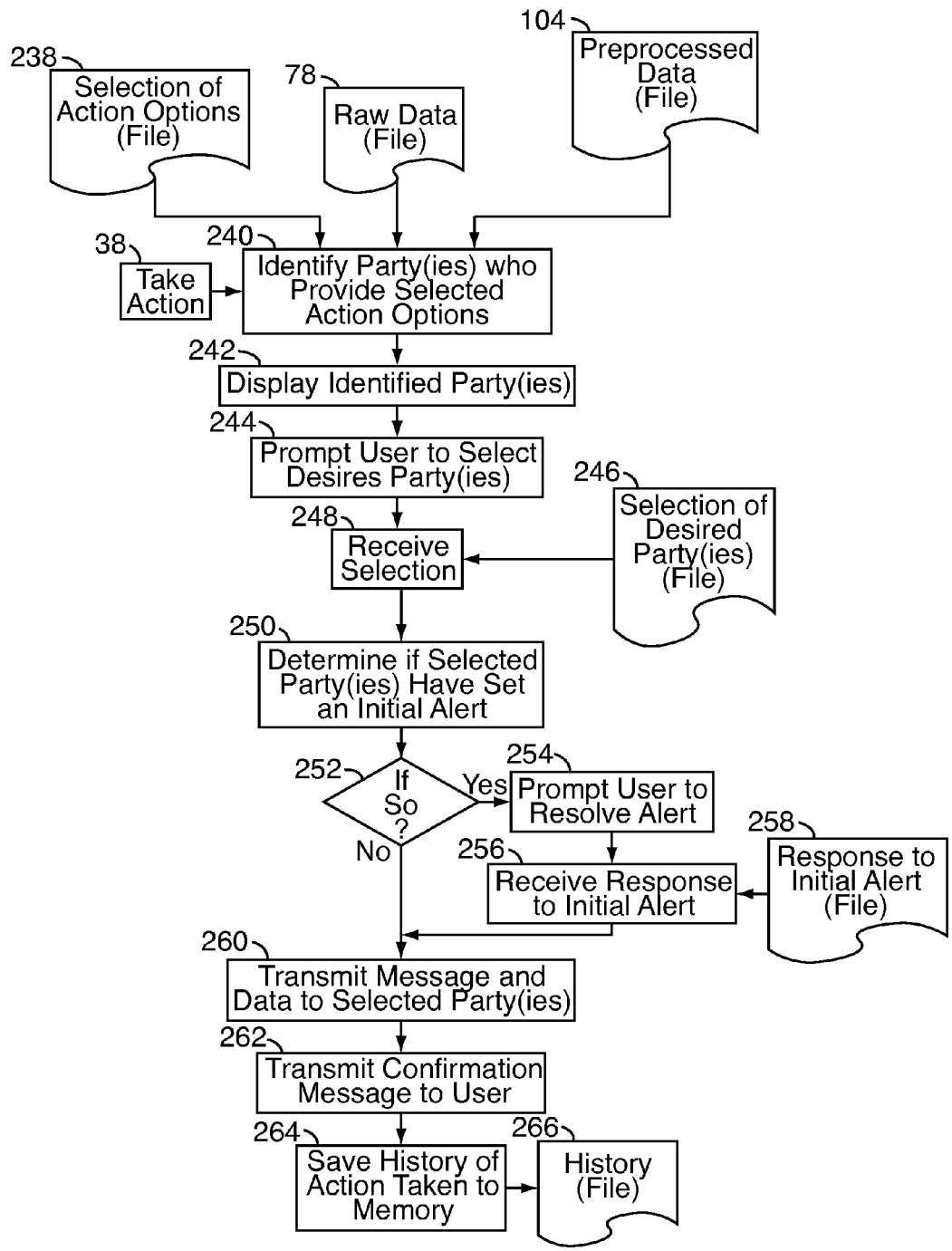
FIG. 18 illustrates a flow chart of a process of taking action according to the method of FIG. 2.

Referring to FIG. 18, action is taken (box 38). Based on the Selection of Action Options file (box 238) and the Raw User Data file (box 78), or alternatively the Pre-processed Data file (box 104), parties are identified (box 240) who provide the selected action options. The parties can be organized or further filtered based on levels of specialization, reputation and geographic proximity to the user. The identification is performed for each selected action option based, in part, on the location of the user and corresponding geographic territory of the service provider. For example, mandatory state licensing or certification may restrict eligible parties based on the state of residency of the user.

Once identified, the parties are displayed (box 242) to the user.

The user is then prompted (box 244) to select the party or parties whom the user would like to contact. Once the user submits a selection, a Selection of Desired Parties file (box 246) is received (box 248).

It is determined (box 250), for each party, if the selected party has set any initial alerts. For example, if a selected party is a law firm or another organization with stringent ethical and privacy requirements or if the selected party would like to provide the user with a message regarding follow-up procedures, price quotes and otherwise set expectation levels (i.e., that there is no obligation to sign up with the party), the selected party may be required by law to provide the user with an initial alert relating to such issues before proceeding.

Even if the selected party is not a law firm or another organization with stringent ethical and privacy requirements, the selected party may still want to prompt the user to confirm and/or authorize a transmission to the selected party.

Preferably, according to one (i.e., pro-privacy) embodiment of the method of the present invention, the user is required to confirm and/or authorize a transmission to the selected party before the transmission occurs.

According to an alternative (i.e., pro-referral) embodiment of the method of the present invention, the transmission is automatically made to the selected party as part of the Terms and Conditions of using the method.

According to an alternative (i.e., pay-to-use) embodiment of the method of the present invention, the transmission is automatically made unless the user pays a registration or subscription fee to use the method on a non-referral basis (i.e., just for personal curiosity or to confirm the merit of a decision that the user is contemplating, but is unlikely to pursue).

If the selected party has set an initial alert (box 252), the user is prompted (box 254) to resolve the alert. For example, the user may be required to mark a checkbox to agree to the Terms and Conditions of engagement with the selected party.

Once a response is received (box 256) to the alert, such as a Response to Alert file (box 258), or if no alert was set, a message with data is transmitted (box 260) to the selected party. Preferably, the message includes an automatically generated greeting from the program to the party identifying the nature and context of the message, an automatically generated synopsis of the user's situation and a list of follow-up instructions that will also be sent to the user. For example, the list of follow-up instructions can include information regarding how and when the party who provides the action option service will initiate contact with the user (i.e., within one-business day) and that, if the party fails to do so, the user should contact the party shortly thereafter. In addition, the message includes data associated with the user, such as the Raw Data file (box 78), the Preprocessed Data file (box 104), the Sorted List of Action Options file (box 228), the Selection of Desired Party(ies) file (box 246) and any other data that might inform the selected party of the circumstance and intention of the user in order to help the selected party better assist the user and reduce redundancy.

Identifying and transmitting the message to the selected party places the user in contact with a person who has industry knowledge and expertise to assist the user. The selected party can then review the situation of the user in a customized and personal manner to evaluate whether the user is actually eligible to pursue the action option and whether the action option is likely to have a beneficial outcome. It should be appreciated that, in one aspect of the method, the knowledge dilemma is solved in a cost effective and timely manner by directing the user to the selected party who can address the situation of the user and assist the user in working toward a resolution, even if the user was unaware of an action option, who is qualified to perform or assist with the action option, how to get in contact with a person so qualified, and what information the person so qualified will need to review the situation of the user.

The method conceives of linking directly to established, automated resources. For instance, the message with data that is transmitted to the selected party can be processed to populate a new user intake form posted on a website of the selected party. Optionally, the message with data can be transmitted independently so that the selected party receives information associated with the user in the format that they prefer (i.e., the new user intake form) and in a more comprehensive manner that streamlines future user intake (i.e., the message with data).

A confirmation message is transmitted (box 262) to the user. Preferably, the confirmation message includes an automatically generated greeting, a synopsis of the user's situation, the list of follow-up instructions presented to the selected party, and the sorted list of action options, as reduced in complexity based on the level of sophistication of the user. The user can also be provided with copies of the other data files. However, based on the sophistication of the user, this may not be desirable in most contexts.

The transaction history of the action taken is saved (box 264) to memory, for instance, as a History file (box 266).

At which point, as discussed above regarding FIG. 2, the method restarts from the data collection process (see FIG. 5) if an update to the raw data associated with the user is received (see FIG. 2).

The method of the first preferred embodiment, as discussed above regarding FIGS. 1-18, is particularly applicable for decision making in the personal finance and debt assistance field, which forms the basis of an exemplary embodiment, as discussed below regarding FIGS. 19-62.

Figure 19:
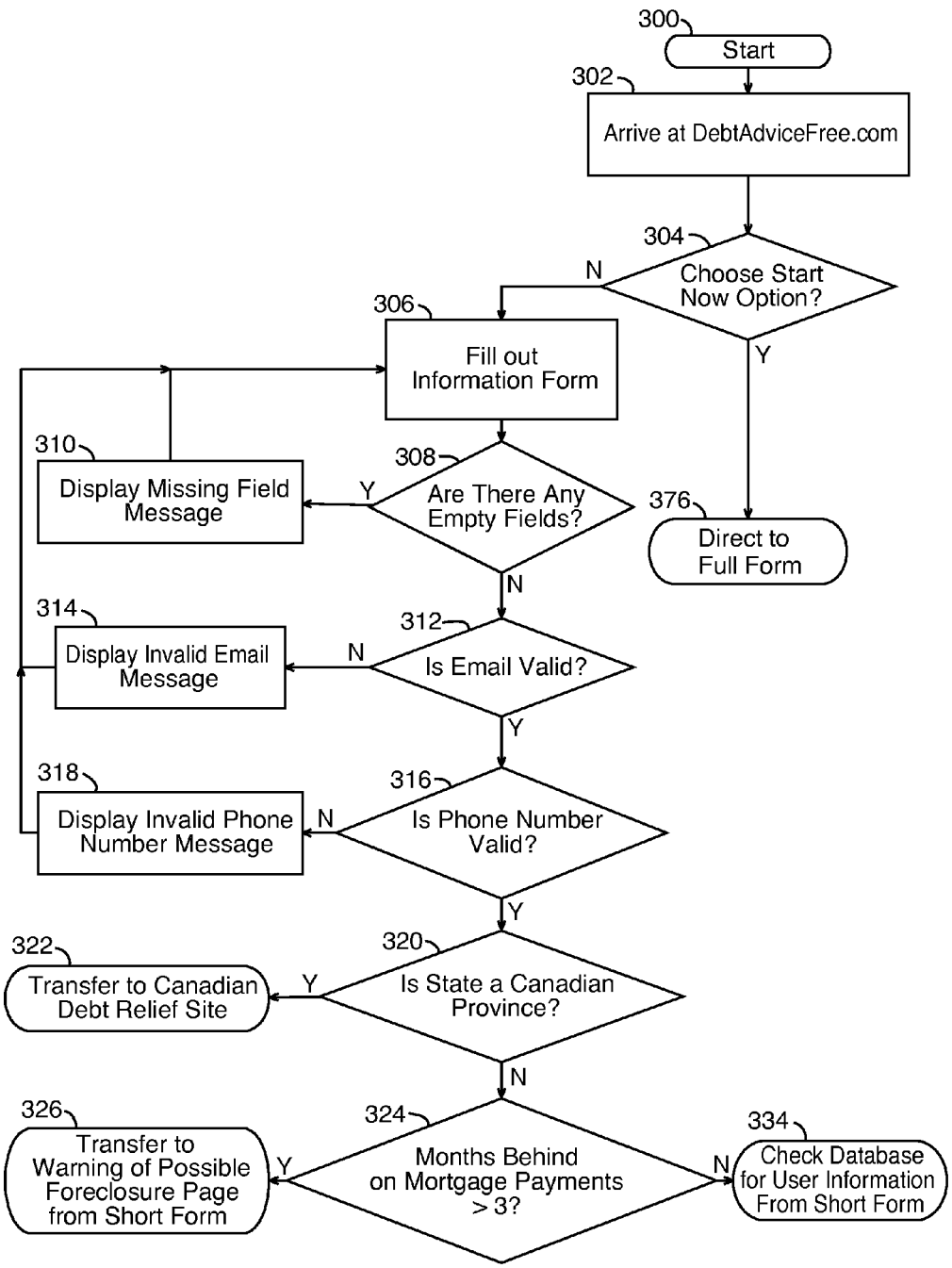
FIG. 19 illustrates a flow chart of a process of receiving information from a user using a short form according to a method of personal finance and debt assistance decision making according to a second preferred embodiment of the present invention.

Referring to FIG. 19, the initiation of an unsecured debt management decision making method according to the present invention is shown. The method simulates the thought process of a debt professional analyzing and providing recommendations to a person (i.e., the user) who may have need of personal finance or debt assistance.

The method is a web-based software program that a user can initiate or start (box 300), over the Internet, by arriving (box 302) at a website (e.g., http://www.debtadvicefree.com). Upon arriving at the website, the user is prompted (box 304) to choose the "Start Now" option.

If the user does not choose the "Start Now" option, the user is prompted to fill out (box 306) an information form, which is a short form that queries basic user information (e.g., name, address, etc.) and a few urgent indicators (e.g., Canadian address, the number of months behind the user is on any mortgage, etc.).

Once the user has entered information into the information form, the information form is checked (box 308) for empty fields. If there are any empty fields, a missing field message is displayed (box 310) to the user, who can then enter additional information into the information form.

Otherwise, if the information form is fully filled out, the validity of the e-mail address provided in the information form is checked (box 312). If the e-mail address is invalid, an invalid email message is displayed (box 314) to the user, who can then correct the e-mail address provided in the information form.

Otherwise, if the e-mail address is valid, the validity of the phone number provided in the information form is checked (box 316). If the phone number is invalid, an invalid phone number message is displayed (box 318) to the user, who can then correct the phone number provided in the information form.

Otherwise, if the phone number is valid, the residential address is checked (box 320) to determine if the state in which the user resides is a Canadian province. If so, the user is transferred (box 322) to a corresponding Canadian debt advice site (e.g., http://www.debtadvicefree.ca).

Otherwise, if the address is not Canadian, the number of months that the user is behind on any outstanding mortgage is checked (box 324). If the user is three or more months behind on any mortgage payments, the user is transferred (box 326) to a warning of possible foreclosure page.

The possibility of foreclosure is an example of an early indicator. For instance, a user may have invoked the unsecured debt management decision making method of the present invention with the intent to receive assistance regarding how to select between a few known options (i.e., whether to transfer several credit cards to a zero percent (0%) balance credit card or whether to procure a second mortgage). However, based on the information that the user has provided, the method identifies that the user is asking the wrong questions and pursuing the wrong problem or situation. By identifying that there is an outstanding possibility of foreclosure, the method alerts the user to the fact that regardless of which unsecured debt management action option the user might like to pursue, none of the action options—no matter how qualified the user might be—should be the first course of action of the user. Instead, the user should resolve the possibility of foreclosure and, then, pursue the unsecured debt management action options based on the relative merit of each.

Figure 20:
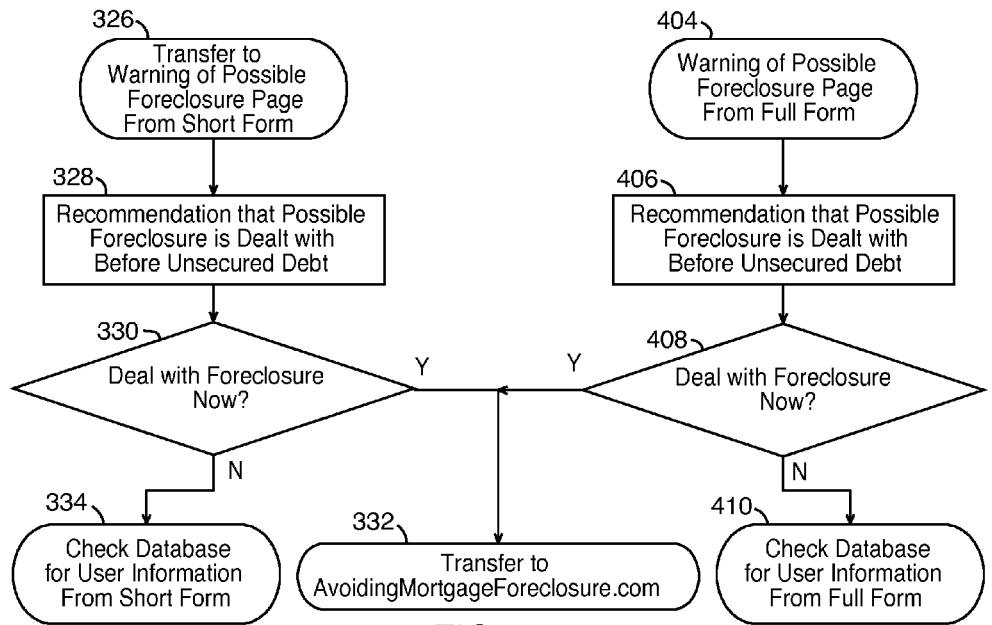
FIG. 20 illustrates a flow chart of a process of warning a user of possible foreclosure according to the method of FIG. 19.

Referring to FIG. 20, once transferred (box 326) to the warning of possible foreclosure page from the short form, the user is displayed (box 328) a recommendation that the possibility of imminent foreclosure should be dealt with before investigating the user's possible unsecured debt issues. The user is then prompted (box 330) whether he would like to deal with the foreclosure now. If indicia is received that he would like to deal with the foreclosure now, the user is transferred (box 332) to a foreclosure avoidance website (e.g., http://www.avoidingmortgageforeclosure.com).

Otherwise, if it is determined that the user is not three or more months behind or the user indicates that he does not want to deal with the foreclosure now, a database is checked (box 334) for user information based on the short form.

Figures 21A, 21B:
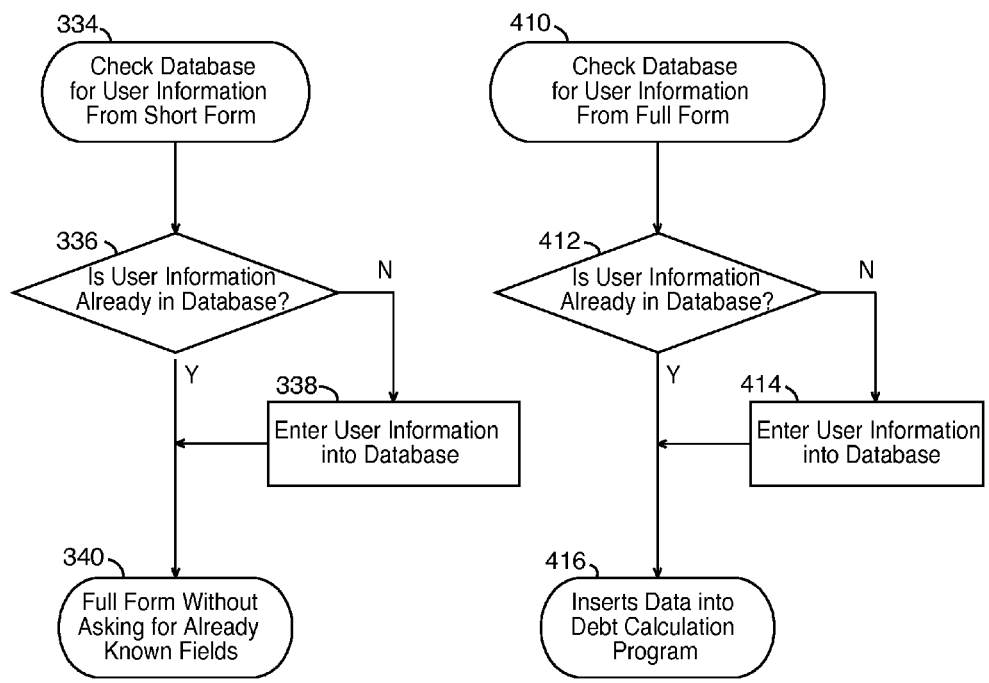
FIGS. 21a and 21b illustrate a process of checking a database for user information according to the method of FIG. 19.

Referring to FIG. 21a, the database is checked (box 334) for user information based on the short form by determining (box 336) if the user information is already in the database, and, if not, then the user information is entered (box 338) into the database.

Otherwise, if the user information is already in the database, the user proceeds (box 340) to a full form, with the already inputted information being imported into the full form so that the user is not asked for already known fields. The user, then, inputs information into the remaining fields of the full form.

Figure 22:
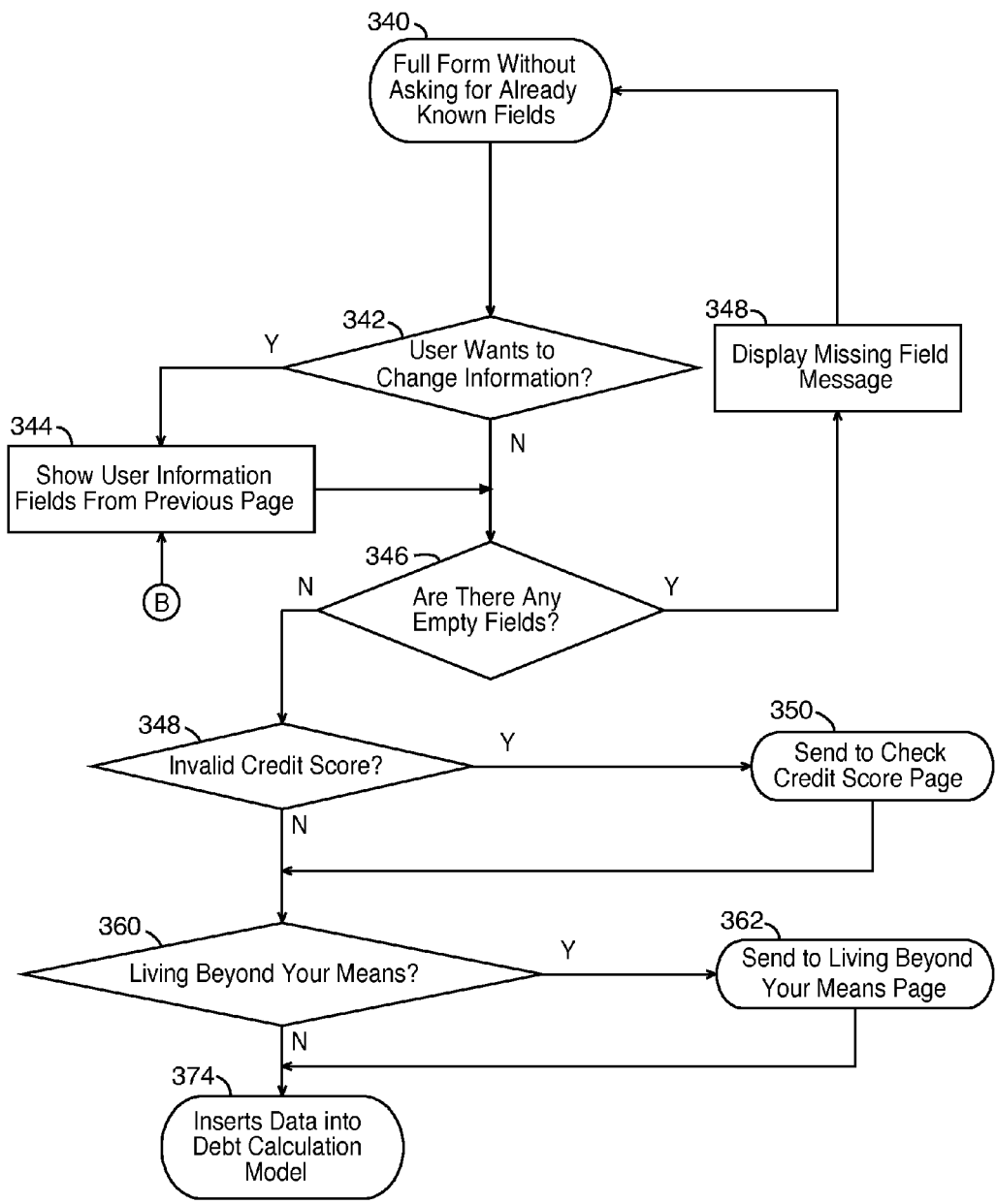
FIG. 22 illustrates a flow chart of a process of receiving additional information from a user using the short form according to the method of FIG. 19.

Referring to FIG. 22, the user is prompted (box 342) whether he wants to change any previously entered information. If so, the user is shown (box 344) information fields from the short form, as shown in FIG. 19, and allowed to make edits.

Otherwise, the full form is checked (box 346) to determine if there are any empty fields. If there are any empty fields, a missing field message is displayed (box 348) and the user is returned to the full form to complete all required fields. Otherwise, if there are no empty fields, the validity of a credit score of the user is checked (box 348). The validity of the credit score of the user is another example of an early indicator.

The validity of the credit score of the user can be checked against third party data sources, such as credit rating agency databases. Preferably, the credit score is instead verified using an independent calculation of what the credit score of the user should be based on the information provided by the user. For instance, if the user provides information that indicates a history of overdue or late payments, then the entry of a very high credit score (e.g., 780) is likely to be incorrect. By calculating the credit score of the user internally, without checking a third party data source, the privacy and credit score of the user are preserved.

If the credit score entered by the user is invalid, the user is sent (box 350) to a check credit score page.

Figure 23:
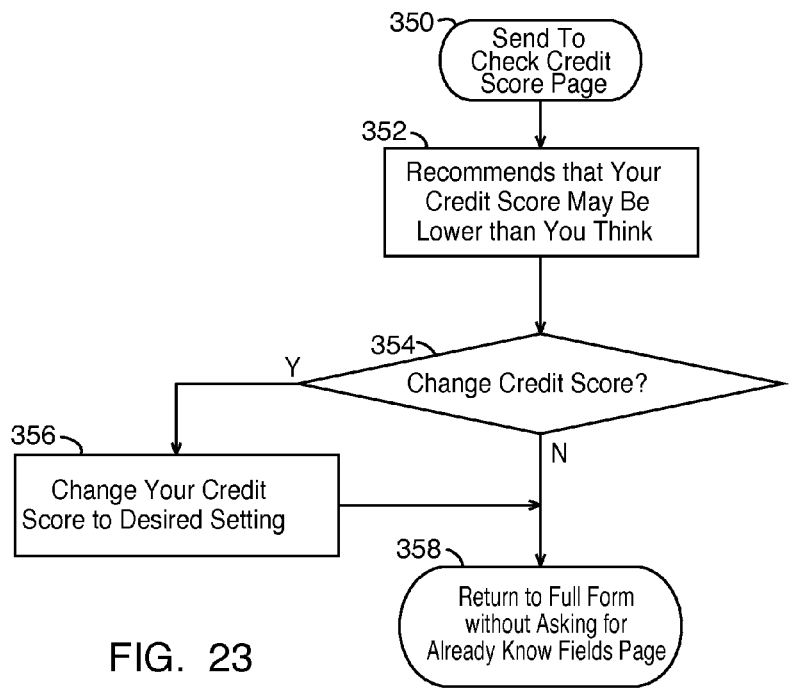
FIG. 23 illustrates a flow chart of a process of directing a user to a check credit score page according to the method of FIG. 19.

Referring to FIG. 23, once the user is sent (box 350) to the check credit score page, a recommendation is displayed (box 352) that the user's credit score may be lower than he thinks. The user is then prompted (box 354) if he would like to change the credit score that was previously entered to another value. If so, the credit score is changed (box 356) to the desired setting and the user is returned (box 358) to the full form without asking for already known fields page.

Otherwise, referring again to FIG. 22, it is determined (box 360) whether the expenses of the user are greater than the income of the user, which indicates that the user is living beyond his means. Whether the user is living beyond his means is another example of an early indicator. If it is determined that the user is spending beyond his financial means, the user is sent (box 362) to a living beyond your means page.

Figure 24:
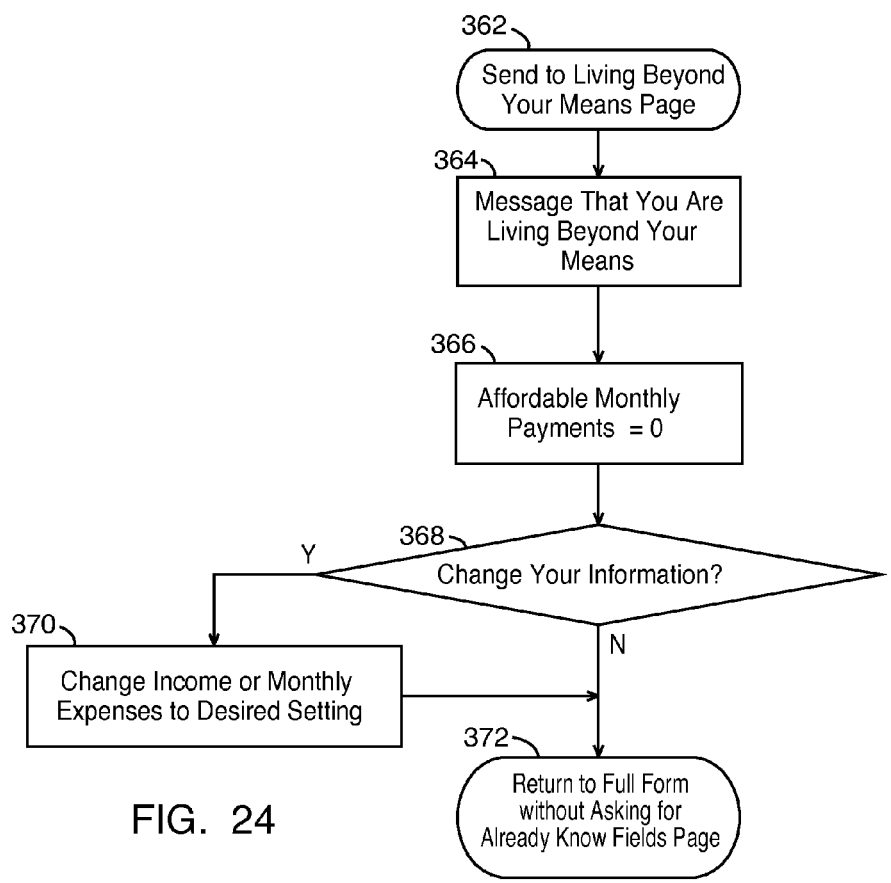
FIG. 24 illustrates a flow chart of a process of directing a user to a living beyond your means page according to the method of FIG. 19.

Referring to FIG. 24, once the user is sent (box 362) to the living beyond your means page, a message is displayed (box 364) that the user is living beyond his means. An affordable monthly payment variable is set (box 366) equal to zero (0).

The user is prompted (box 368) if he would like to change any of the previously entered user information. If so, the user information, and, in particular, the income and monthly expenses of the user, is changed (box 370) to the desired setting. Then, the user is returned (box 372) to the full form without asking for already known fields page.

Referring again to FIG. 22, the user information (i.e., data) is inserted (box 374) into a debt calculation model, which includes protocols, routines and algorithms that are previously defined for the personal finance and debt assistance embodiment of the method of the present invention.

Figure 25:
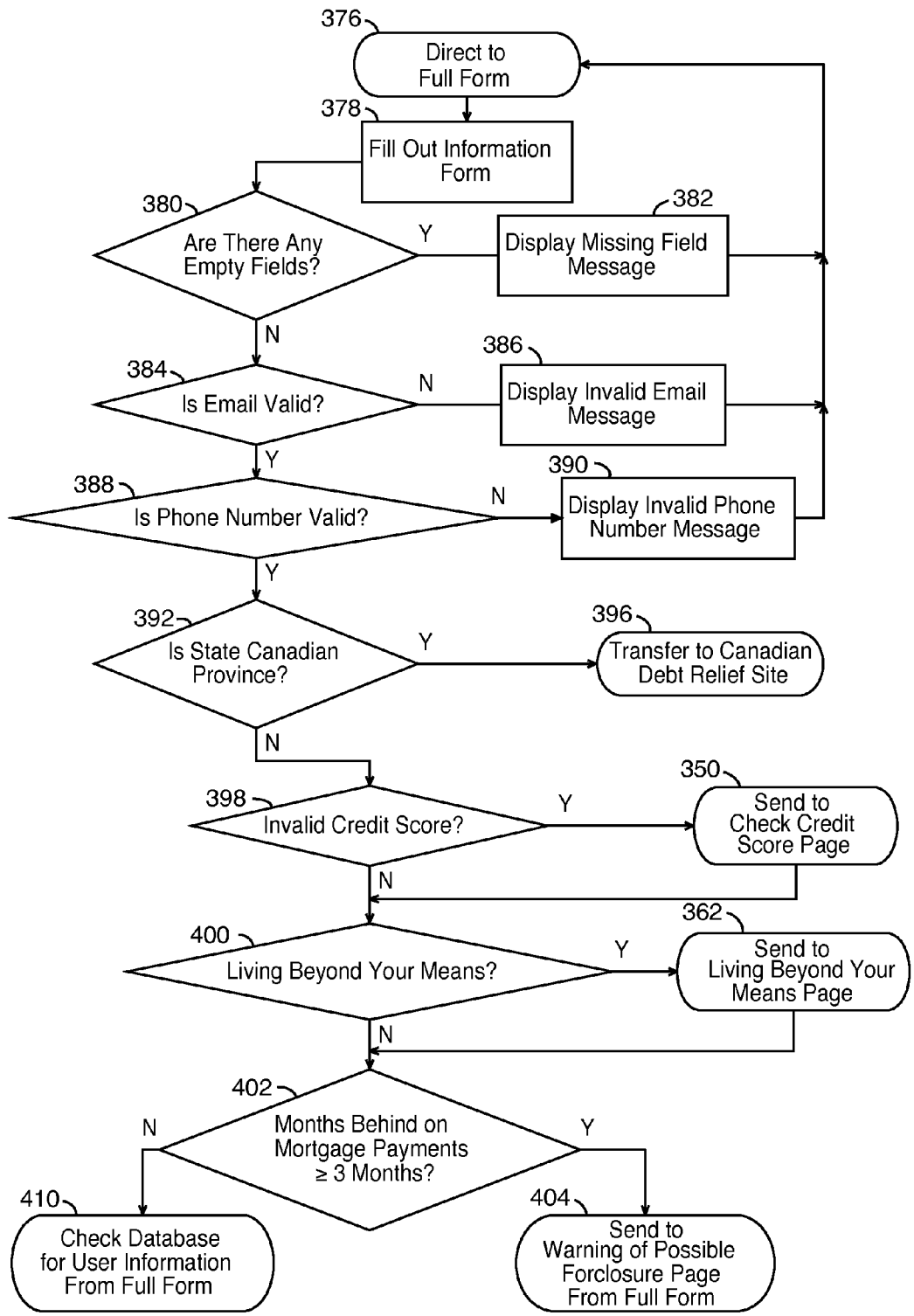
FIG. 25 illustrates a flow chart of a process of receiving information from a user using a full form according to the method of FIG. 19.

Referring to FIG. 25, if the user did choose the "Start Now" option, as discussed above regarding FIG. 19, the user is directed (box 376) to a full form, which includes fields for all desired information associated with the user. The user is prompted to fill out (box 378) the information form. Once completed, the information form is reviewed according to similar verification and alert routines, as discussed above.

For instance, it is determined (box 380) whether there are any empty fields in the full form and, if so, the missing field message is displayed (box 382) and the user is returned to the full form to correct the issue.

It is determined (box 384) whether the e-mail address of the user is invalid, and, if so, the invalid e-mail address message is displayed (box 386) and the user is returned to the full form to correct the issue.

It is determined (box 388) whether the phone number of the user is invalid, and, if so, an invalid phone number message is displayed (box 390) and the user is returned to the full form to correct the information.

It is determined (box 392) whether the state of residency of the user is a Canadian province, and, if so, the user is transferred (box 396) to a Canadian debt relief site.

If it is determined (box 398) whether the credit score of the user is invalid, and, if so, the user is sent (box 350) to the check credit score page (see FIG. 23).

It is determined (box 400) whether the user is living beyond his means, and, if so, the user is sent (box 362) to the living beyond your means page (see FIG. 24).

It is determined (box 402) whether the user is three or months behind on any mortgage payments, and, if so, the user is sent (box 404) to the warning of possible foreclosure page from the full form.

Referring again to FIG. 20, once the user is sent (box 404) to the warning of possible foreclosure page from the full form, the recommendation is displayed (box 406) that the possibility of imminent foreclosure should be dealt with before addressing the possible user's unsecured debt issues. The user is then prompted (box 408) whether he would like to deal with the foreclosure now. If the user confirms that he would like to deal with the foreclosure now, the user is transferred (box 332) to the foreclosure avoidance website (e.g., http://www.avoidingmortgageforeclosure.com).

Otherwise, if the user is less than three months behind on any mortgage payments or the user has indicated that he would not like to deal with the foreclosure now, the database is checked (box 410) for user information based on the full form.

Referring to FIG. 21b, the database is checked (box 410) for user information from the full form by determining (box 412) if the user information is already in the database, and, if not, the user information is entered (box 414) into the database. The user information (i.e., data) is, then, inserted (box 416) into the debt calculation model.

Figure 26:
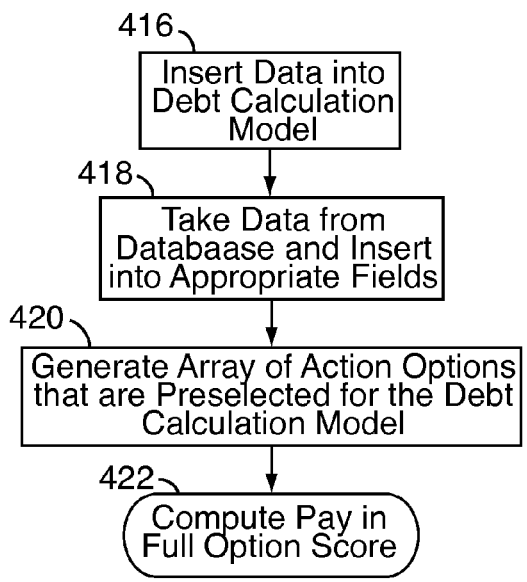
FIG. 26 illustrates a flow chart of a process of inserting data into a debt calculation model according to the method of FIG. 19.

Referring to FIG. 26, once data is prepared for insertion (box 416) into the debt calculation model, data is taken (box 418) data from the database where the user information is stored and inserted into appropriate fields of the debt calculation model.

In addition, an array of action options is generated (box 420). The array of action options is pre-selected for the debt calculation model. For example, the array of action options includes: a pay in full option (see FIGS. 27-29); a do nothing option (see FIG. 30); a balance transfer to a zero percent (0%) annual percent rate (APR) unsecured credit card option (see FIGS. 31-32); an unsecured to secured debt option (see FIGS. 33-34); an unsecured personal loan option (see FIG. 35); a non-profit credit counseling option (see FIGS. 36-41); a chapter 7 bankruptcy option (see FIGS. 44-45); a debt settlement with a reduced balance due option (see FIGS. 46-50); a fixed income option (see FIGS. 51-52); and a chapter 13 bankruptcy option (see FIGS. 54-55). The action options are presented in the order in which they are computed, as described in greater detail below. For instance, once the array is generated, the score for the first action option—a pay in full option score—is computed (box 422).

Figure 27:
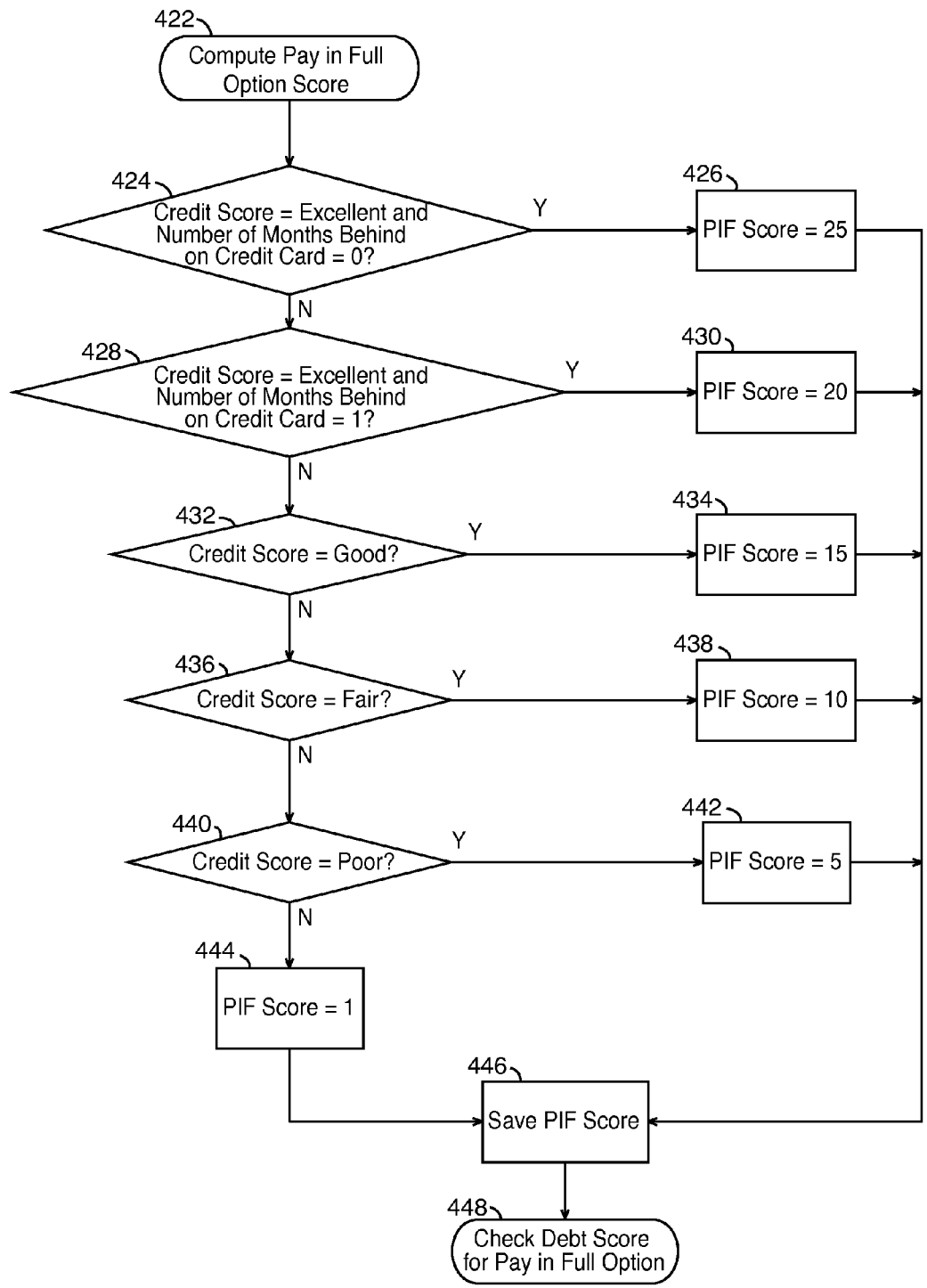
FIG. 27 illustrates a flow chart of a process of computing a pay in full option score according to the method of FIG. 19.

Referring to FIG. 27, the pay in full score is computed (box 422) by scaling the credit score and the number of months that the user is behind on credit card payments into a pay in full (PIF) score variable. For instance, it is determined (box 424) if the credit score of the user is excellent and the user is zero (0) months behind on credit card payments (i.e., not behind), and, if so, the PIF score is set (box 426) equal to twenty-five (25).

Otherwise, it is determined (box 428) if the credit score of the user is excellent and the user is one month behind on credit card payments, and, if so, the PIF score is set (box 430) equal to twenty (20).

Otherwise, it is determined (box 432) if the credit score of the user is good, and, if so, the PIF score is set (box 434) equal to fifteen (15).

Otherwise, it is determined (box 436) if the credit score of the user is fair, and, if so, the PIF score is set (box 438) equal to ten (10).

Otherwise, it is determined (box 440) if the credit score of the user is poor, and, if so, the PIF score is set (box 442) equal to five (5).

Or else, the PIF Score is set (box 444) equal to one (1).

The computed PIF Score is saved (box 446), like all other variables calculated in the debt calculation model.

Then, a debt score for the pay in full option is checked (box 448).

Figure 28:
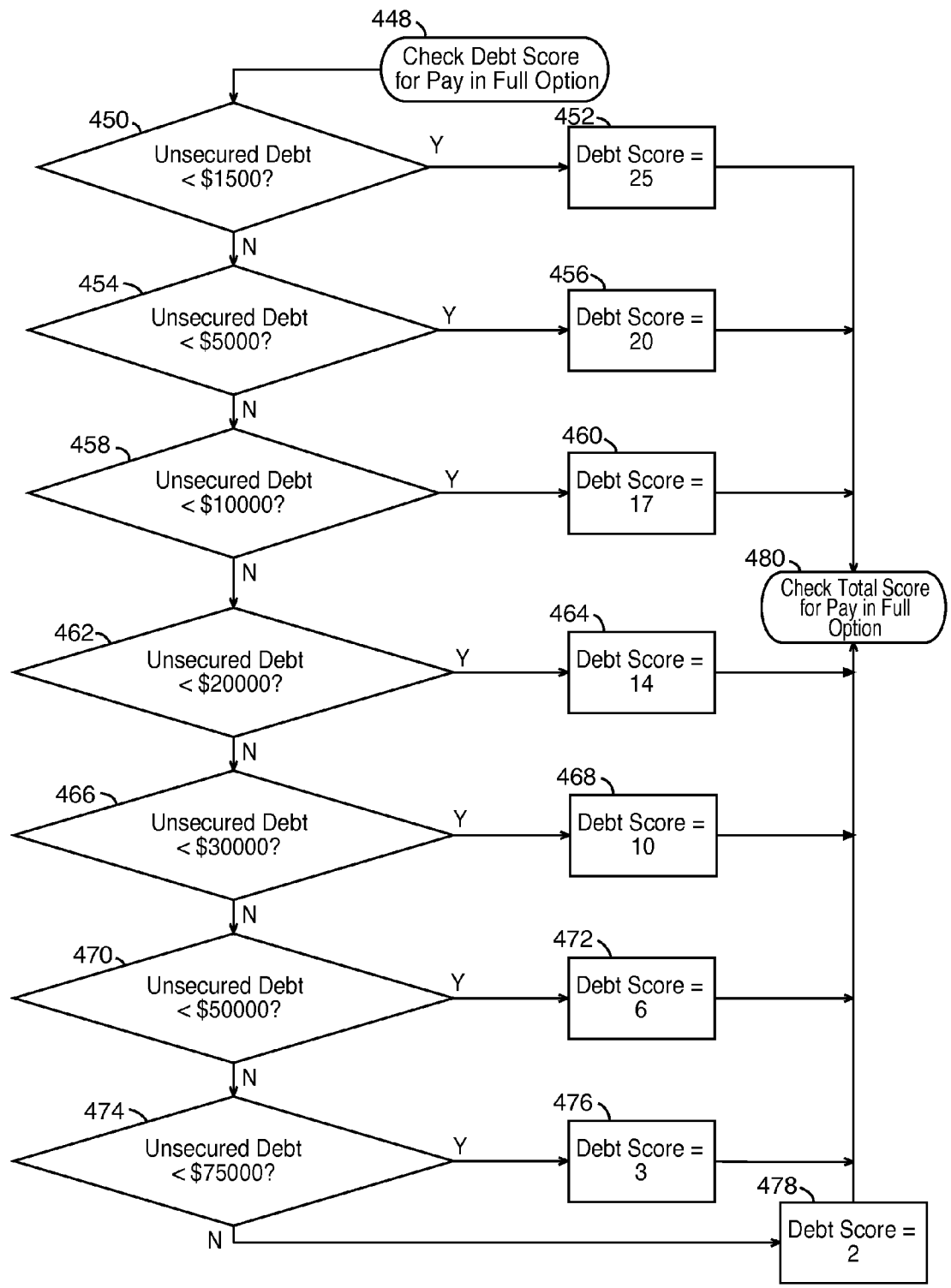
FIG. 28 illustrates a flow chart of a process of checking a debt score for the pay in full option of FIG. 27.

Referring to FIG. 28, the debt score for the pay in full option is checked (box 448) by scaling the amount of unsecured debt held by the user into a debt score variable. For instance, it is determined (box 450) if the user holds less than $1,500 of unsecured debt, and, if so, the debt score is set (box 452) equal to twenty-five (25).

Otherwise, it is determined (box 454) if the user holds less than $5,000 of unsecured debt, and, if so, the debt score is set (box 456) equal to twenty (20).

Otherwise, it is determined (box 458) if the user holds less than $10,000 of unsecured debt, and, if so, the debt score is set (box 460) equal to seventeen (17).

Otherwise, it is determined (box 462) if the user holds less than $20,000 of unsecured debt, and, if so, the debt score is set (box 464) equal to fourteen (14).

Otherwise, it is determined (box 466) if the user holds less than $30,000 of unsecured debt, and, if so, the debt score is set (box 468) equal to ten (10).

Otherwise, it is determined (box 470) if the user holds less than $50,000 of unsecured debt, and, if so, the debt score is set (box 472) equal to six (6).

Otherwise, it is determined (box 474) if the user holds less than $75,000 of unsecured debt, and, if so, the debt score is set (box 476) equal to three (3).

Or else, the debt score is set (box 478) equal to two (2).

Then, a total score for the pay in full option is checked (box 480).

Figure 29:
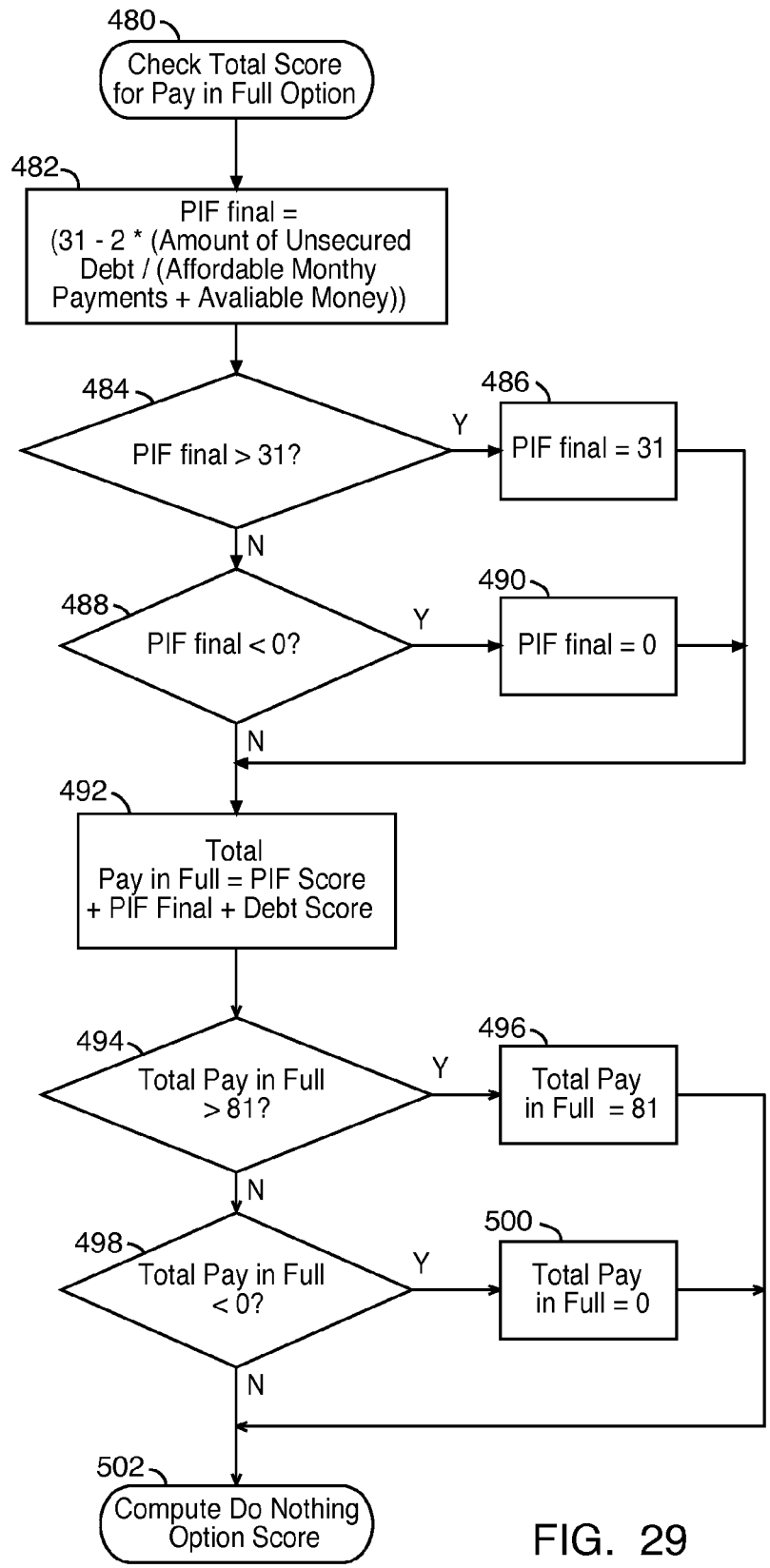
FIG. 29 illustrates a flow chart of a process of checking a total score for the pay in full option of FIG. 27.

Referring to FIG. 29, the total score for the pay in full option is checked (box 480) by calculating (box 482) a PIF final variable according to the following equation:

$$\text{PIF final} = (31 - 2*(\text{unsecured debt}/(\text{affordable monthly payment} + \text{available money}))).$$

The PIF final value is outlier restricted to a minimum of zero (0) and a maximum of thirty-one (31). For instance, it is determined (box 484) if the PIF final is greater than thirty-one (31), and, if so, the PIF final is set (box 486) equal to thirty-one (31).

Otherwise, it is determined (box 488) if the PIF final is less than zero (0), and, if so, the PIF final is set (box 490) equal to zero (0).

A total pay in full variable is calculated (box 492) according to the following equation:

$$\text{total pay in full} = (\text{PIF score} + \text{PIF final} + \text{debt score}).$$

Then, the total pay in full is outlier restricted to a minimum of zero (0) and a maximum of eighty-one (81). For instance, it is determined (box 494) if the total pay in full is greater than eighty-one (81), and, if so, the total pay in full is set (box 496) equal to eighty-one (81).

Otherwise, it is determined (box 498) if the total pay in full is less than zero (0), and, if so, the total pay in full is set (box 500) equal to zero (0).

The total pay in full is saved as the pay in full option score in the array of action options. Once the pay in full option score is saved, the next action option score—the do nothing option score—is computed (box 502).

Figure 30:
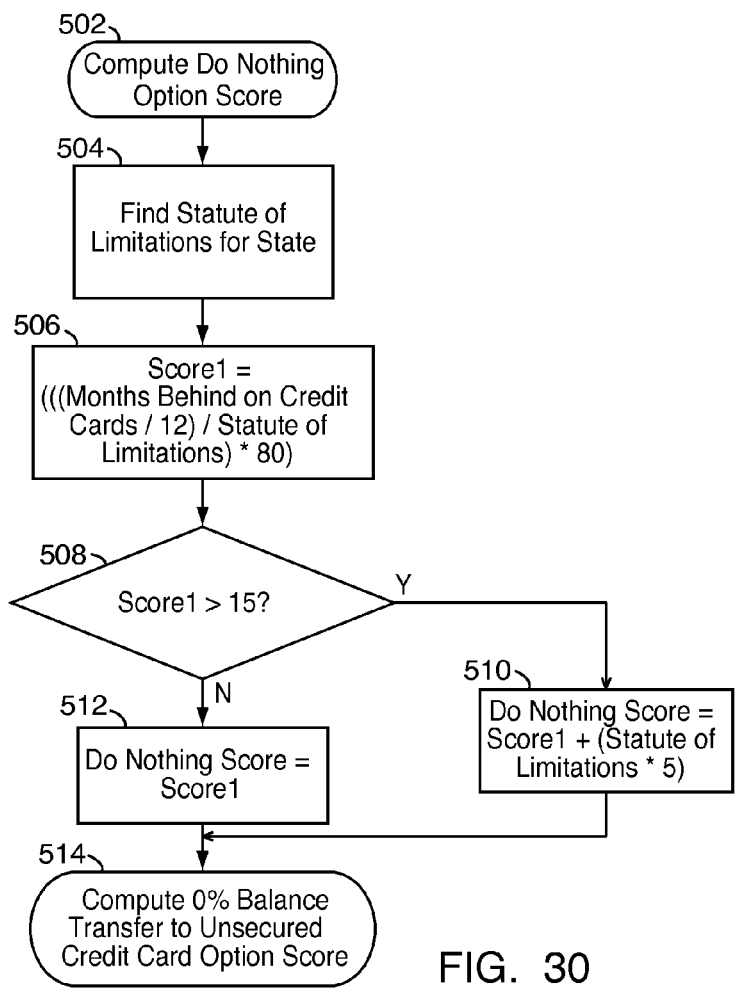
FIG. 30 illustrates a flow chart of a process of computing a do nothing option score according to the method of FIG. 19.

Referring to FIG. 30, the do nothing option score is computed (box 502) by finding (box 504) a statute of limitations for the state in which the user is a resident.

Based on the statute of limitations, a do nothing place holder (score1) variable is calculated (box 506) according to the following equation:

$$\text{score1} = (((\text{months behind on credit cards}/12)/\text{statute of limitations})*80).$$

It is then determined (box 508) if the score1 is greater than fifteen (15), and, if so, a do nothing score is calculated (box 510) according to the following equation:

$$\text{do nothing score} = (\text{score1} + (\text{statute of limitations}*5)).$$

Otherwise, the do nothing score is set (box 512) equal to the score1.

The do nothing score is saved as the do nothing option score in the array of action options. Once the do nothing option score is saved, the next action option score—the balance transfer to a zero percent (0%) annual percent rate (APR) unsecured credit card option score—is computed (box 514).

Figure 31:
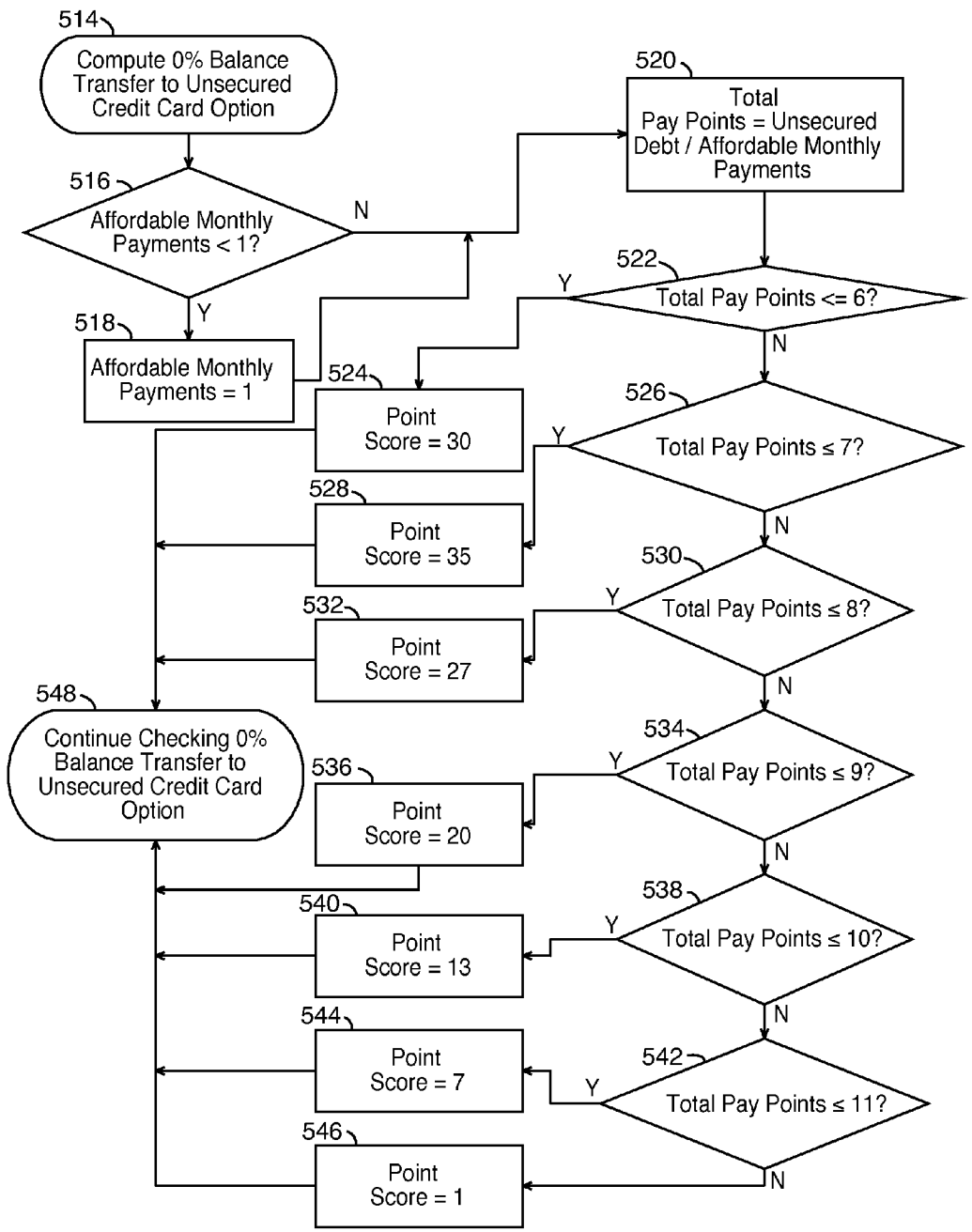
FIG. 31 illustrates a flow chart of a process of computing a balance transfer to a zero percent (0%) annual percent rate (APR) unsecured credit card option score according to the method of FIG. 19.

Referring to FIG. 31, the balance transfer to a zero percent (0%) annual percent rate (APR) unsecured credit card option score is computed (box 514) by outlier restricting the affordable monthly payments to one (1). For instance, it is determined (box 516) if the affordable monthly payments for the user is less than one (1), and, if so, the affordable monthly payments is set (box 518) equal to one (1).

Then, the total pay points variable is calculated (box 520) according to the following equation:

$$\text{total pay points} = (\text{unsecured debt}/\text{affordable monthly payments}).$$

The total pay points is scaled to a point score variable. For instance, it is determined (box 522) if the total pay points is less than or equal to six (6), and, if so, the point score is set (box 524) equal to thirty (30).

Otherwise, it is determined (box 526) if the total pay points is less than or equal to seven (7), and, if so, the point score is set (box 528) equal to thirty-five (35).

Otherwise, it is determined (box 530) if the total pay points is less than or equal to eight (8), and, if so, the point score is set (box 532) equal to twenty-seven (27).

Otherwise, it is determined (box 534) if the total pay points is less than or equal to nine (9), and, if so, the point score is set (box 536) equal to twenty (20).

Otherwise, it is determined (box 538) if the total pay points is less than or equal to ten (10), and, if so, the point score is set (box 540) equal to thirteen (13).

Otherwise, it is determined (box 542) if the total pay points is less than or equal to eleven (11), and, if so, the point score is set (box 544) equal to seven (7).

Or else, the point score is set (box 546) equal to one (1).

Then, the balance transfer to a zero percent (0%) annual percent rate (APR) unsecured credit card option continues to be checked (box 548).

Figure 32:
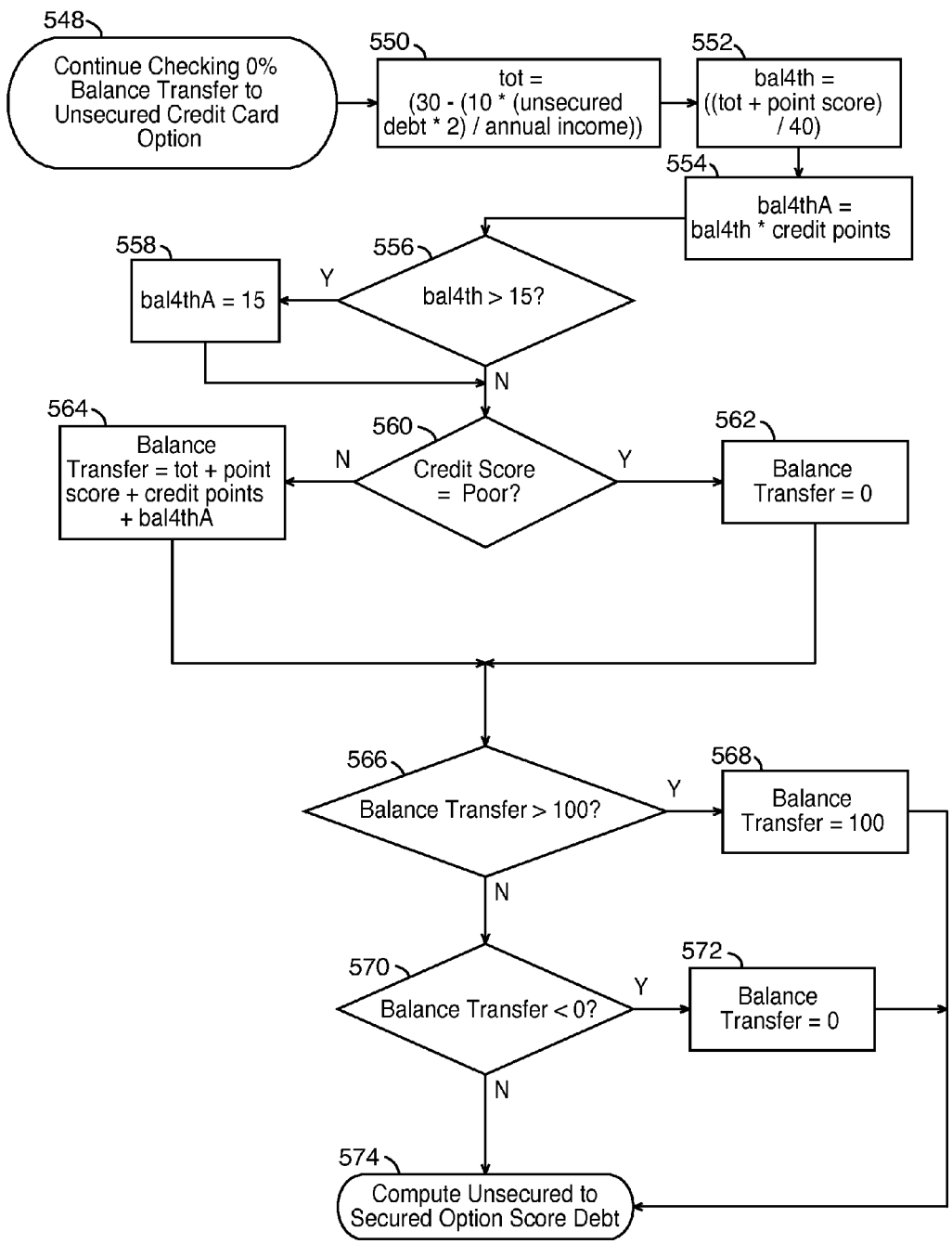
FIG. 32 illustrates a flow chart of a process of continuing to check the balance transfer to a zero percent (0%) annual percent rate (APR) unsecured credit card option of FIG. 31.

Referring to FIG. 32, the balance transfer to a zero percent (0%) annual percent rate (APR) unsecured credit card option continues to be checked (box 548) by calculating (box 550) a total unsecured credit card debt (tot) variable according to the following equation:

$$tot=(30-(10*(unsecured\ debt*2)/annual\ income)).$$

A balance to carry forward (bal4th) variable is calculated (box 552) according to the following equation:

$$bal4th=((tot+point\ score)/40).$$

In addition, a modified balance to carry forward (bal4thA) variable is calculated (box 554) according to the following equation:

$$bal4thA=(bal4th+credit\ points).$$

The credit points variable is a scaled number looked up from a table based on the credit score of the user.

The bal4th is, then, outlier restricted to a maximum of fifteen (15). For instance, it is determined (box 556) if the bal4th is greater than fifteen (15) and, if so, the bal4th is set (box 558) equal to fifteen (15).

It is determined (box 560) if the credit score of the user is poor, and, if so, a balance transfer variable is set (box 562) equal to zero (0).

Otherwise, if the credit score is not poor, then the balance transfer is calculated (box 564) according to the following equation:

$$balance\ transfer=(tot+point\ score+credit\ points+bal4thA).$$

The balance transfer is then outlier restricted to a minimum of zero (0) and a maximum of one hundred (100). For instance, it is determined (box 566) if the balance transfer is greater than one hundred (100), and, if so, the balance transfer is set (box 568) equal to one hundred (100).

Otherwise, it is determined (box 570) if the balance transfer is less than zero (0), and, if so, the balance transfer is set (box 572) equal to zero (0).

The balance transfer is saved as the balance transfer to a zero percent (0%) annual percent rate (APR) unsecured credit card option score in the array of action options. Once the balance transfer to a zero percent (0%) annual percent rate (APR) unsecured credit card option score is saved, the next action option score—the unsecured to secured debt option score—is computed (box 574).

Figure 33:
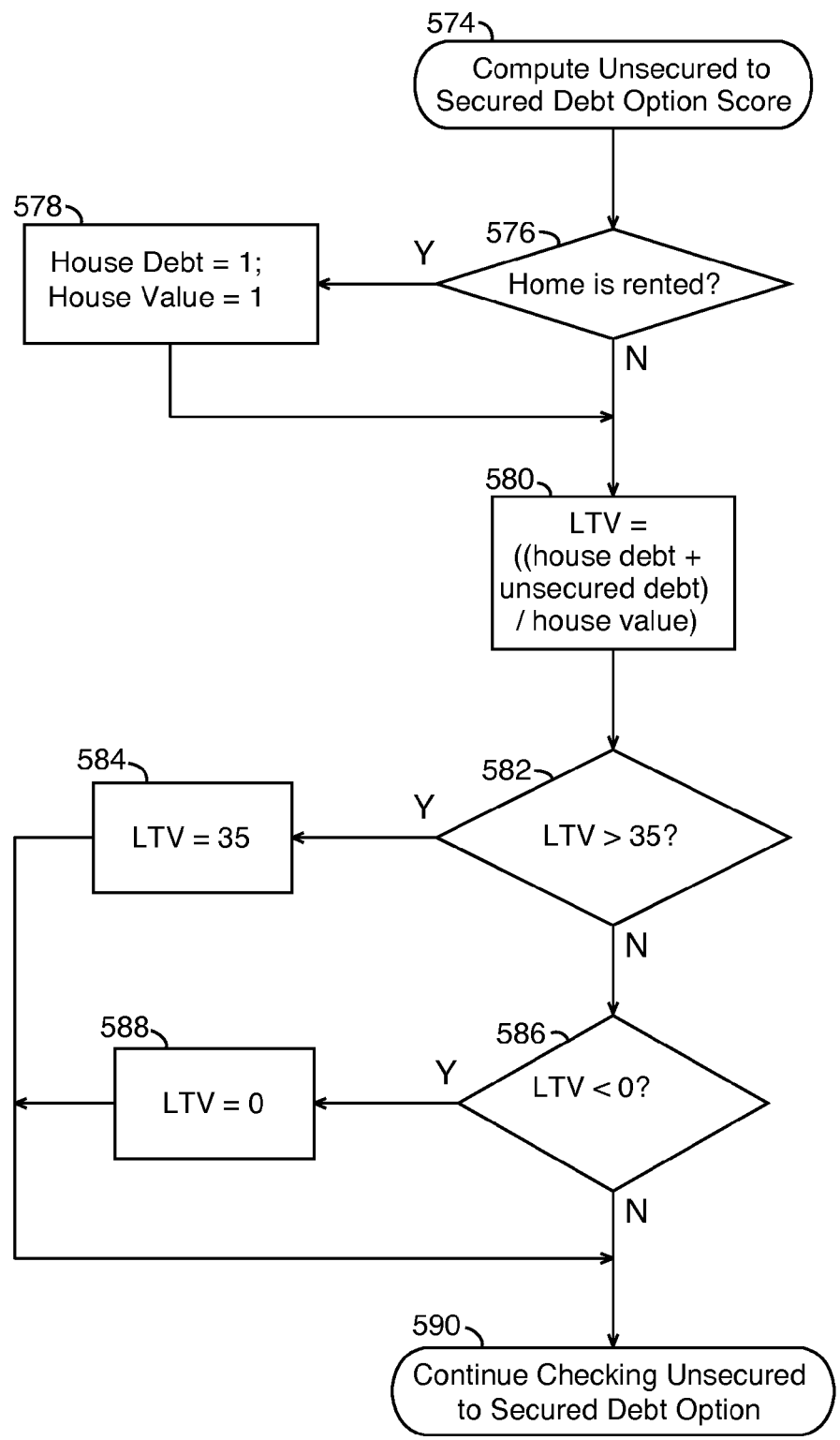
FIG. 33 illustrates a flow chart of a process of computing an unsecured to secured debt option score according to the method of FIG. 19.

Referring to FIG. 33, the unsecured to secured debt option score is computed (box 574) by determining (box 576) if the home of the user is rented. If the home of the user is rented, then a house debt variable and a house value variable are both set (box 578) equal to one (1).

Then, a loans-to-value ratio (LTV) variable is calculated (box 580) according to the following equation:

$$LTV=((house\ debt+unsecured\ debt)/house\ value).$$

The LTV is, then, outlier restricted to a minimum of zero (0) and a maximum of thirty-five (35). For instance, it is determined (box 582) if the LTV is greater than thirty-five (35), and, if so, the LTV is set (box 584) equal to thirty-five (35).

Otherwise, it is determined (box 586) if the LTV is less than zero (0), and, if so, the LTV is set (box 588) equal to zero (0).

Then, the unsecured to secured debt option continues to be checked (box 590).

Figure 34:
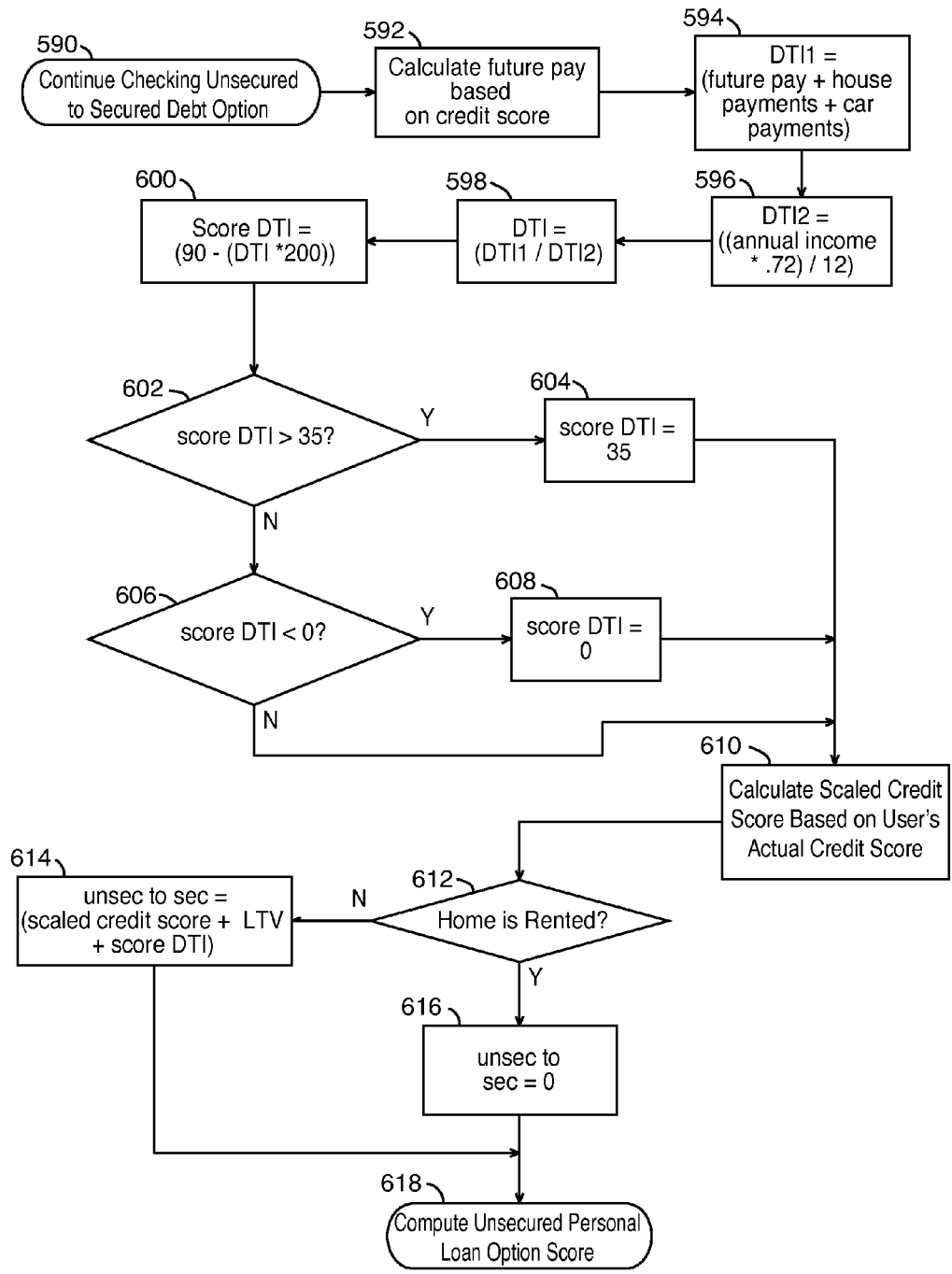
FIG. 34 illustrates a flow chart of a process of continuing to check the unsecured to secured debt option according to the method of FIG. 33.

Referring to FIG. 34, the unsecured to secured debt option continues to be checked (box 590) by calculating (box 592) a future pay variable based on the credit score of the user. Specifically, the future pay is equal to the unsecured debt of the user multiplied by a scaled value of the credit score of the user.

A first debt to income (DTI1) variable is calculated (box 594) according to the following equation:

$$DTI1=(future\ pay+house\ payments+car\ payments).$$

A second debt to income (DTI2) variable is calculated (box 596) according to the following equation:

$$DTI2=((annual\ income*0.72)/12).$$

A debt to income ratio (DTI) variable is calculated (box 598) according to the following equation:

$$DTI=(DTI1/DTI2).$$

In addition, a scored debt to income (score DTI) variable is calculated (box 600) according to the following equation:

$$score\ DTI=(90-(DTI*200)).$$

The scored DTI is, then, outlier restricted to a minimum of zero (0) and a maximum of thirty-five (35). For instance, it is determined (box 602) if the score DTI is greater than thirty-five (35), and, if so, the score DTI is set (box 604) equal to thirty-five (35).

Otherwise, it is determined (box 606) if the score DTI is less than zero (0), and, if so, the score DTI is set (box 608) equal to zero (0).

A scaled credit score variable is calculated (box 610) based on the credit score of the user. Specifically, the scaled credit score is equal to a constant multiplied by a value determined from a look-up table based on the credit score of the user.

Then, it is determined (box 612) if the home is rented, and, if so, an unsecured to secured debt (unsec to sec) variable is set (box 614) equal to zero (zero).

Otherwise, if the home is not rented, the unsec to sec is calculated (box 616) according to the following equation:

$$unsec\ to\ sec=(scaled\ credit\ score+LTV+score\ DTI).$$

The unsec to sec is saved as the unsecured to secured debt option score in the array of action options. Once the unsecured to secured debt option score is stored, the next action option score—the unsecured personal loan option score—is computed (box 618).

Figure 35:
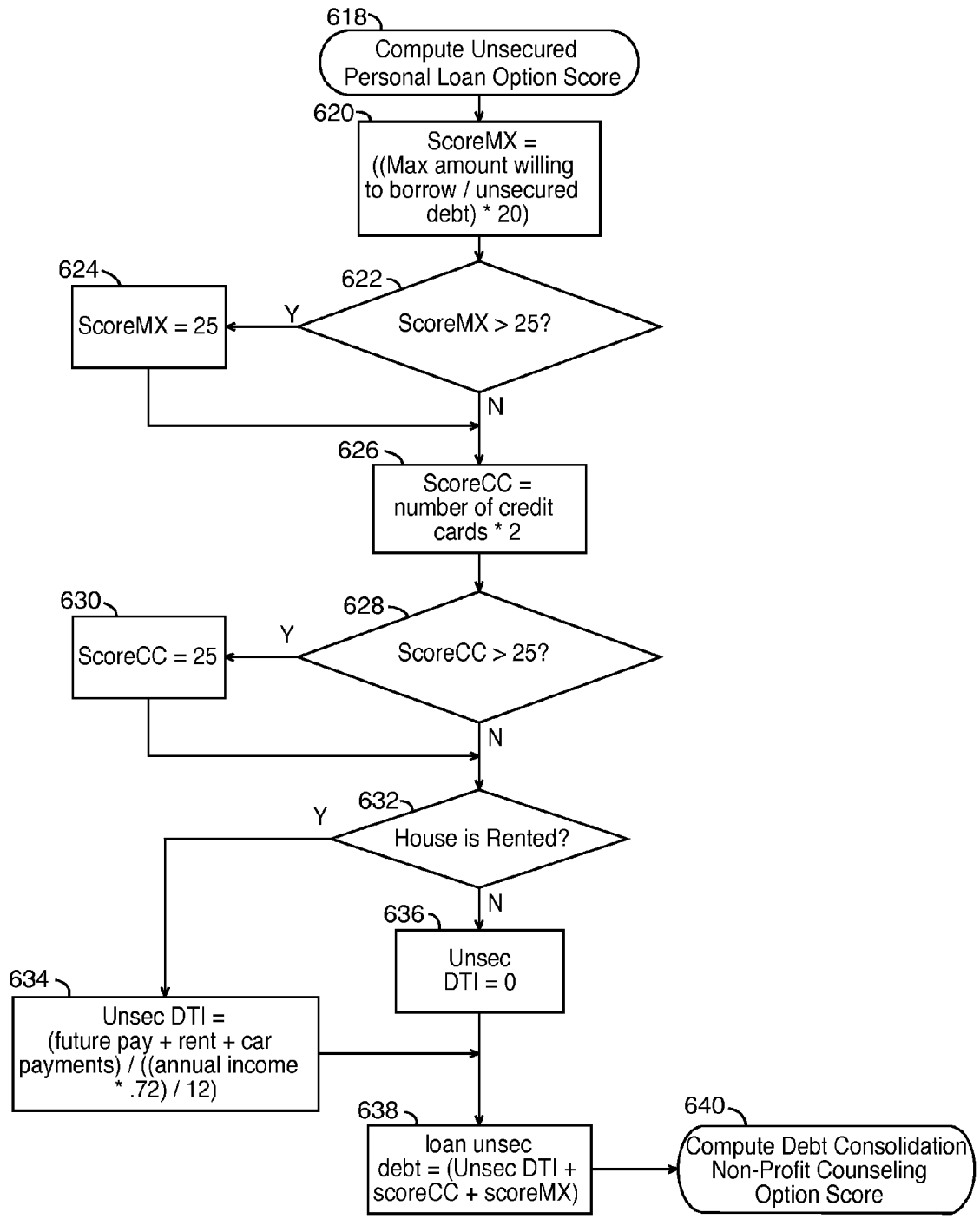
FIG. 35 illustrates a flow chart of a process of computing an unsecured personal loan option score according to the method of FIG. 19.

Referring to FIG. 35, the unsecured personal loan option score is computed (box 618) by calculating (box 620) a maximum score (scoremx) variable according to the following equation:

$$scoremx=((\text{max amount willing to borrow/unsecured debt})*20).$$

The scoremx is, then, outlier restricted to a maximum of twenty-five (25). For instance, it is determined (box 622) if the scoremx is greater than twenty-five (25), and, if so, the scoremx is set (box 624) equal to twenty-five (25).

A credit card score (scorecc) variable is calculated (box 626) according to the following equation:

$$scorecc=(\text{number of credit cards}*2).$$

The scorecc is, then, outlier restricted to a maximum of twenty-five (25). For instance, it is determined (box 628) if the scorecc is greater than twenty-five (25), and, if so, the scorecc is set (box 630) equal to twenty-five (25).

Then, it is determined (box 632) if the house of the user is rented, and, if so, an unsecured debt to income (unsec DTI) variable is calculated (box 634) according to the following equation:

$$\text{unsec DTI}=((\text{future pay+rent+car payments})/((\text{annual income}*0.72)/12)).$$

Otherwise, if the house of the user is not rented, the unsec DTI is set (box 636) equal to zero (0).

An unsecured loans (loan unsec debt) variable is calculated (box 638) according to the following equation:

$$\text{loan unsec debt}=(\text{unsec DTI}+scorecc+scoremx).$$

The loan unsec debt is stored as the unsecured personal loan action option score in the array of action options. Once the unsecured personal loan action option score is saved, the next action option score—a debt consolidation non-profit counseling option score—is computed (box 640).

Figure 36:
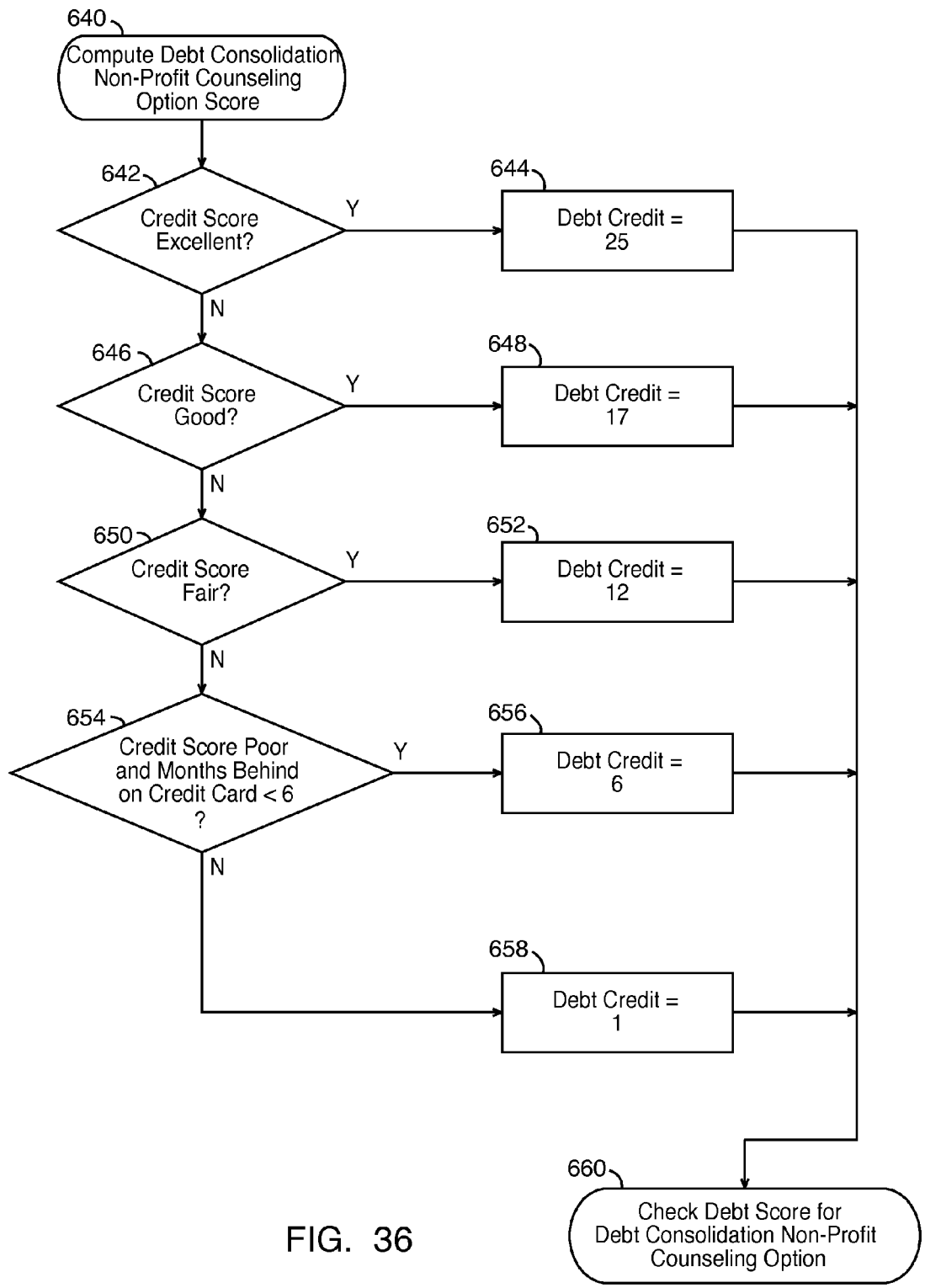
FIG. 36 illustrates a flow chart of a process of computing a debt consolidation non-profit counseling option score according to the method of FIG. 19.

Referring to FIG. 36, the debt consolidation non-profit counseling option score is computed (box 640) by scaling the credit score and the months behind on credit card payments of the user into a ratio of debt to credit (debt credit) variable. For instance, it is determined (box 642) if the credit score of the user is excellent, and, if so, the debt credit is set (box 644) equal to twenty-five (25).

Otherwise, it is determined (box 646) if the credit score of the user is good, and, if so, the debt credit is set (box 648) equal to seventeen (17).

Otherwise, it is determined (box 650) if the credit score of the user is fair, and, if so, the debt credit is set (box 652) equal to twelve (12).

Otherwise, it is determined (box 654) if the credit score of the user is poor and the months behind on the credit card payments is less than six (6) months, and, if so, the debt credit is set (box 656) equal to six (6).

Or else, the debt credit is set (box 658) equal to one (1).

Then, a debt score for debt consolidation non-profit counseling option is checked (box 660).

Figure 37:
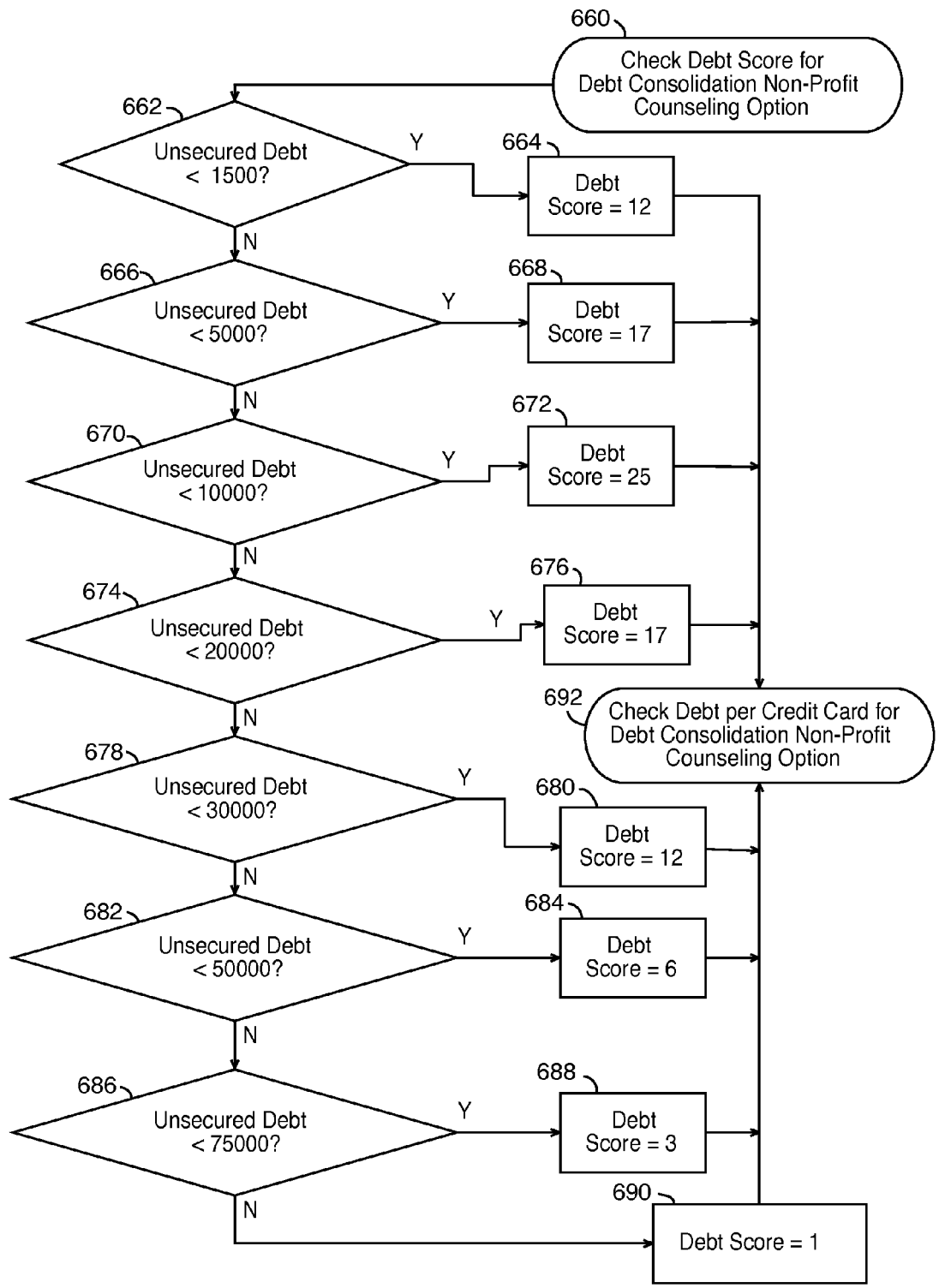
FIG. 37 illustrates a flow chart of a process of checking a debt score for the debt consolidation non-profit counseling option of FIG. 36.

Referring to FIG. 37, the debt score for the debt consolidation non-profit counseling option is checked (box 660) by scaling the unsecured debt of the user to a debt score variable. For instance, it is determined (box 662) if the unsecured debt of the user is less than $1,500, and, if so, the debt score is set (box 664) equal to twelve (12).

Otherwise, it is determined (box 666) if the unsecured debt of the user is less than $5,000, and, if so, the debt score is set (box 668) equal to seventeen (17).

Otherwise, it is determined (box 670) if the unsecured debt of the user is less than $10,000, and, if so, the debt score is set (box 672) equal to twenty-five (25).

Otherwise, it is determined (box 674) if the unsecured debt of the user is less than $20,000, and, if so, the debt score is set (box 676) equal to seventeen (17).

Otherwise, it is determined (box 678) if the unsecured debt of the user is less than $30,000, and, if so, the debt score is set (box 680) equal to twelve (12).

Otherwise, it is determined (box 682) if the unsecured debt of the user is less than $50,000, and, if so, the debt score is set (box 684) equal to six (6).

Otherwise, it is determined (box 686) if the unsecured debt of the user is less than $75,000, and, if so, the debt score is set (box 688) equal to three (3).

Or else, the debt score is set (box 690) equal to one (1).

Then, a debt per credit card variable (debtdiv) for the debt consolidation non-profit counseling option is checked (box 692).

Figure 38:
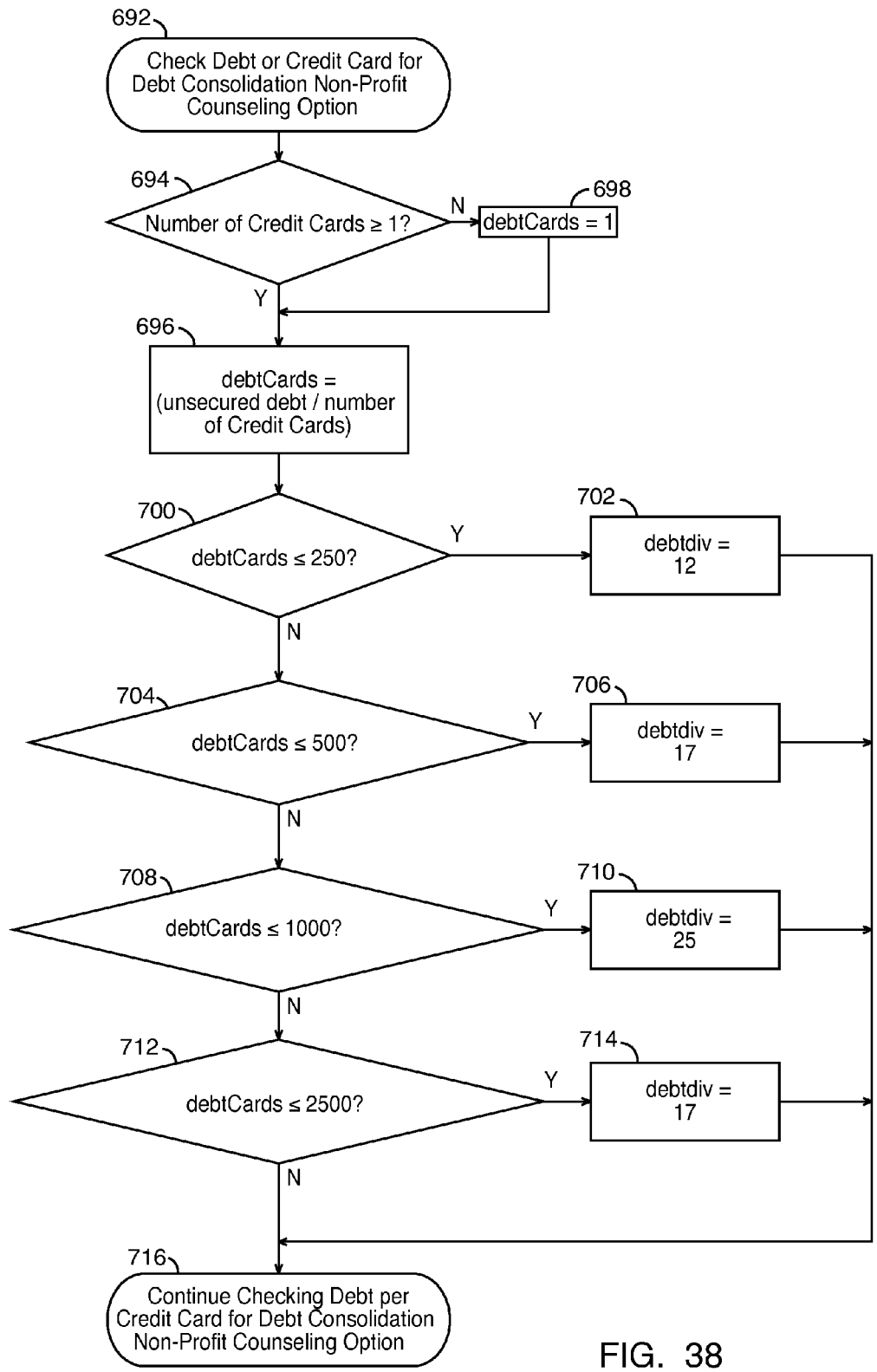
FIG. 38 illustrates a flow chart of a process of checking a debt per credit card for the debt consolidation non-profit counseling option of FIG. 36.

Referring to FIG. 38, the debt per credit card for the debt consolidation non-profit counseling option is checked (box 692) by determining (box 694) if the number of credit cards owned by the user is greater than or equal to one (1). If the user owns one or more credit cards, then a debt per card (debtcards) variable is calculated (box 696) according to the following equation:

$$debtcards=(\text{unsecured debt/number of credit cards}).$$

Otherwise, if the user owns no credit cards, then the debtcards is set (box 698) equal to one (1).

The debtcards is, then, scaled to a debt card score (debtdiv) variable. For instance, it is determined (box 700) if the debtcards is less than or equal to $250, and, if so, the debtdiv is set (box 702) equal to twelve (12).

Otherwise, it is determined (box 704) if the debtcards is less than or equal to $500, and, if so, the debtdiv is set (box 706) equal to seventeen (17).

Otherwise, it is determined (box 708) if the debtcards is less than or equal to $1,000, and, if so, the debtdiv is set (box 710) equal to twenty-five (25).

Or else, it is determined (box 712) if the debtcards is less than or equal to $2,500, and, if so, the debtdiv is set (box 714) equal to seventeen (17).

Then, the debt per credit card for the debt consolidation non-profit counseling option continues to be checked (box 716).

Figure 39:
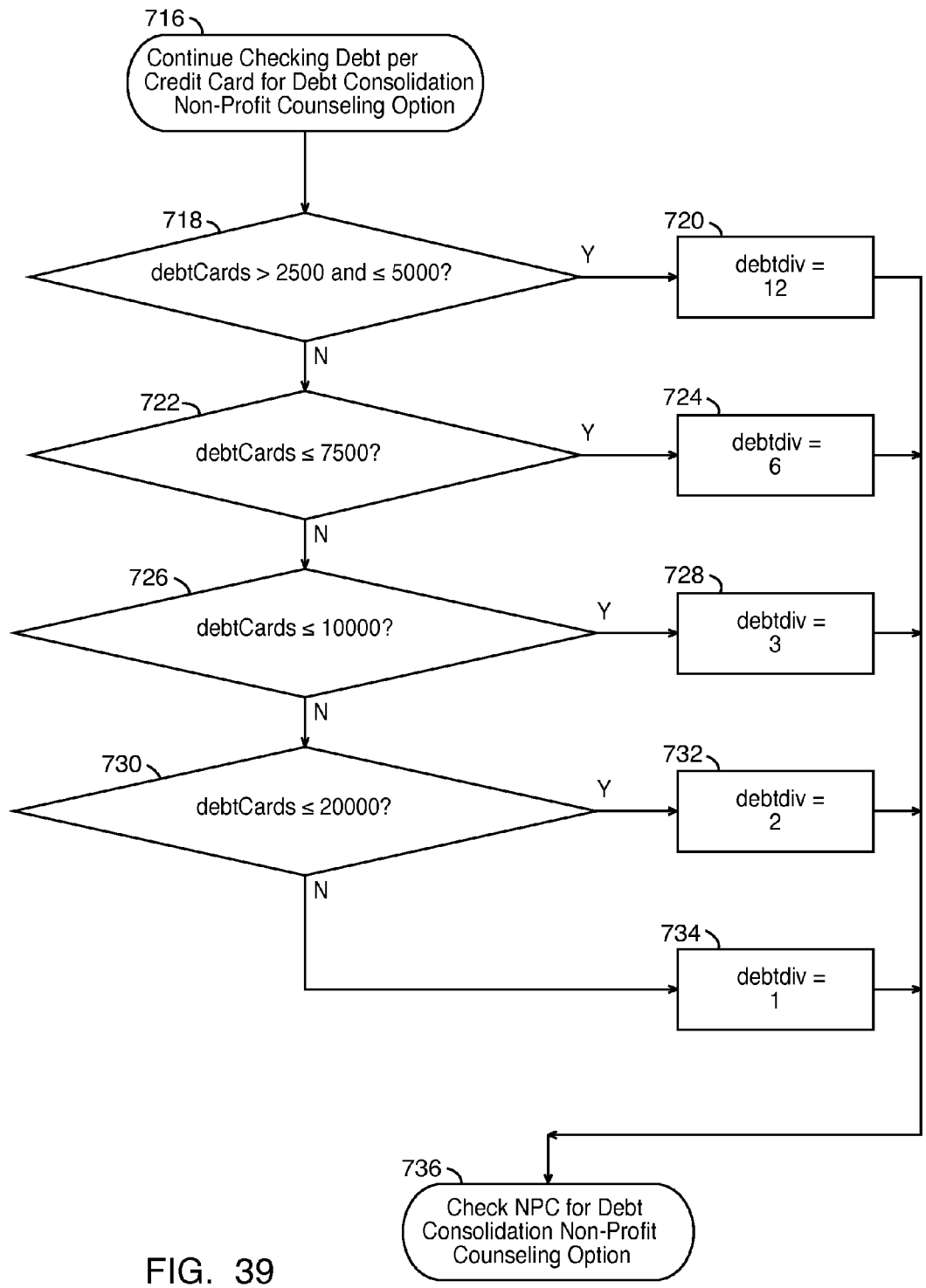
FIG. 39 illustrates a flow chart of a process of continuing to check a debt per credit card for the debt consolidation non-profit counseling option of FIG. 36.

Referring to FIG. 39, the debt per credit card for the debt consolidation non-profit counseling option continues to be checked (box 716) by continuing the scaling of the debtcards to the debtdiv. For instance, it is determined (box 718) if the debtcards is greater than $2,500 and less than or equal to $5,000, and, if so, the debtdiv is set (box 720) equal to twelve (12).

Otherwise, it is determined (box 722) if the debtcards is less than or equal to $7,500, and, if so, the debtdiv is set (box 724) equal to six (6).

Otherwise, it is determined (box 726) if the debtcards is less than or equal to $10,000, and, if so, the debtdiv is set (box 728) equal to three (3).

Otherwise, it is determined (box 730) if the debtcards is less than or equal to $20,000, and, if so, the debtdiv is set (box 732) equal to two (2).

Otherwise, the debtdiv is set (box 734) equal to one (1).

Then, a non-profit counseling (NPC) variable for the debt consolidation non-profit counseling option is checked (box 736).

Figure 40:
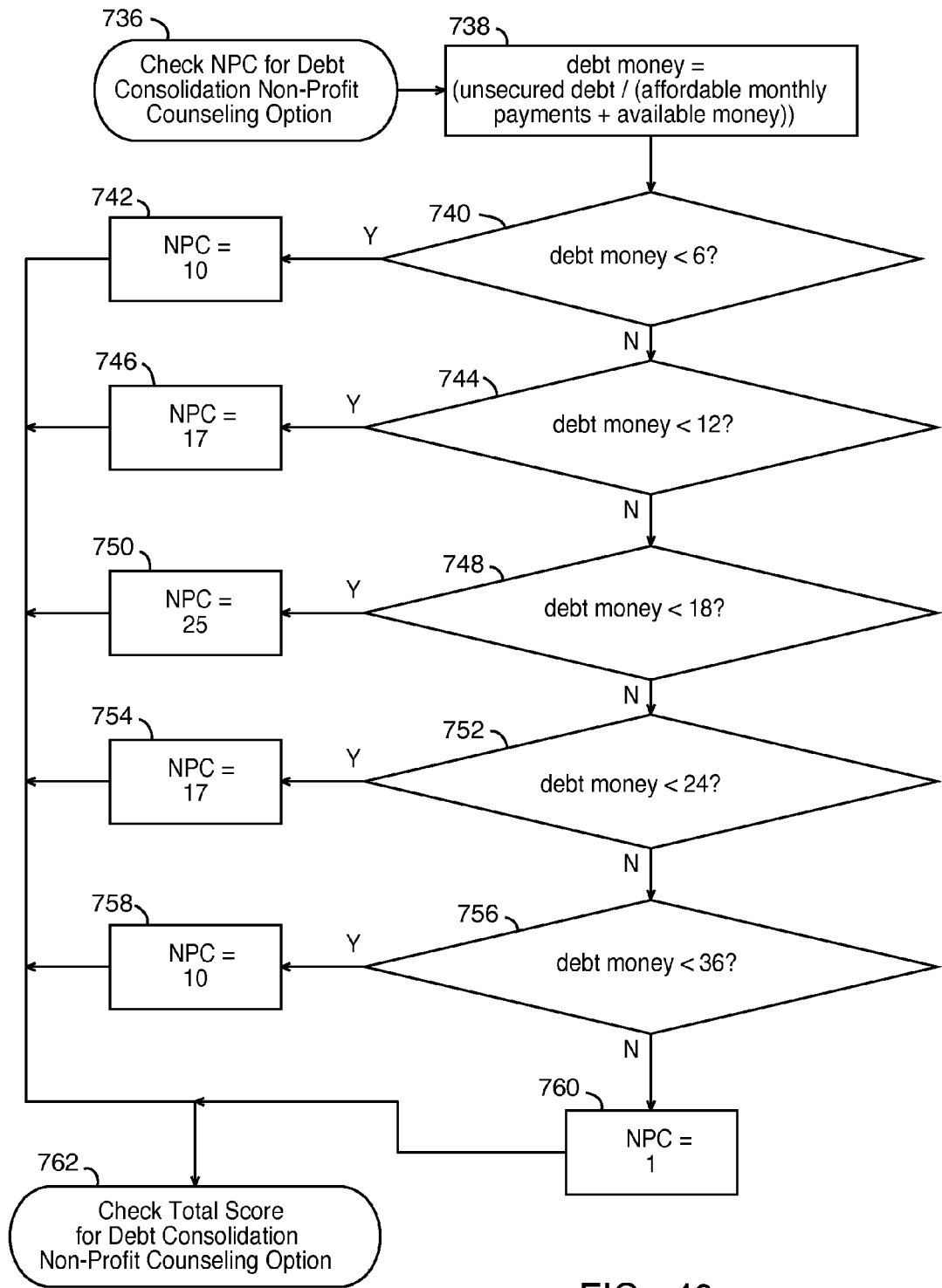
FIG. 40 illustrates a flow chart of a process of checking a non-profit counseling variable for a debt consolidation non-profit counseling option of FIG. 36.

Referring to FIG. 40, the non-profit counseling (NPC) variable for the debt consolidation non-profit counseling option is checked (box 736) by calculating (box 738) a debt money variable according to the following equation:

$$\text{debt money} = (\text{unsecured debt}/(\text{affordable monthly payments} + \text{available money})).$$

The debt money is, then, scaled to the NPC. For instance, it is determined (box 740) if the debt money is less than six (6), and, if so, the NPC is set (box 742) equal to ten (10).

Otherwise, it is determined (box 744) if the debt money is less than twelve (12), and, if so, the NPC is set (box 746) equal to seventeen (17).

Otherwise, it is determined (box 748) if the debt money is less than eighteen (18), and, if so, the NPC is set (box 750) equal to twenty-five (25).

Otherwise, it is determined (box 752) if the debt money is less than twenty-four (24), and, if so, the NPC is set (box 754) equal to seventeen (17).

Otherwise, it is determined (box 756) if the debt money is less than thirty-six (36), and, if so, the NPC is set (box 758) equal to ten (10).

Or else, the NPC is set (box 760) equal to one (1).

Then, a total score for the debt consolidation non-profit counseling option is checked (box 762).

Figure 41:
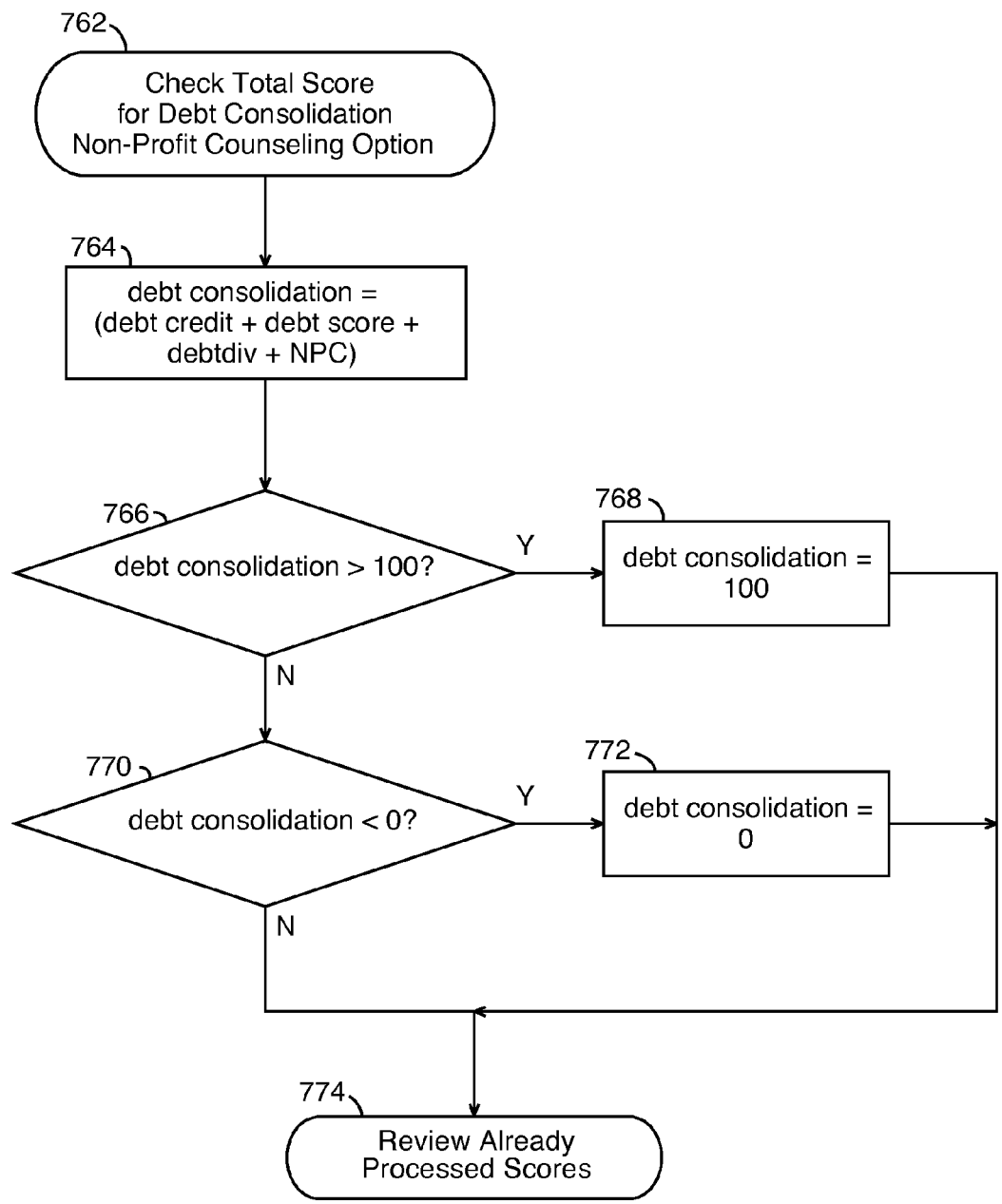
FIG. 41 illustrates a flow chart of a process of checking a total score for the debt consolidation non-profit counseling option of FIG. 36.

Referring to FIG. 41, the total score for the debt consolidation non-profit counseling option is checked (box 762) by calculating (box 764) a debt consolidation variable according to the following equation:

$$\text{debt consolidation} = (\text{debt credit} + \text{debt score} + \text{debtdiv} + \text{NPC}).$$

The debt consolidation is, then, outlier restricted to a minimum of zero (0) and a maximum of one hundred (100). For instance, it is determined (box 766) if the debt consolidation is greater than one hundred (100), and, if so, the debt consolidation is set (box 768) equal to one hundred (100).

Otherwise, it is determined (box 770) if the debt consolidation is less than zero (0), and, if so, the debt consolidation is set (box 772) equal to zero (0).

The debt consolidation is saved as the debt consolidation non-profit counseling option score in the array of action options. Once the debt consolidation non-profit counseling option score is saved, the already processed scores are reviewed (box 774).

Figure 42:
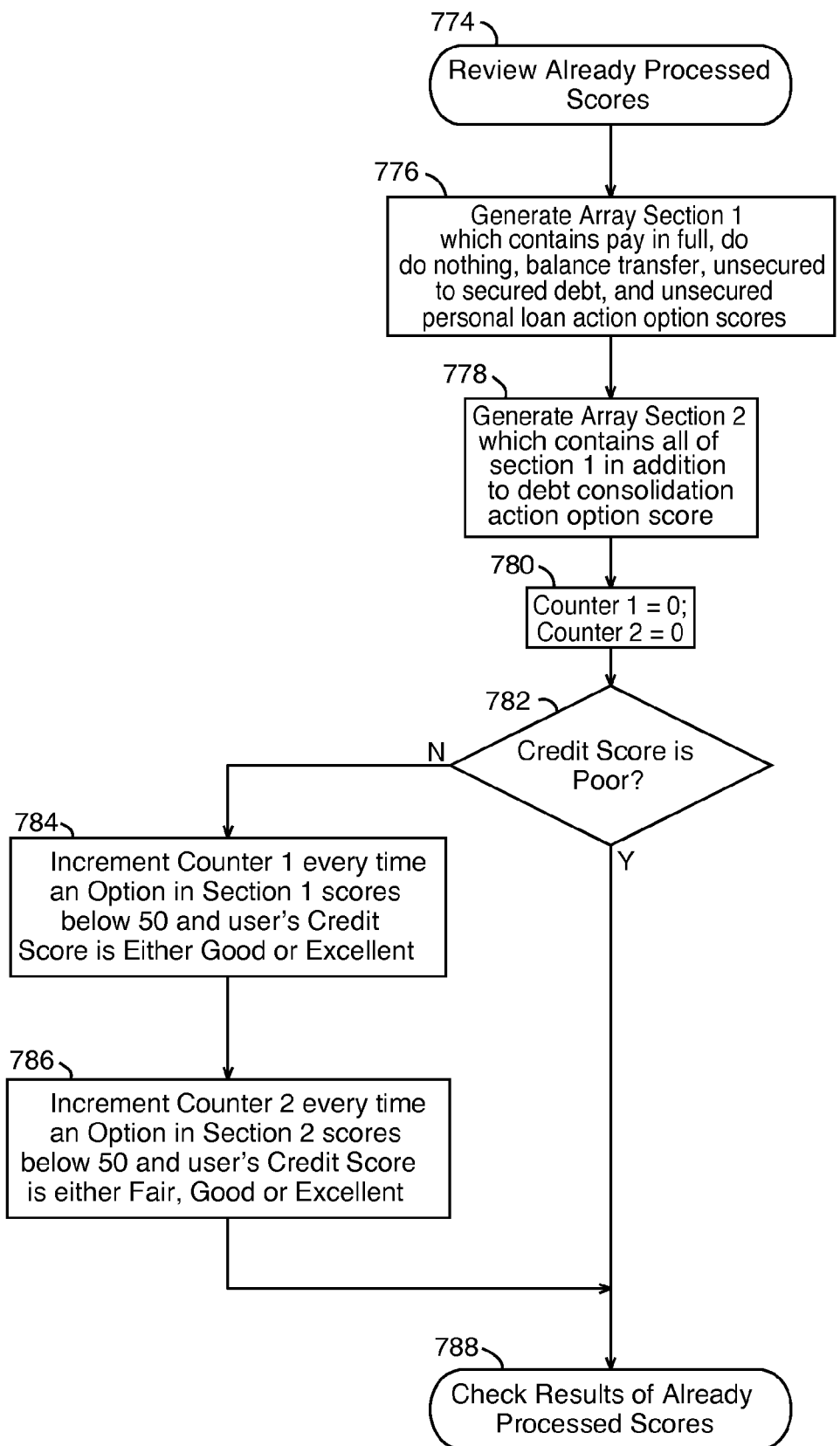
FIG. 42 illustrates a flow chart of a process of reviewing already processed scores according to the method of FIG. 19.

Referring to FIG. 42, the already processed scores are reviewed (box 774) by generating (box 776) a first array section (array section1) within the array of action options, which contains the pay in full option score, the do nothing option score, the balance transfer to a zero percent (0%) annual percent rate (APR) unsecured credit card option score, the unsecured to secured debt option score and the unsecured personal loan option score.

In addition, a second array section (array section2) is generated (box 778) within the array of action options, which contains all of array section1 as well as the debt consolidation non-profit counseling option score.

A counter1 variable and a counter2 variable are set (box 780) equal to zero (0).

Then, it is determined (box 782) whether the credit score of the user is poor, and, if not, the counter1 is incremented (box 784) every time one of the scores of the action options in the array section1 is below fifty (50) and the credit score of the user is either good or excellent.

In addition, the counter2 is incremented (box 786) every time one of the scores of the action options in the array section2 is below fifty (50) and the credit score of the user is either fair, good or excellent.

Then, the results of the already processed scores are checked (box 788).

Figure 43:
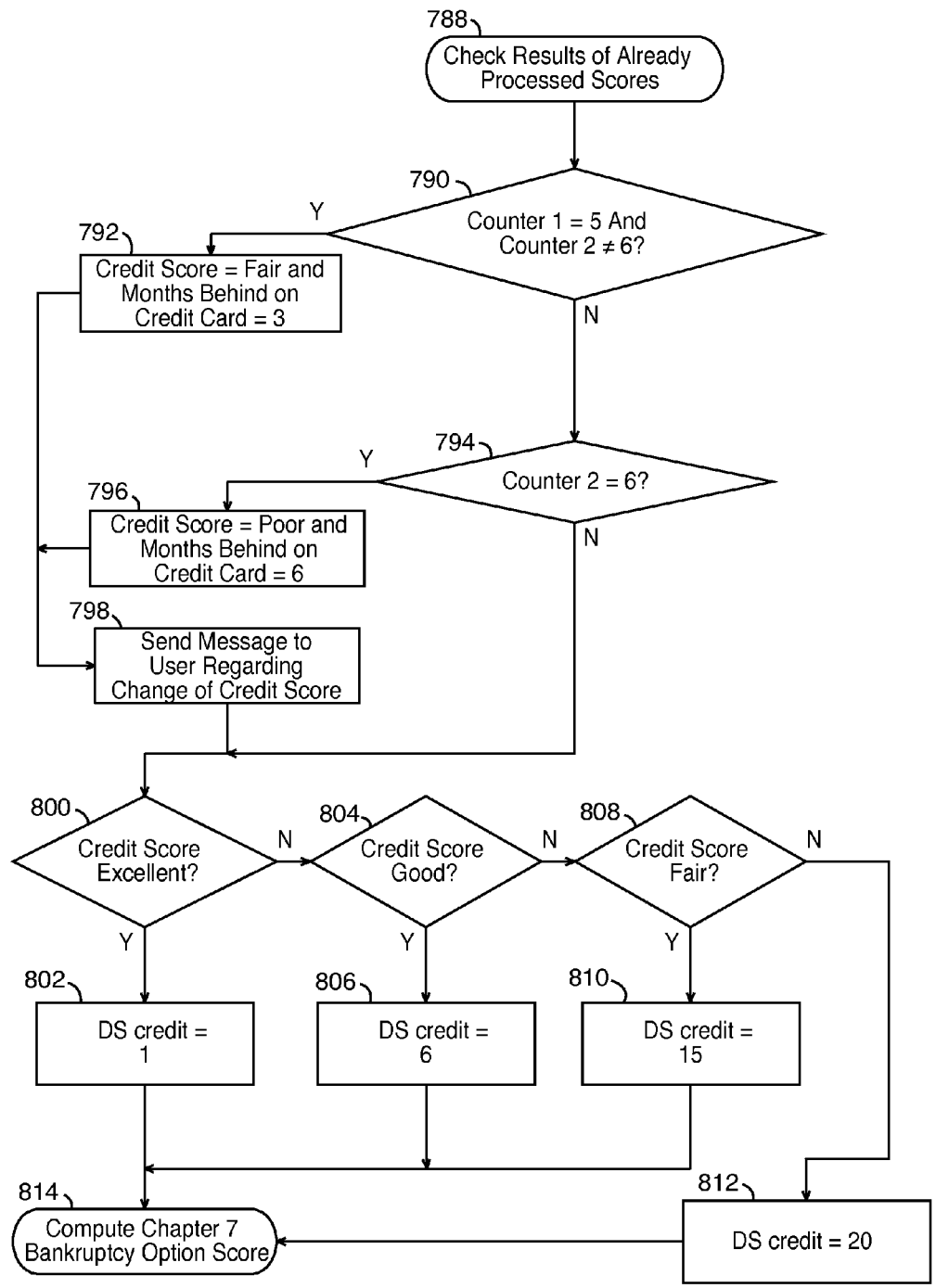
FIG. 43 illustrates a flow chart of a process of checking results of the already processed scores of FIG. 42.

Referring to FIG. 43, the results of the already processed scores are checked (box 788) by determining (box 790) if counter 1 is equal to five (5) and counter2 is not equal to six (6), and, if so, the credit score and the months behind on credit card payments are set (box 792) equal to fair and three (3), respectively.

Otherwise, it is determined (box 794) if counter2 is equal to six (6), and, if so, the credit score and the months behind on credit card payments are set (box 796) equal to poor and six (6), respectively.

The changing of the credit score and the months behind on credit card payments corrects inaccurate data regarding the user's credit score.

If either determination (box 790, box 794) are satisfied and the credit score and the months behind on credit card payments are set to new values, a message is sent (box 798) to the user regarding the change of the credit score.

Next, the credit score is scaled to a debt settlement credit score (DS credit) variable. For instance, it is determined (box 800) if the credit score is excellent, and, if so, the DS credit is set (box 802) equal to one (1).

Otherwise, it is determined (box 804) if the credit score is good, and, if so, the DS credit is set (box 806) equal to six (6).

Otherwise, it is determined (box 808) if the credit score is fair, and, if so, the DS credit is set (box 810) equal to fifteen (15).

Or else, the DS credit is set (box 812) equal to twenty (20).

Then, the next action option score—the chapter 7 bankruptcy option score—is computed (box 814).

Figure 44:
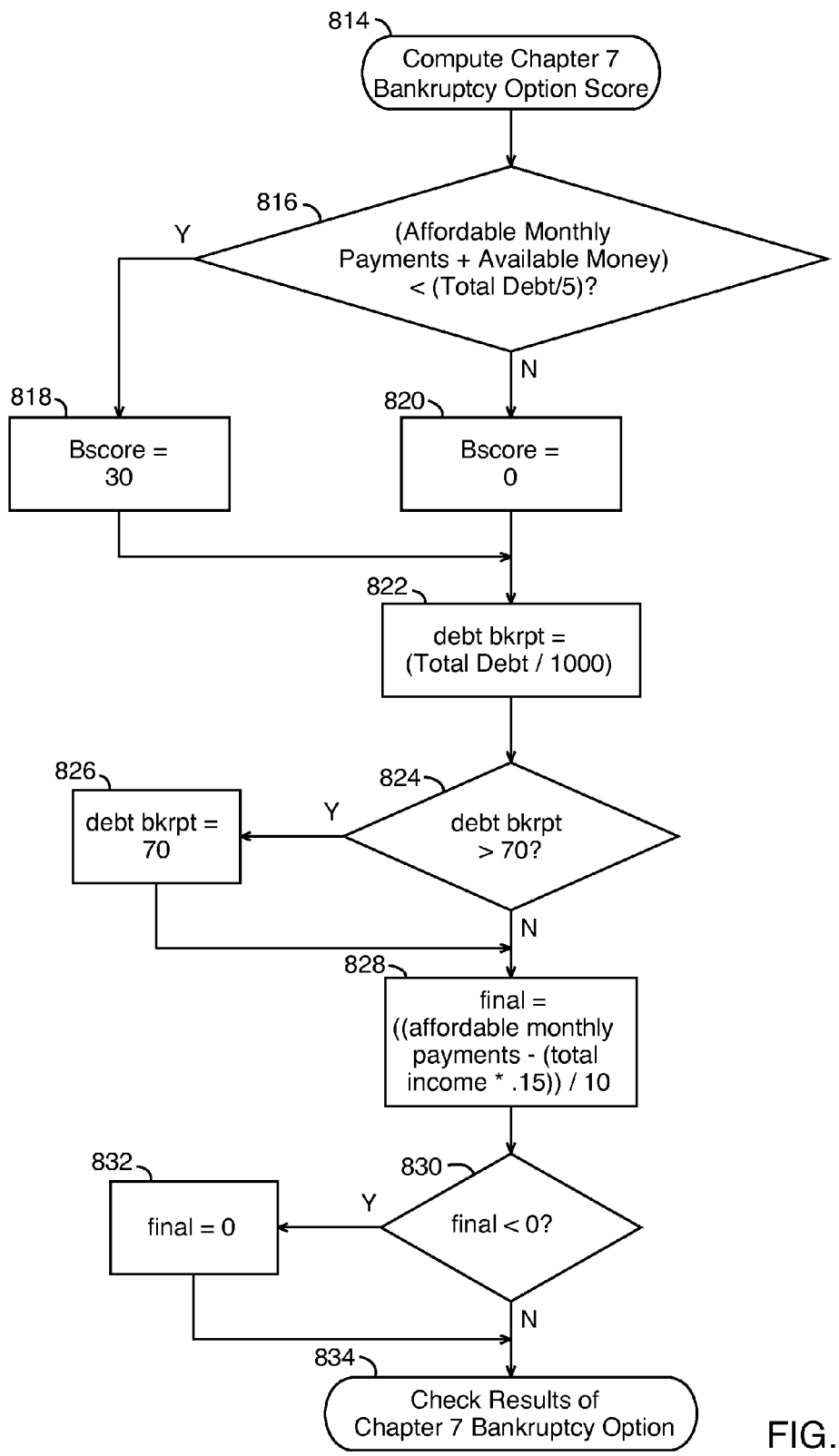
FIG. 44 illustrates a flow chart of a process of computing a chapter 7 bankruptcy option score according to the method of FIG. 19.

Referring to FIG. 44, the chapter 7 bankruptcy option score is computed (box 814) by determining (box 816) if the affordable monthly payments plus the available money are less than the total debt divided by five (5) and, if so, a baseline repayment score (bscore) variable is set (box 818) equal to thirty (30).

Otherwise, if not, the bscore is set (box 820) equal to zero (0).

A debt in bankruptcy (debt bkrpt) variable is calculated (box 822) according to the following equation:

$$\text{debt bkrpt} = (\text{total debt}/1000).$$

The debt bkrpt is, then, outlier restricted to a maximum of seventy (70). For instance, it is determined (box 824) if the debt bkrpt is greater than seventy (70), and, if so, the debt bkrpt is set (box 826) equal to seventy (70).

A final variable is calculated (box 828) according to the following equation:

$$\text{final} = (((\text{affordable monthly payments} - (\text{total income} * 0.15))/10).$$

The final is, then, outlier restricted to a minimum of zero (0). For instance, it is determined (box 830) if the final is less than zero (0), and, if so, the final is set (box 832) equal to zero (0).

Then, the results of the chapter 7 bankruptcy option are checked (box 834).

Figure 45:
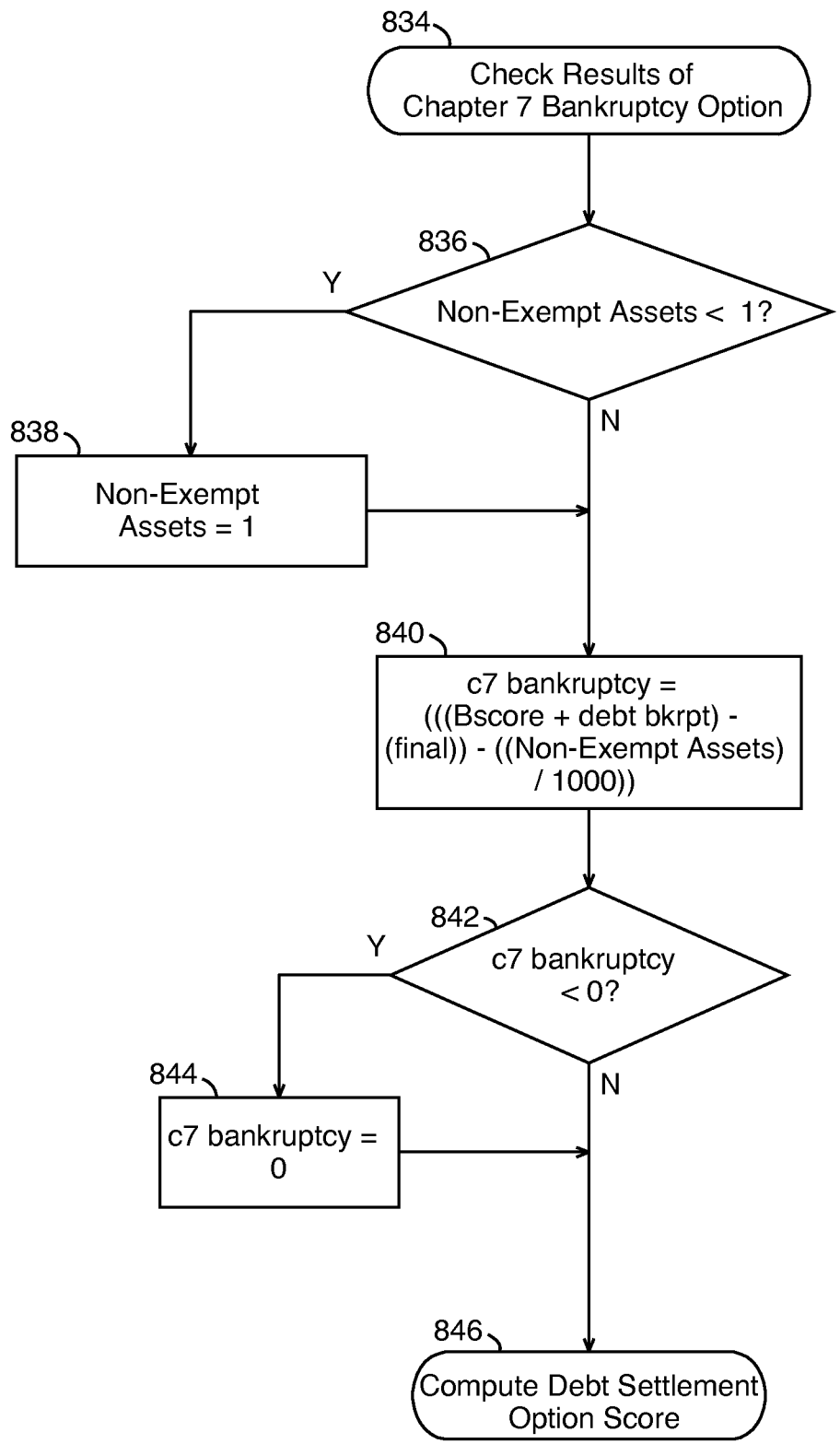
FIG. 45 illustrates a flow chart of a process of checking results of the chapter 7 bankruptcy option of FIG. 44.

Referring to FIG. 45, the results of the chapter 7 bankruptcy option are checked (box 834) by outlier restricting the non-exempt assets of the user to a minimum of one (1). For instance, it is determined (box 836) if the non-exempt assets are less than one (1), and, if so, the non-exempt assets are set (box 838) equal to one (1).

A chapter 7 bankruptcy (c7 bankruptcy) variable is calculated (box 840) according to the following equation:

$$c7\ \text{bankruptcy} = (((b\text{score} + \text{debt bkrpt}) - (\text{final})) - (\text{non-exempt assets}/1000)).$$

The c7 bankruptcy is, then, outlier restricted to a minimum of zero (0). For instance, it is determined (box 842) if the c7 bankruptcy is less than zero (0), and, if so, the c7 bankruptcy is set (box 844) equal to zero (0).

The c7 bankruptcy is stored as the chapter 7 bankruptcy option score in the array of action options. Once the chapter 7 bankruptcy option score is saved, the next action option score—the debt settlement option score—is computed (box 846).

Figure 46:
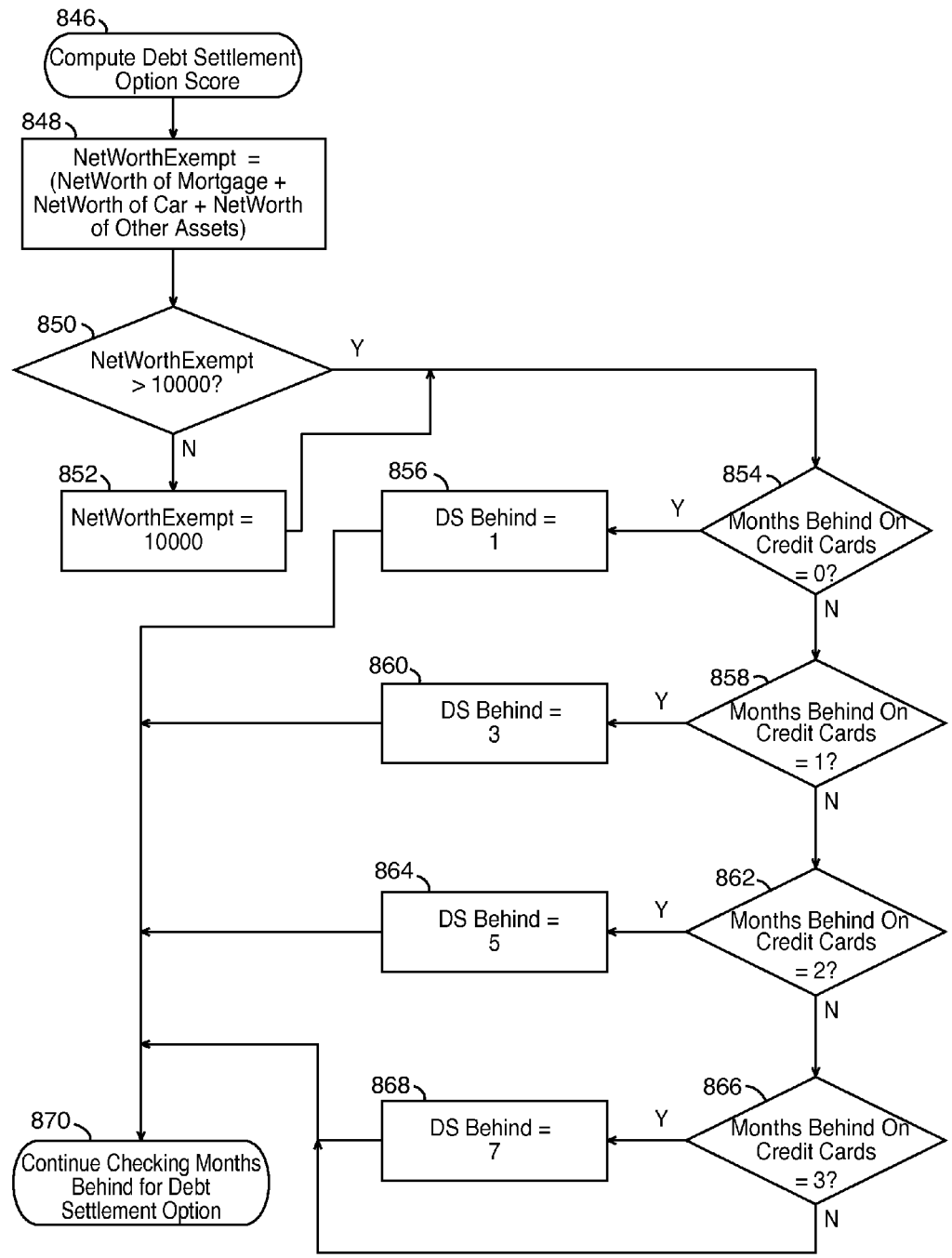
FIG. 46 illustrates a flow chart of a process of computing a debt settlement option score according to the method of FIG. 19.

Referring to FIG. 46, the debt settlement option score is computed (box 846) by calculating (box 848) a net worth of exempt assets (networthexempt) variable according to the following equation:

$$networthexempt=(networth\ of\ mortgage+networth\ of\ car+networth\ of\ other\ assets).$$

The networthexempt is, then, outlier restricted to a maximum of ten-thousand (10,000). For instance, it is determined (box 850) if the networthexempt is greater than ten-thousand (10,000), and, if so, the networthexempt is set (box 852) equal to ten-thousand (10,000).

Then, the months behind on credit card payments is scaled to a debt settlement months behind on credit cards (ds behind) variable. For instance, it is determined (box 854) if the months behind on credit cards is equal to zero (0), and, if so, the ds behind is set (box 856) equal to one (1).

Otherwise, it is determined (box 858) if the months behind on credit cards is equal to one (1), and, if so, the ds behind is set (box 860) equal to three (3).

Otherwise, it is determined (box 862) if the months behind on credit cards is equal to two (2), and, if so, the ds behind is set (box 864) equal to five (5).

Otherwise, it is determined (box 866) if the months behind on credit cards is equal to three (3), and, if so, the ds behind is set (box 868) equal to seven (7).

Then, the months behind for the debt settlement option continues to be checked (box 870).

Figure 47:
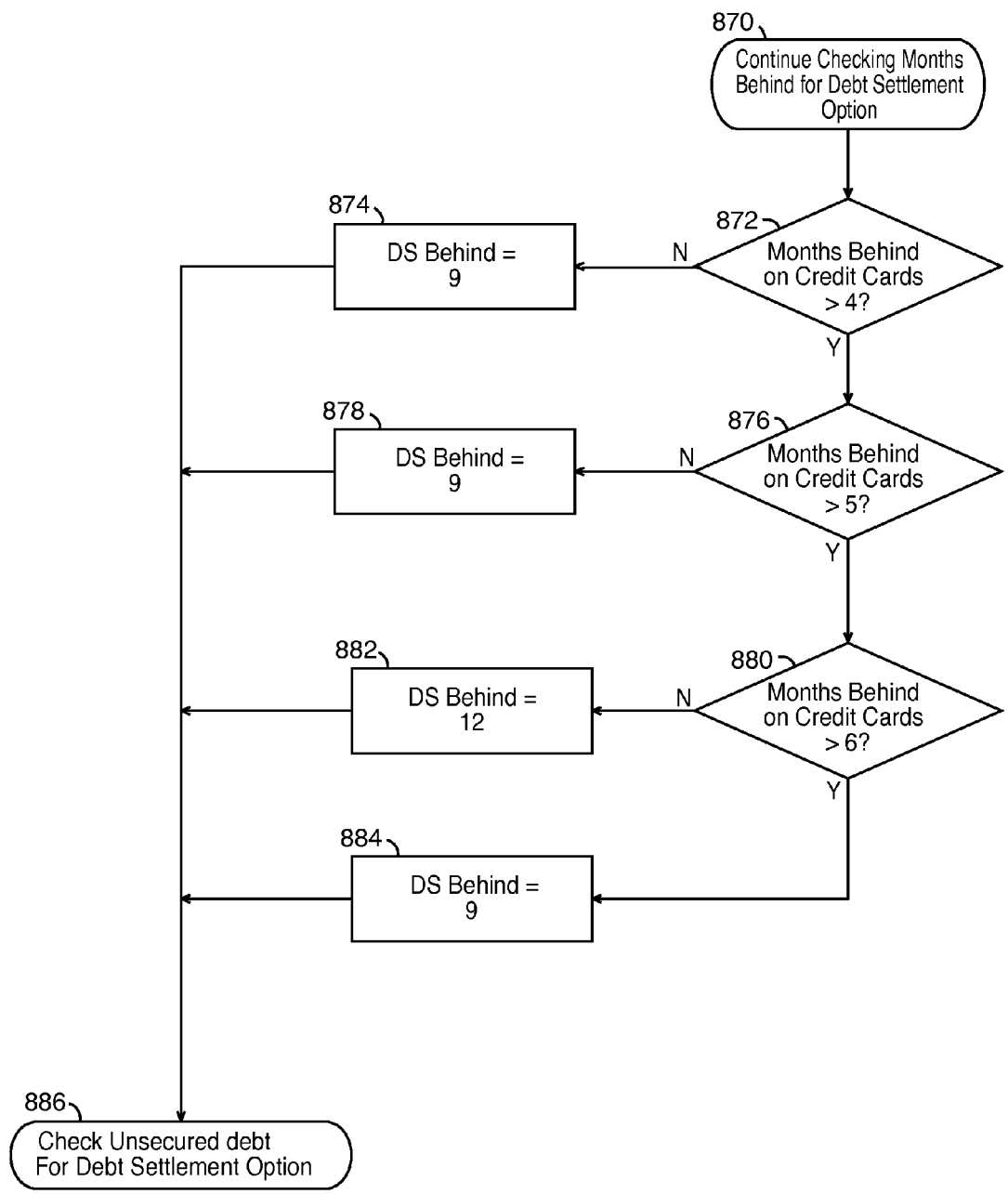
FIG. 47 illustrates a flow chart of a process of continuing to check a number of months a user is behind on credit card payments for the debt settlement option of FIG. 46.

Referring to FIG. 47, the months behind for debt settlement option continues to be checked (box 870) by continuing to scale the months behind on credit card payments to the ds behind. For instance, it is determined (box 872) if the months behind on credit cards is equal to four (4), and, if so, the ds behind is set (box 874) equal to nine (9).

Otherwise, it is determined (box 876) if the months behind on credit cards is equal to five (5), and, if so, the ds behind is set (box 878) equal to nine (9).

Otherwise, it is determined (box 880) if the months behind on credit cards is equal to six (6), and, if so, the ds behind is set (box 882) equal to twelve (12).

Or else, the ds behind is set (box 884) equal to nine (9).

Then, unsecured debt for the debt settlement option is checked (box 886).

Figure 48:
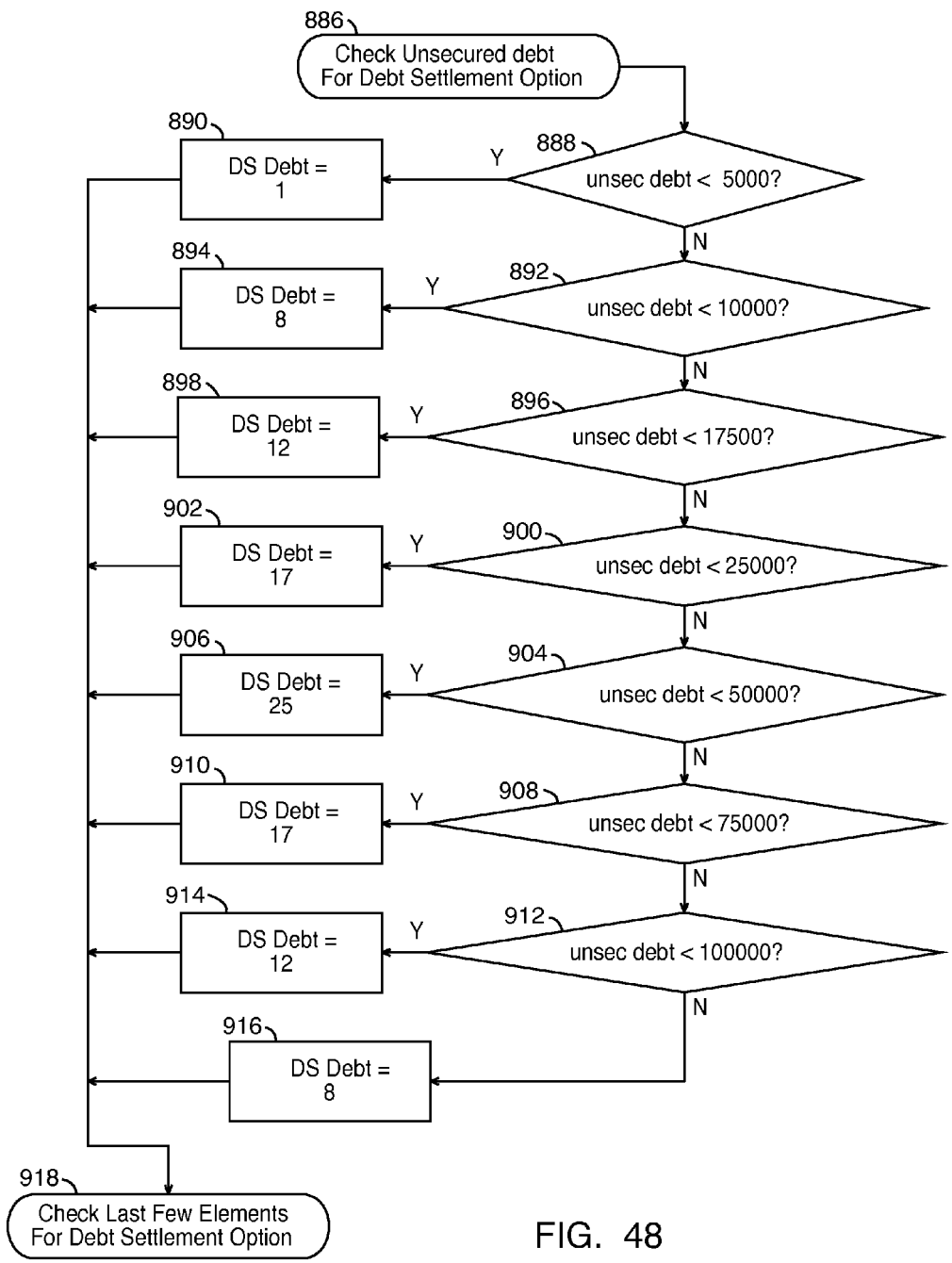
FIG. 48 illustrates a flow chart of a process of checking unsecured debt for the debt settlement option of FIG. 46.

Referring to FIG. 48, the unsecured debt for the debt settlement option is checked (box 886) by scaling the unsecured debt (unsec debt) to a debt settlement debt (ds debt) variable. For instance, it is determined (box 888) if the unsec debt is less than $5,000, and, if so, the ds debt is set (box 890) equal to one (1).

Otherwise, it is determined (box 892) if the unsec debt is less than $10,000, and, if so, the ds debt is set (box 894) equal to eight (8).

Otherwise, it is determined (box 896) if the unsec debt is less than $17,500, and, if so, the ds debt is set (box 898) equal to twelve (12).

Otherwise, it is determined (box 900) if the unsec debt is less than $25,000, and, if so, the ds debt is set (box 902) equal to seventeen (17).

Otherwise, it is determined (box 904) if the unsec debt is less than $50,000, and, if so, the ds debt is set (box 906) equal to twenty-five (25).

Otherwise, it is determined (box 908) if the unsec debt is less than $75,000, and, if so, the ds debt is set (box 910) equal to seventeen (17).

Otherwise, it is determined (box 912) if the unsec debt is less than $100,000, and, if so, the ds debt is set (box 914) equal to twelve (12).

Or else, the ds debt is set (box 916) equal to eight (8).

Then, a last few elements for the debt settlement option are checked (box 918).

Figure 49:
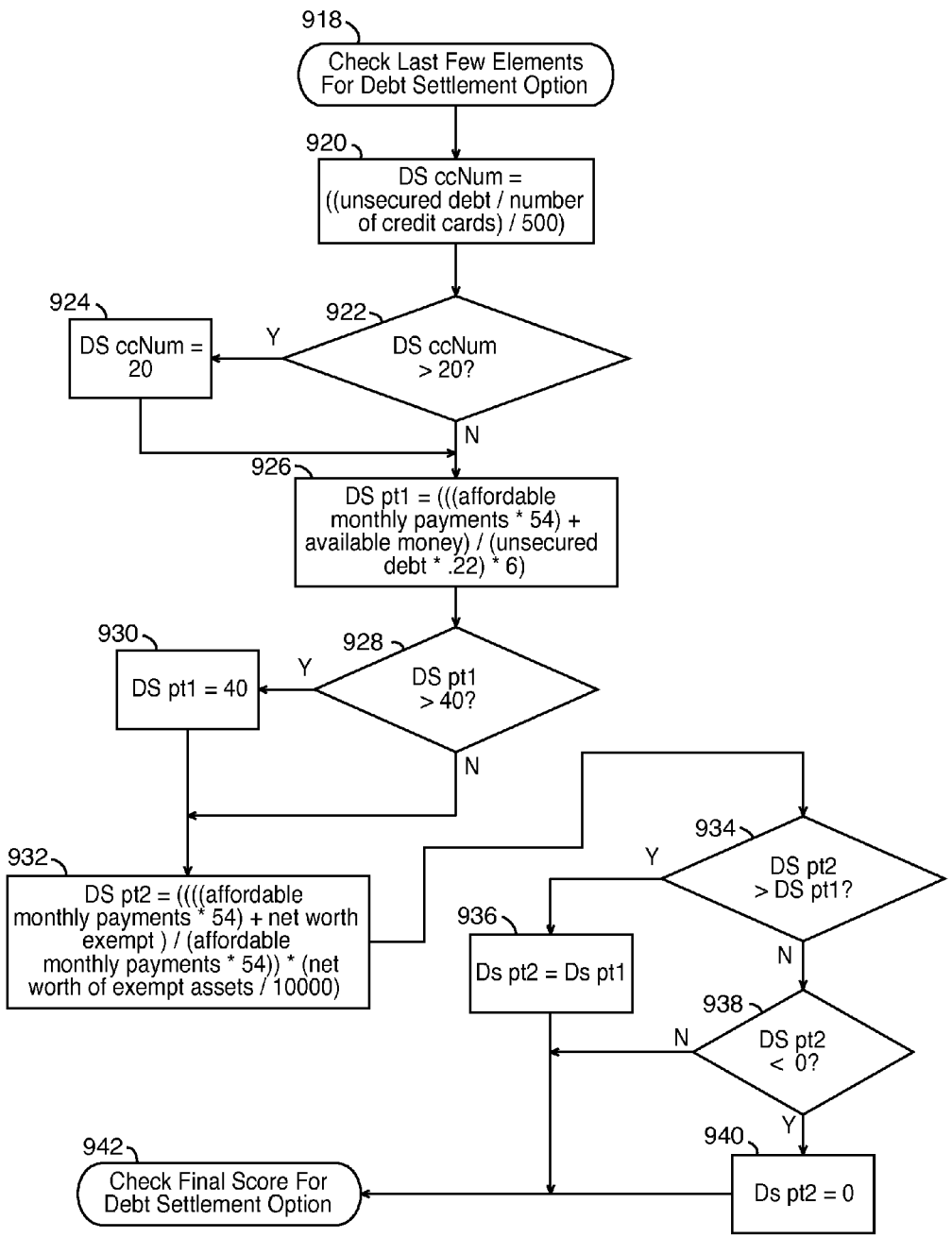
FIG. 49 illustrates a flow chart of a process of checking a last few elements for the debt settlement option of FIG. 46.

Referring to FIG. 49, the last few elements for the debt settlement option are checked (box 918) by calculating (box 920) a debt settlement number of credit cards (ds ccnum) variable according to the following equation:

$$ds\ ccnum=((unsecured\ debt/number\ of\ credit\ cards)/500).$$

The ds ccnum is, then, outlier restricted to a maximum of twenty (20). For instance, it is determined (box 922) if the ds ccnum is greater than twenty (20), and, if so, the ds ccnum is set (box 924) equal to twenty (20).

Then, a first debt settlement place holder (ds pt1) variable is calculated (box 926) according to the following equation:

$$ds\ pt1=(((affordable\ monthly\ payments*54)+available\ money)/(unsecured\ debt*0.22)*6).$$

The ds pt1 is, then, outlier restricted to a maximum of forty (40). For instance, it is determined (box 928) if the ds pt1 is greater than forty (40), and, if so, the ds pt1 is set (box 930) equal to forty (40).

Then, a second debt settlement place holder (ds pt2) variable is calculated (box 932) according to the following equation:

$$ds\ pt2=((((affordable\ monthly\ payments*54)+networthexempt)/(affordable\ monthly\ payments*54))*(networthexempt/10000)).$$

The ds pt2 is, then, outlier restricted to a minimum of zero (0) and to a maximum of the ds pt 1. For instance, it is determined (box 934) if the ds pt2 is greater than the ds pt 1, and, if so, the ds pt2 is set (box 936) equal to the ds pt1.

Otherwise, it is determined (box 938) if the ds pt2 is less than zero (0), and, if so, the ds pt2 is set (box 940) equal to zero (0).

Then, the final score for the debt settlement option is checked (box 942).

Figure 50:
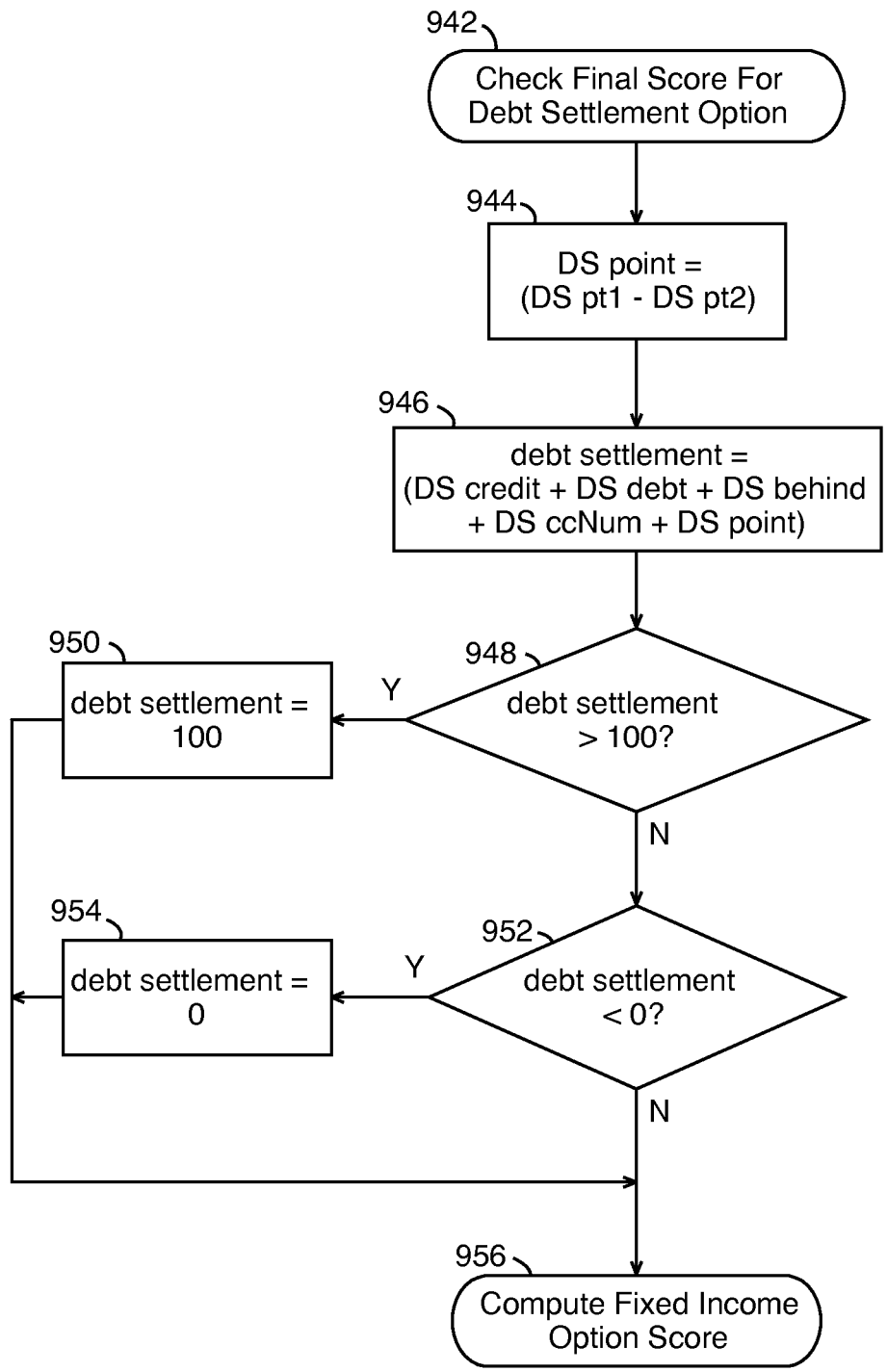
FIG. 50 illustrates a flow chart of a process of checking a final score for a debt settlement option of FIG. 46.

Referring to FIG. 50, the final score for the debt settlement option is checked (box 942) by calculating (box 944) a debt settlement set point (ds point) variable according to the following equation:

$$ds\ point=(ds\ pt1-ds\ pt2).$$

A debt settlement final (debt settlement) variable is calculated (box 946) according to the following equation:

$$debt\ settlement=(ds\ credit+ds\ debt+ds\ behind+ds\ ccnum+ds\ point).$$

The debt settlement is, then, outlier restricted to a minimum of (0) and a maximum of one hundred (100). For instance, it is determined (box 948) if the debt settlement is greater than one hundred (100), and, if so, the debt settlement is set (box 950) equal to one hundred (100).

Otherwise, it is determined (box 952) if the debt settlement is less than zero (0), and, if so, the debt settlement is set (box 954) equal to zero (0).

The debt settlement is saved as the debt settlement action option score in the array of action options. Once the debt settlement option score is saved, the next action option score—the fixed income option score—is calculated (box 956).

Figure 51:
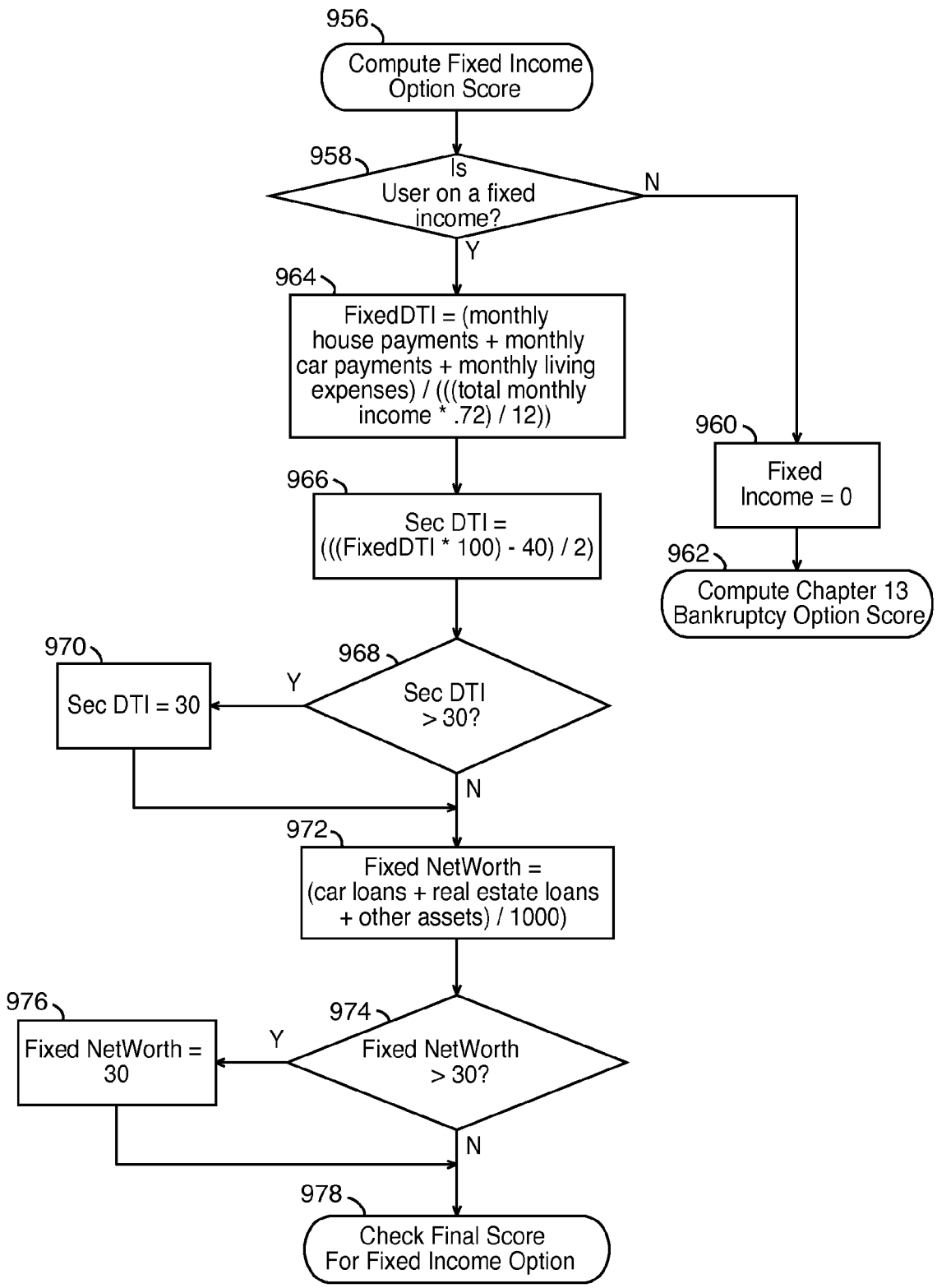
FIG. 51 illustrates a flow chart of a process of computing a fixed income option score according to the method of FIG. 19.

Referring to FIG. 51, the fixed income option score is computed (box 956) by determining (box 958) if the user is on a fixed income (i.e., has a steady source of income), and, if not, a fixed income variable is set (box 960) equal to zero (0). The fixed income variable is saved as the fixed income option score in the array of action options. Once the fixed income option score is saved, the next action option score—the chapter 13 bankruptcy option score—is computed (box 962).

Otherwise, if the user is on a fixed income, a fixed debt to income (fixeddti) variable is calculated (box 964) according to the following equation:

fixeddti=((monthly house payments+monthly car payments+monthly living expenses)/((total monthly income*0.72)/12)).

A secured debt to income (sec dti) variable is calculated (box 966) according to the following equation:

sec dti=(((fixeddti*100)−40)/2).

The sec dti is, then, outlier restricted to a maximum of thirty (30). For instance, it is determined (box 968) if the sec dti is greater than thirty (30), and, if so, the sec dti is set (box 970) equal to thirty (30).

A fixed income net worth (fixed networth) variable is calculated (box 972) according to the following equation:

fixed networth=((car loans+real estate loans+other assets)/1000).

The fixed networth, then, is outlier restricted to a maximum of thirty (30). For instance, it is determined (box 974) if the fixed networth is greater than thirty (30), and, if so, the fixed networth is set (box 976) equal to thirty (30).

Then, a final score for the fixed income option is checked (box 978).

Figure 52:
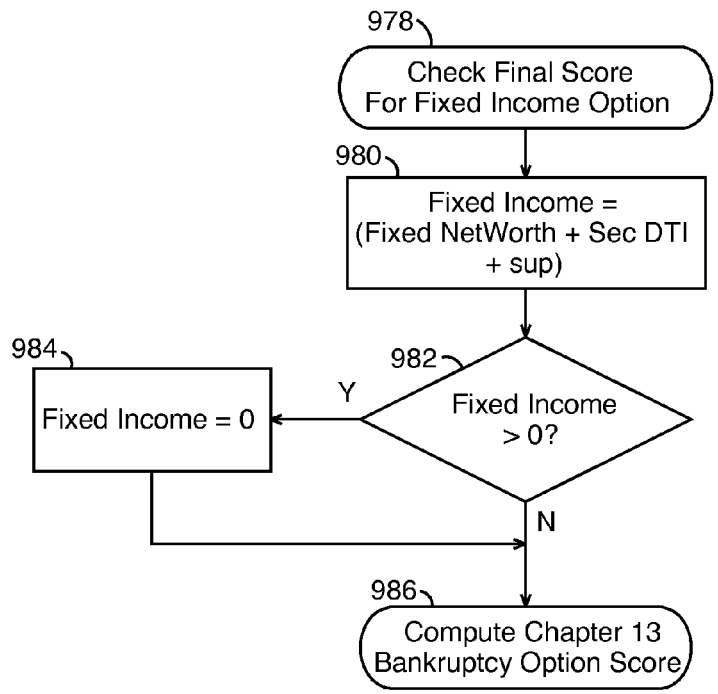
FIG. 52 illustrates a flow chart of a process of checking a final score for the fixed income option of FIG. 51.

Referring to FIG. 52, the final score for the fixed income option is checked (box 978) by calculating (box 980) the fixed income according to the following equation:

fixed income=(fixed networth+sec dti+sup).

The sup is a value determined from a look-up table based on the employment status of the user (i.e., full time, part time, unemployed, retired, etc.).

The fixed income is, then, outlier restricted to a minimum of zero (0). For instance, it is determined (box 982) if the fixed income is less than zero (0), and, if so, the fixed income is set (box 984) equal to zero (0).

The fixed income is saved as the fixed income option score in the array of action options. Once the fixed income options score is saved, the next action option score—the chapter 13 bankruptcy option score—is computed (box 986).

Figure 53:
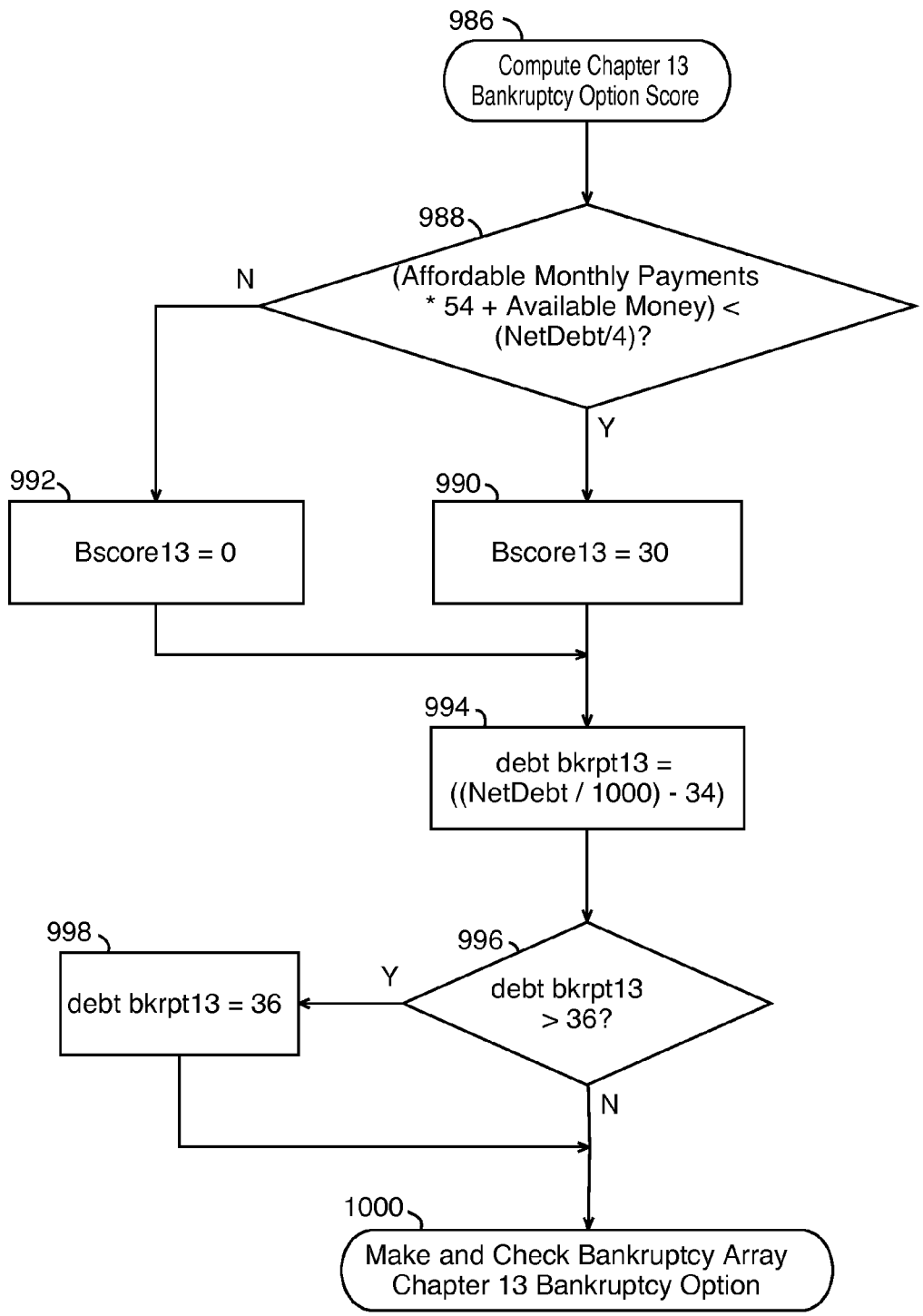
FIG. 53 illustrates a flow chart of a process of computing a chapter 13 bankruptcy option score according to the method of FIG. 19.

Referring to FIG. 53, the chapter 13 bankruptcy option score is computed (box 986) by determining (box 988) if the affordable monthly payments times fifty-four (54) plus the available money is greater than the net debt divided by four (4), and, if so, a baseline chapter 13 score (bscore13) variable is set (box 990) equal to thirty (30).

Otherwise, if not, the bscore13 is set (box 992) equal to zero (0).

Once the bscore13 is set, a debt in chapter 13 bankruptcy (debt bkrpt13) variable is calculated (box 994) according to the following equation:

debt bkrpt13=((netdebt/1000)−34).

The debt bkrpt13 is, then, outlier restricted to a maximum of thirty-six (36). For instance, it is determined (box 996) if the debt bkrpt13 is greater than thirty-six (36), and, if so, the debt bkrpt13 is set (box 998) equal to thirty-six (36).

Then, a bankruptcy array for the chapter 13 bankruptcy option is made and checked (box 1000).

Figure 54:
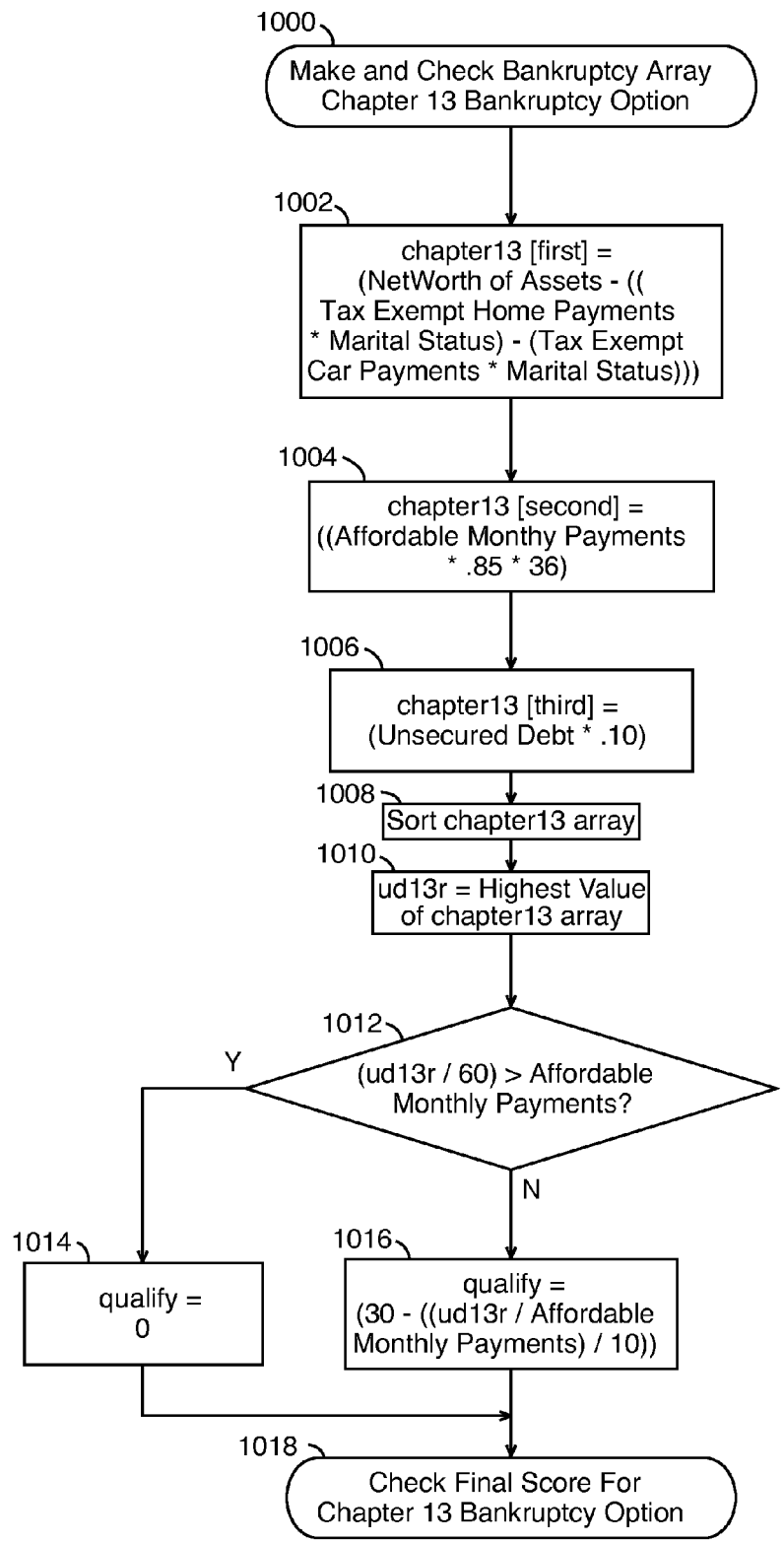
FIG. 54 illustrates a flow chart of a process of making and checking a bankruptcy array for the chapter 13 bankruptcy option of FIG. 53.

Referring to FIG. 54, the bankruptcy array for the chapter 13 bankruptcy option is made and checked (box 1000) by calculating (box 1002) a first entry of the array (chapter13 [first]) variable according to the following equation:

chapter13 [first]=(networth of assets−((tax exempt home payments*marital status)−(tax exempt car payments*marital status))).

A second entry of the array (chapter13 [second]) variable is calculated (box 1004) according to the following equation:

chapter13 [second]=(affordable monthly payments*0.85*36).

A third entry of the array (chapter13 [third]) variable is calculated (box 1006) according to the following equation:

chapter13[third]=(unsecured debt*0.10).

The chapter13 array is sorted (box 1008), for instance, in descending order.

A upper payment in chapter 13 bankruptcy (ud13r) variable is set (box 1010) equal to the highest value of the chapter13 array.

It is then determined (box 1012) if the ud13r divided by sixty (60) is greater than the affordable monthly payments, and, if so, a qualification (qualify) variable is set (box 1014) equal to zero (0).

Otherwise, the qualify variable is calculated (box 1016) according to the following equation:

qualify=(30−((ud13r/affordable monthly payments)/10)).

Then, once the qualify variable is set or calculated, a final score for the chapter 13 bankruptcy option is checked (box 1018).

Figure 55:
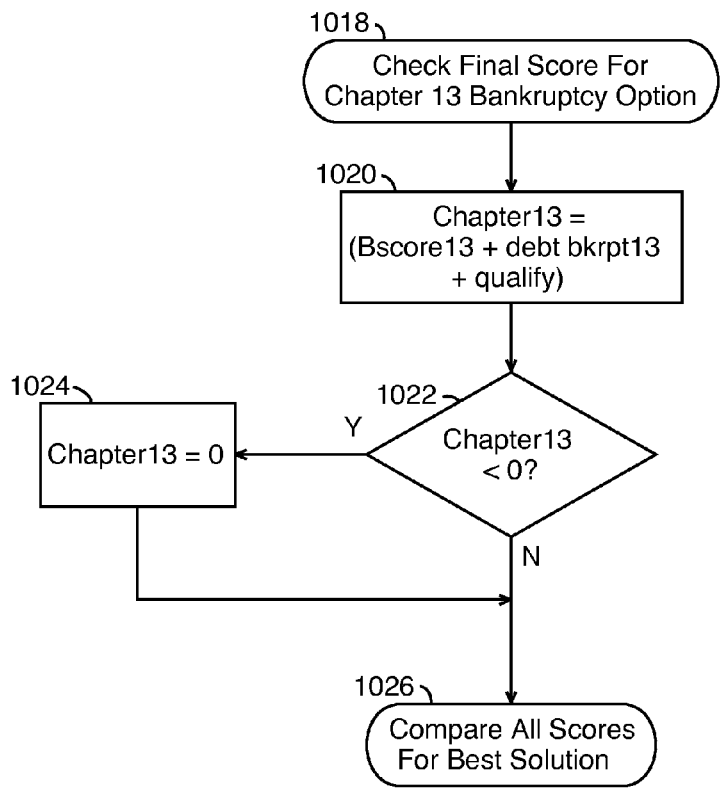
FIG. 55 illustrates a flow chart of a process of checking a final score for the chapter 13 bankruptcy option of FIG. 53.

Referring to FIG. 55, the final score for the chapter 13 bankruptcy option is checked (box 1018) by calculating (box 1020) a final chapter 13 bankruptcy (chapter13) variable according to the following equation:

chapter13=(bscore13+debt bkrpt13+qualify).

The chapter13 is, then, outlier restricted to a minimum of zero (0). For instance, it is determined (box 1022) if the chapter13 is less than zero (0), and, if so, the chapter13 is set (box 1024) equal to zero (0).

The chapter13 is saved as the chapter 13 bankruptcy option score in the array of action options. Once the chapter 13 bankruptcy option score is saved, all scores of the action option array are compared (box 1026) for the best solution.

Figure 56:
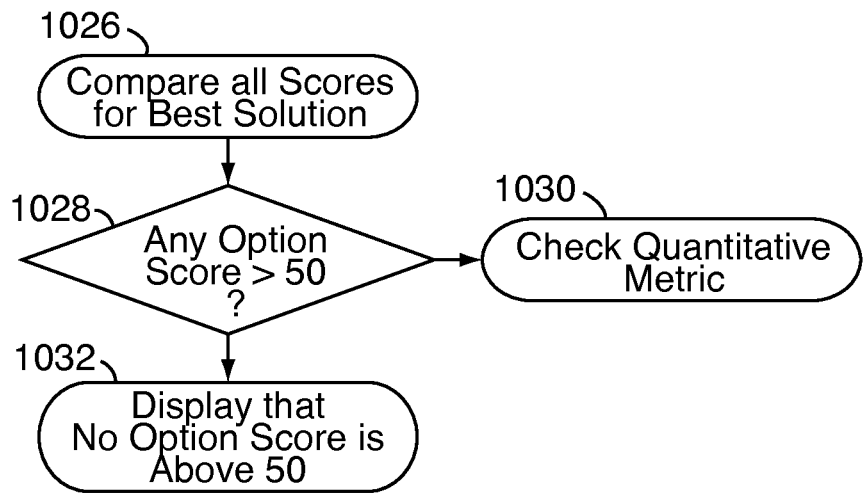
FIG. 56 illustrates a flow chart of a process of comparing all scores for the best solution according to the method of FIG. 19.

Referring to FIG. 56, all scores of the action option array are compared (box 1026) for the best solution by determining (box 1028) if any of the action option scores are greater than or equal to fifty (50), and, if so, a quantitative metric is checked (box 1030).

Otherwise, if each of the action option scores is less than fifty (50), the determination that there are no action option scores above fifty (50) is displayed (box 1032).

Figure 57:
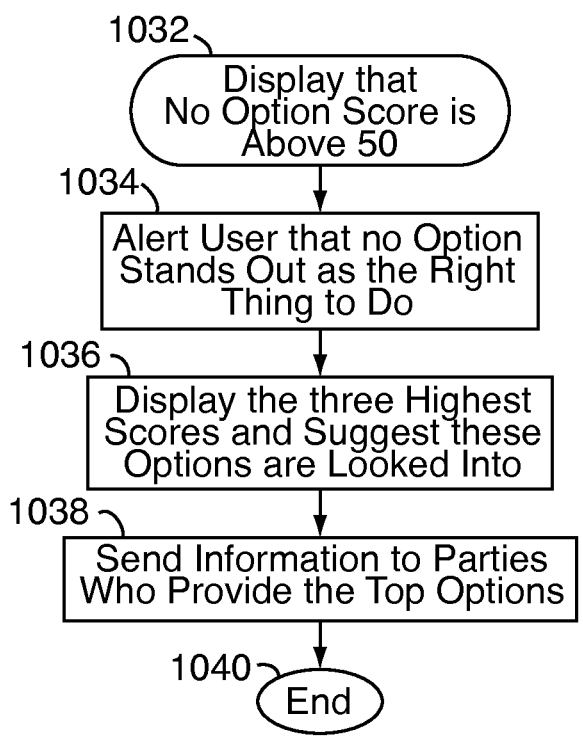
FIG. 57 illustrates a flow chart of a process of displaying that no option scores are above fifty (50) (i.e., a minimum threshold) for the process of comparing all scores of FIG. 56.

Referring to FIG. 57, the determination that there are no action option scores above fifty (50) is displayed (box 1032) by alerting (box 1034) the user that no option stands out as being the right thing to do.

Then, the action options having the three highest scores are displayed (box 1036) and a suggestion is provided to the user that he look into these options.

In addition, information is sent (box 1038) to parties who provide the top (i.e., highest scoring) options. The information includes information associated with the user, such as information from the raw data, information associated with the scores, such as the array of action option scores, and instructions regarding follow-up steps for both the user and the parties. Then, the method ends (box 1040).

Figure 58:
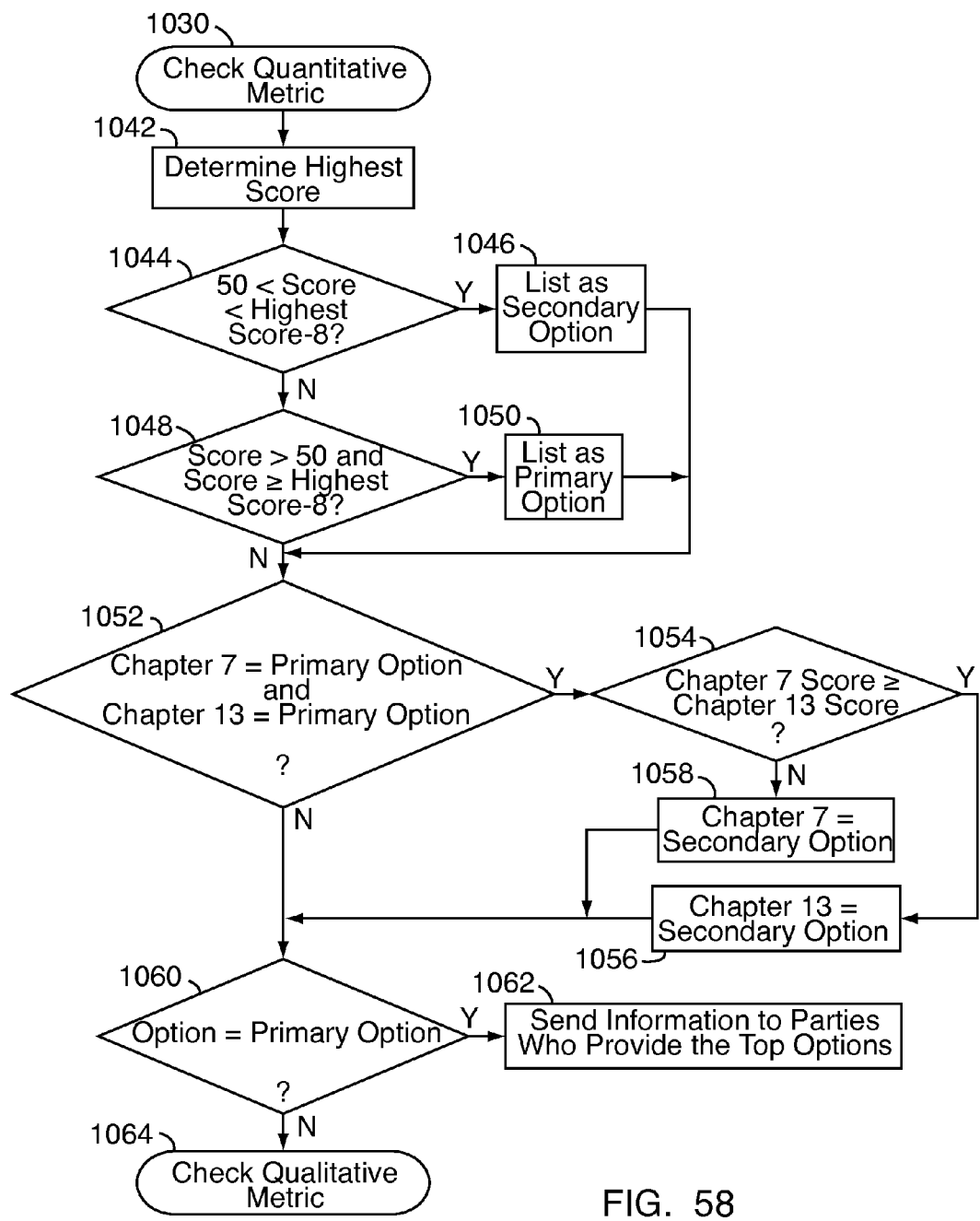
FIG. 58 illustrates a flow chart of a process of checking a quantitative metric for the process of comparing of FIG. 56.

Referring to FIG. 58, the quantitative metric is checked (box 1030) by determining (box 1042) the highest score.

For each score, it is determined (box 1044) if the score is greater than fifty (50) (i.e., the minimum threshold) and the score is less than the highest score minus eight (8), and, if so, the score is listed (box 1046) as a secondary option.

Otherwise, it is determined (box 1048) if the score is greater than fifty (50) and the score is greater than or equal to the highest score minus eight (8), and, if so, the score is listed (box 1050) as a primary option.

Next, it is determined (box 1052) whether both the chapter 7 bankruptcy option score and the chapter 13 bankruptcy option scores are listed as primary options, and, if so, the lesser of the chapter 7 bankruptcy option score and the chapter 13 bankruptcy option score is re-listed as a secondary option. For instance, it is determined (box 1054) if the chapter 7 bankruptcy option score is greater than or equal to the chapter 13 bankruptcy option score, and, if so, the chapter 13 bankruptcy option score is re-listed (box 1056) as a secondary option.

Otherwise, if the chapter 7 bankruptcy option score is less than the chapter 13 bankruptcy action option score, the chapter 7 action option score is re-listed (box 1058) as a secondary option.

Then, for each action option score, it is determined (box 1060) if the action option is listed as a primary option, and, if so, information is sent (box 1062) to a party who provides the associated action option.

The debt calculation model of the method is set to automatically refer users to providers of the primary options as agreed upon in the Terms and Conditions of use. However, the debt calculation model of the method can be reconfigured in accordance with the method discussed above, if desired.

Otherwise, if the action option score is not listed as a primary action option, a qualitative metric is checked (box 1064).

Figure 59:
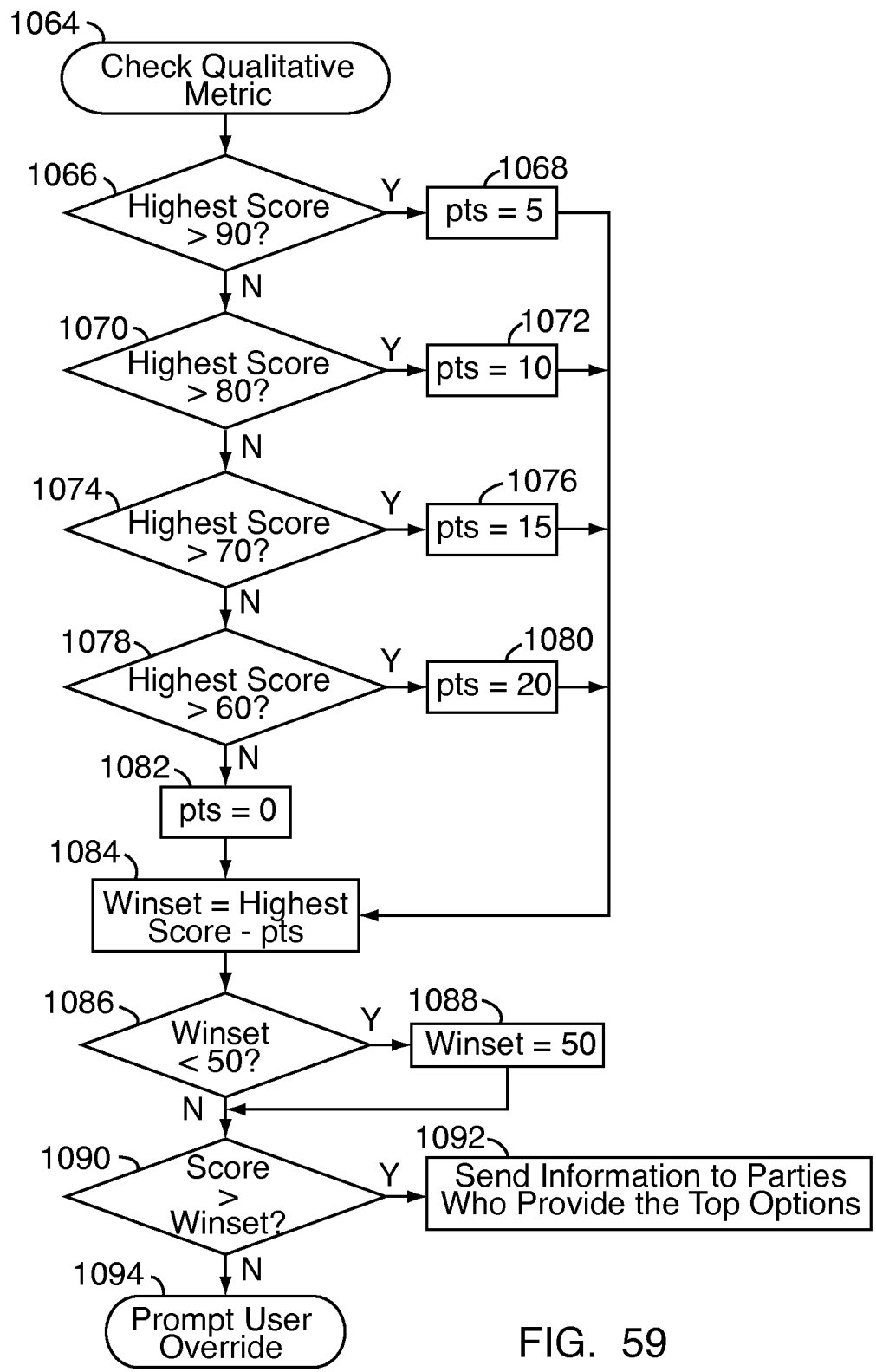
FIG. 59 illustrates a flow chart of a process of checking a qualitative metric for the process of comparing of FIG. 56.

Referring to FIG. 59, the qualitative metric is checked (box 1064) by scaling the highest score to a variable similarity threshold (pts) variable. For instance, it is determined (box 1066) if the highest score is greater than ninety (90), and, if so, the pts is set (box 1068) equal to five (5).

Otherwise, it is determined (box 1070) if the highest score is greater than eighty (80), and, if so, the pts is set (box 1072) equal to ten (10).

Otherwise, it is determined (box 1074) if the highest score is greater than seventy (70), and, if so, the pts is set (box 1076) equal to fifteen (15).

Otherwise, it is determined (box 1078) if the highest score is greater than sixty (60), and, if so, the pts is set (box 1080) equal to twenty (20).

Or else, the pts is set (box 1082) equal to zero (0).

A qualitative window set point (winset) variable is calculated (box 1084) according to the following equation:

$$winset = (highest\ score - pts).$$

The winset is, then, outlier restricted to a minimum of fifty (50). For instance, it is determined (box 1086) if the winset is less than fifty (50), and, if so, the winset is set (box 1088) equal to fifty (50).

Then, for each score, it is determined (box 1090) if the score is greater than the winset, and, if so, information is sent (box 1092) to parties who provide the top options (i.e., to select a secondary option for further consideration).

Otherwise, if the score is less than or equal to the winset, the user is prompted (box 1094) with the ability to override the selection of top options (i.e., to select a secondary option for further consideration).

Figure 60:
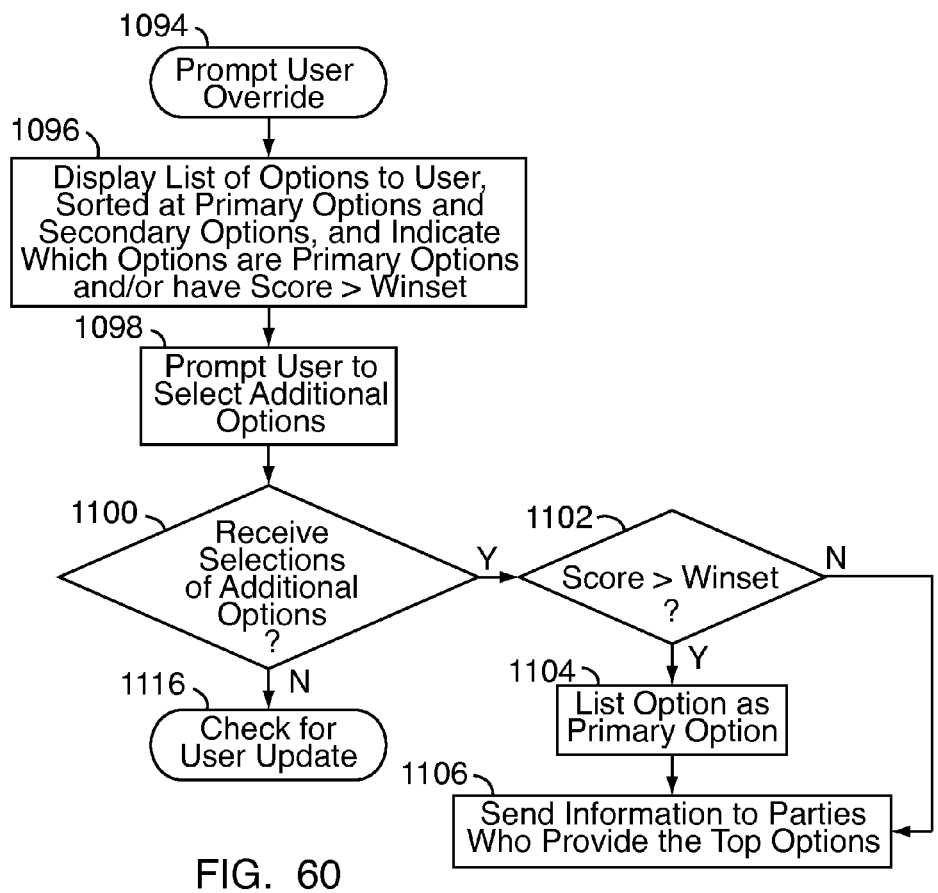
FIG. 60 illustrates a flow chart of a process of prompting a user override according to the method of FIG. 19.

Referring to FIG. 60, the user is prompted (box 1094) with the ability to override the selection of top options by displaying (box 1096) a list of options to the user. The list is sorted as primary options and secondary options, and indicates which options are primary options and/or have scores that are greater than the winset. For instance, the list includes all of the automatically selected options, additional secondary options and means for the user to select and de-select options.

It should be appreciated that the list groups the best option (s) in a manner that is readily understood and does not overburden the user's selection.

The user is prompted (box 1098) to select additional options.

If a selection of additional options is received (box 1100), it is determined (box 1102) if, for each of the selected options, the score is greater than the winset, and, if so, the selected option is re-listed (box 1104) as a primary option.

Otherwise, if the score is less than or equal to the winset or the action option has been re-listed as a primary option, information is sent (box 1106) to the parties who provide the top options for each of the selected options as well.

Figure 61:
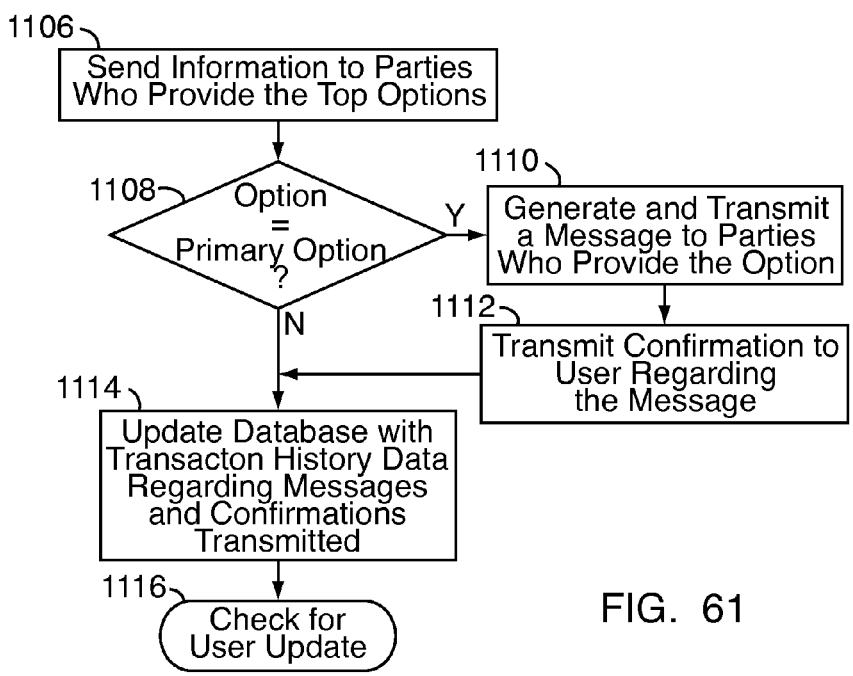
FIG. 61 illustrates a flow chart of a process of sending information to parties who provide top options according to the method of FIG. 19.

Referring to FIG. 61, information is sent (box 1106) to the parties who provide the top options by determining (box 1108), for each action option, if the action option is a primary option, and, if so, a message is generated and transmitted (box 1110) to parties who provide the option. For the do nothing option, the party is identified as the user.

Preferably, each party is sent only a single message with information for each user, including a list of all action options that the party is qualified to provide and that are top options or selection options for the user, which reduces redundant communications. The parties are identified, selected and enabled to issue initial alerts as described in the first preferred embodiment (see FIG. 18).

A confirmation is transmitted (box 1112) to the user regarding the message.

Otherwise, if the action option is not a primary option or if the confirmation was transmitted, the database is updated (box 1114) with transaction history data regarding the messages and confirmations that were transmitted.

Then, once the database is updated or, referring again to FIG. 60, if a selection of additional options is not received, a user update is checked (box 1116).

Figure 62:
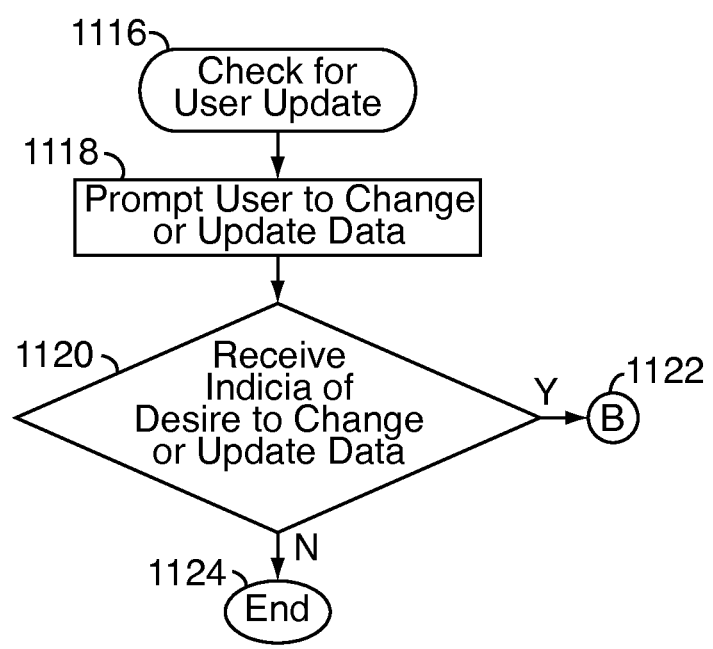
FIG. 62 illustrates a flow chart of a process of checking for a user update according to the method of FIG. 19.

Referring to FIG. 62, the method checks (box 1116) for user updates by prompting (box 1118) the user to change or update any of the information or raw data that was previously entered. If indicia is received (box 1120) that the user desires to change or update any data, then the user is directed back (box 1122) to the data gathering phase of the method, for instance, by showing (box 344) the user information fields (see FIG. 22).

Otherwise, if no indicia are received, the method ends (box 1124).

By automating the decision making process, the method of the present invention reduces the cost and time required to perform the decision making process.

It should be understood that the foregoing description is only illustrative of the invention. Various alternatives and modifications can be devised by those skilled in the art without departing from the broader aspects of the present invention.

For instance, it should be appreciated that each of the computations underlying the scoring of the action options is based on legal, accounting, finance and other constraints that control the eligibility and, at least in part, the likely outcome of each action option for the user. However, the computations also leverage industry expertise, legacy knowledge and statistical analysis to determine the normalized merits of each action option for the user.

In alternative embodiments of the present invention, the method can be applied to decision making in fields other than personal finance and debt assistance, including: insurance coverage selection, health care treatment management, business capital management, travel transportation and accommodation booking, real estate renovation and improvement planning, and general purchasing strategy and budgeting, for items that are both small (e.g., grocery) and large (e.g., automobiles and homes).

What is claimed is:

1. A method for artificial intelligence decision making using a computing device, the method comprising:
    computing, using the computing device, scores associated with at least two action options based on data associated with a user, wherein the scores indicate an eligibility of the user to pursue the respective action option and a likely outcome of the user pursuing the respective action option;
    comparing, using the computing device, the scores to a minimum threshold, which indicates a minimum sufficiency of the user pursuing one of the at least two action options in terms of both an eligibility of the user to pursue the respective action option and a likely outcome of the user pursuing the respective action option;
    if each of the scores is less than the minimum threshold, outputting, using the computing device, an alert including an identification of one or more of the at least two action options having a highest score; or, else, if at least one of the scores of the at least two action options is greater than or equal to the minimum threshold, comparing, using the computing device, the scores to each other;
    categorizing, using the computing device, the at least two action options as a primary option, a secondary option or neither based on the comparisons of the scores; and
    outputting, using the computing device, a sorted list of the at least two action options, wherein the sorted list is selected from the group consisting of: the primary option and the secondary option.

2. The method of claim 1, wherein the decision making relates to personal finance and debt assistance of a user.

3. The method of claim 1, further comprising: receiving, using the computing device, the data associated with a user, wherein the data includes information selected from the group consisting of: an unique identifier(s), an address, an e-mail address, a telephone number, financial information associated with an income, a fixed income, an asset, a net worth, a tax exempt asset, an expense, a loan, a rental agreement, a mortgage and a credit card including payment obligations associated with the same.

4. The method of claim 1, further comprising: receiving, from a user terminal of a user and using the computing device, the data associated with a user; and verifying, using the computing device, one or more elements of the data associated with the user by calculating the one or more elements based on other elements of the data associated with the user.

5. The method of claim 1, further comprising: gathering, from a third party server or database and using the computing device, additional data based on the data received from the user terminal; and verifying, using the computing device, the data associated with the user by comparing the data received from the user terminal to the additional data gathered from the third party server or database.

6. The method of claim 1, further comprising:
    scanning, using the computing device, the data associated with the user for an early indicator; and,
    if the early indicator is identified by the scanning, alerting, using the computing device, the user regarding the early indicator.

7. The method of claim 1, further comprising: identifying, using the computing device, the at least two action options based on the data associated with a user.

8. The method of claim 1, wherein: the at least two action options are selected from the group consisting of: a do nothing option; a balance transfer to zero percent (0%) annual percentage return (APR) credit card option; an unsecured to secured debt option; an unsecured personal loan option; a non-profit credit counseling option; a chapter 7 bankruptcy option; a debt settlement with a reduced balance due option; a fixed income option; and a chapter 13 bankruptcy option.

9. The method of claim 1, wherein: the scores are computed using an algorithm specific to each respective action option; and the algorithm is based on factors selected from the group consisting of: legally defined formulae, accounting standards, finance standards, industry knowledge and expertise, and statistical data associated with a peer group of a user.

10. The method of claim 1, wherein: the step of categorizing further comprises: categorizing, using the computing device, each of the at least two action options according to a quantitative metric and a qualitative metric.

11. The method of claim 1, wherein: the step of categorizing further comprises: categorizing, using the computing device, at least one of the at least two action options as the primary option.

12. The method of claim 1, wherein: the at least two action options comprise at least three action options; the step of categorizing further comprises: categorizing, using the computing device, at least one of the at least three action options as the secondary option; and at least one of the at least three action options is not categorized as either the primary option or the secondary option.

13. The method of claim 1, wherein: the sorted list of action options is outputted to a user terminal of a user; and the method further comprising: receiving, from the user terminal of a user and using the computing device, a selection from the sorted list of action options; and acting, using the computing device, based on the selection from the sorted list of action options.

14. The method of claim 13, wherein: the sorted list of action options includes data comprising: a name or title associated with each action option of the sorted list of action options, and indicia that at least one of the at least two action options is categorized as the primary option.

15. The method of claim 1, further comprising: identifying, using the computing device, at least one party who provides one of the sorted list of action options based on the data associated with the user; transmitting, to a user terminal of a user and using the computing device, information associated with the at least one party; and receiving, from the user terminal of a user and using the computing device, a selection of one or more of the at least one party from the information associated with the at least one party.

16. The method of claim 15, further comprising:
determining, using the computing device, if an initial alert is set by the one or more of the at least one party; and, if so, transmitting, to the user terminal of a user and using the computing device, the initial alert set by the one or more of the at least one party based on the selection of the one or more of the at least one party; and receiving, from the user terminal of a user and using the computing device, a response to the initial alert; and transmitting, using the computing device, a message to the one or more of the at least one party based on the selection of the one or more of the at least one party, the message including information selected from the group consisting of: a greeting, a follow-up instruction, the data associated with a user, and the sorted list of action options.

17. The method of claim 1, wherein: the step of outputting further comprises: transmitting, using the computing device, a message to a party who provides one of the sorted list of action options, the message including data selected from the group consisting of: a greeting, a follow-up instruction, the data associated with the user, and the sorted list of action options; and transmitting, to a user terminal of a user and using the computing device, a confirmation, the confirmation including data selected from the group consisting of: the greeting, the follow-up instruction, the data associated with the user, and the sorted list of action options.

18. A method for artificial intelligence decision making using a computing device, the method comprising:
computing, using the computing device, scores associated with at least two action options based on data associated with a user, wherein the scores are computed using an algorithm specific to each respective action option, each of the scores falls within a defined score range of all possible scores, and the scores computed using algorithms specific to the at least two action options fall within independent sub-ranges of the defined score range;
comparing, using the computing device, the scores to a minimum threshold, which indicates a minimum sufficiency of the user pursuing one of the at least two action options in terms of both an eligibility of the user to pursue the respective action option and a likely outcome of the user pursuing the respective action option;
if each of the scores is less than the minimum threshold, outputting, using the computing device, an alert including an identification of one or more of the at least two action options having a highest score; or, else,
if at least one of the scores of the at least two action options is greater than or equal to the minimum threshold, comparing, using the computing device, the scores to each other.

19. A method for artificial intelligence decision making using a computing device, the method comprising:
computing, using the computing device, scores associated with at least two action options based on data associated with a user;
comparing, using the computing device, the scores to a minimum threshold;
if each of the scores is less than the minimum threshold, outputting, using the computing device, an alert including an identification of one or more of the at least two action options having a highest score; or, else,
if at least one of the scores of the at least two action options is greater than or equal to the minimum threshold, comparing, using the computing device, the scores to each other, wherein the step of comparing the scores to each other further comprises: determining, using the computing device, a highest score of the scores of the at least two action options; and
categorizing, using the computing device, at least one of the at least two action options as a primary option when the score of the one of the at least two action options is greater than the highest score minus a similarity threshold and greater than the similarity threshold; or, else, categorizing, using the computing device, at least one of the at least two action options as a secondary option when the score of the one of the at least two action options is less than the highest score minus a similarity threshold and greater than the minimum threshold;
determining, using the computing device, a variable similarity threshold by comparing the highest score to a defined score range of all possible score values; and
re-categorizing, using the computing device, at least one of the at least two action options to the list of primary options when the score of the at least one of the at least two action options is greater than the highest score minus the variable similarity threshold and greater than the minimum threshold.

20. A method for artificial intelligence decision making using a computing device of a network, the method comprising:
comparing, using the computing device, scores associated with at least two action options to a minimum threshold and to each other, wherein the scores indicate an eligibility of the user to pursue the respective action option and a likely outcome of the user pursuing the respective action option and are based on data associated with a user and algorithms specific to each of the at least two action options, and the minimum threshold indicates a minimum sufficiency of the user pursuing one of the at least two action options in terms of both an eligibility of the user to pursue the respective action option and a likely outcome of the user pursuing the respective action option;
generating, using the computing device, a sorted list of action options based on the comparison of the at least two action options;
when each of the at least two action options are less than the minimum threshold, outputting, to a user terminal of a user and using the computing device, an alert that none of the at least two action options are at least minimally sufficient; and
outputting, to the user terminal of a user and using the computing device, the sorted list of action options.

21. A method for artificial intelligence decision making using a computing device of a network, the method comprising:
categorizing, using the computing device, at least two action options based on scores associated with the respective action option, wherein the scores are based on data associated with a user and algorithms specific to each of the at least two action options, wherein the step of categorizing further comprises: determining, using the computing device, a highest score based on the scores; determining, using the computing device, a variable similarity threshold by comparing the highest score to a defined score range of all possible score values; and categorizing, using the computing device, one or more of the at least two action options as a primary option when the score associated with the respective action option is greater than a minimum threshold and either greater than the highest score minus a similarity threshold or greater than the highest score minus the variable similarity threshold; or, else, categorizing, using the computing device, one or more of the other of the at least two action options as a secondary option when the score associated with the respective action option is greater than the minimum threshold; transmitting, to a user terminal of a user and using the computing device, a sorted list of the at least two action options based on the categorization of the at least two action options; receiving, from the user terminal of a user and using the computing device, a selection of one or more of the at least two action options from the sorted list; and transmitting, using the computing device, a message to a party who provides the one or more of the at least two action options based on the selection of the one or more of the at least two action options.

\* \* \* \* \*